(12) United States Patent
Koshima et al.

(10) Patent No.: US 7,905,781 B2
(45) Date of Patent: Mar. 15, 2011

(54) INFORMATION PROCESSING APPARATUS, INFORMATION STORING MEDIUM AND PROGRAM THEREOF, AND OPERATING DEVICE FOR GAME MACHINE

(75) Inventors: Kazuo Koshima, Kyoto (JP); Kazunori Koshiishi, Kyoto (JP); Shin'ichi Sasamoto, Kyoto (JP); Tomotsugu Nagaoka, Kyoto (JP)

(73) Assignee: Nintendo Co., Ltd., Kyoto-Shi (JP)

( * ) Notice: Subject to any disclaimer, the term of this patent is extended or adjusted under 35 U.S.C. 154(b) by 0 days.

(21) Appl. No.: 12/457,455

(22) Filed: Jun. 11, 2009

(65) Prior Publication Data
US 2009/0325702 A1 Dec. 31, 2009

Related U.S. Application Data

(60) Continuation of application No. 11/070,204, filed on Mar. 3, 2005, now Pat. No. 7,568,975, which is a division of application No. 10/111,325, filed on Apr. 23, 2002, now Pat. No. 7,040,986.

(30) Foreign Application Priority Data

Aug. 23, 2000 (JP) .................................. 2000-253067
Aug. 23, 2001 (WO) ........................ PCT/JP01/07210

(51) Int. Cl.
*G06F 17/00* (2006.01)
(52) U.S. Cl. ......................................................... 463/37
(58) Field of Classification Search .............. 463/36–38; 345/156, 161
See application file for complete search history.

(56) References Cited

U.S. PATENT DOCUMENTS

| 4,552,360 | A | 11/1985 | Bromley et al. |
| 5,644,113 | A | 7/1997 | Date et al. |
| 5,896,125 | A | 4/1999 | Niedzwiecki |
| 6,325,719 | B1 * | 12/2001 | Fukawa et al. .................. 463/37 |
| 6,351,205 | B1 | 2/2002 | Armstrong |
| 6,402,616 | B1 * | 6/2002 | Ogata et al. ...................... 463/37 |
| 6,906,700 | B1 * | 6/2005 | Armstrong .................... 345/161 |
| 7,345,670 | B2 * | 3/2008 | Armstrong .................... 345/156 |
| 7,568,975 | B2 * | 8/2009 | Koshima et al. ................ 463/37 |

(Continued)

FOREIGN PATENT DOCUMENTS

EP 0 771 015 5/1997

(Continued)

OTHER PUBLICATIONS

Microfilm of the specification and drawings annexed to the request of Japanese Utility Model Application No. 28532/1999 (Laid-open No. 119733/1990), (Canon Inc.), Sep. 27, Claims of Utility Model; Fig. 1.

*Primary Examiner* — Ronald Laneau
(74) *Attorney, Agent, or Firm* — Nixon & Vanderhye P.C.

(57) ABSTRACT

An information processing apparatus includes a controller (1), and a game machine (2) to which the controller (1) is connected, and from at least one of a plurality of switches provided on the controller (1), a digital output or an analog output is obtained in accordance with an operating state of the switches thereof. A CPU of the game machine (2) carries out a first processing operation of game information in response to the analog output, and also carries out a second processing operation associated with the first processing operation in response to the digital output.

15 Claims, 46 Drawing Sheets

U.S. PATENT DOCUMENTS

2002/0055384 A1* 5/2002 Armstrong ..................... 463/37
2002/0187837 A1 12/2002 Hasebe et al.

FOREIGN PATENT DOCUMENTS

| EP | 0 947 949 | | 10/1999 |
|---|---|---|---|
| JP | 1-264445 | A | 10/1989 |
| JP | 2-119733 | | 9/1990 |
| JP | 6-139878 | A | 5/1994 |
| JP | 7-302159 | A | 11/1995 |
| JP | 9-164270 | A | 6/1997 |
| JP | 9-244803 | A | 9/1997 |
| JP | 2000-99266 | A | 4/2000 |

* cited by examiner

FIG. 6
(a)
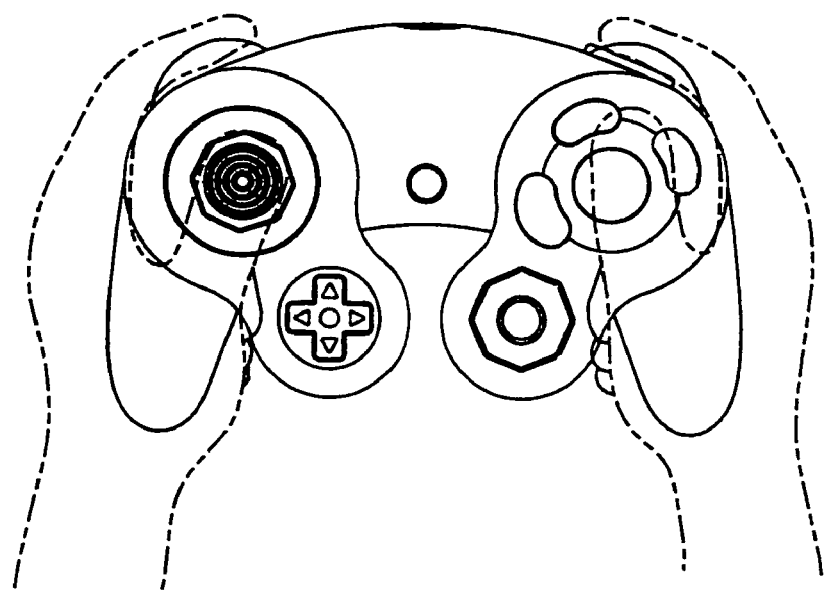
(b)
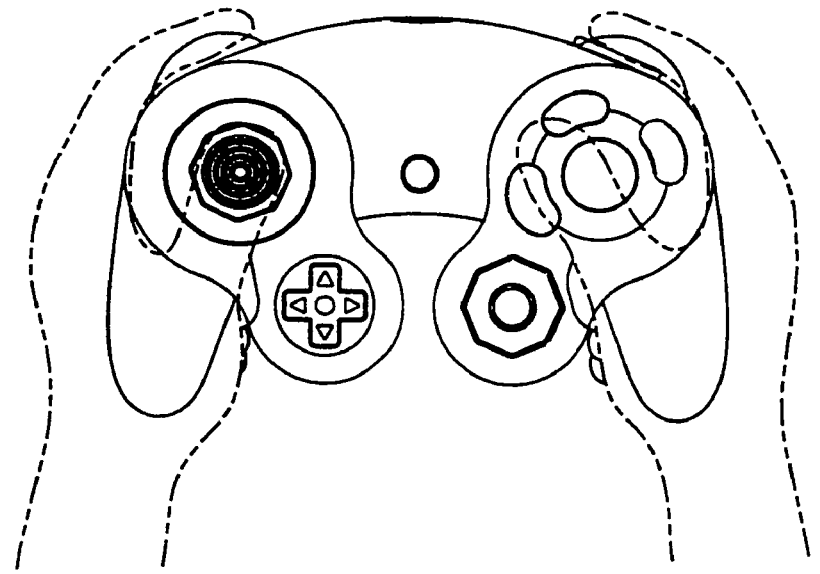

FIG. 12
(a)
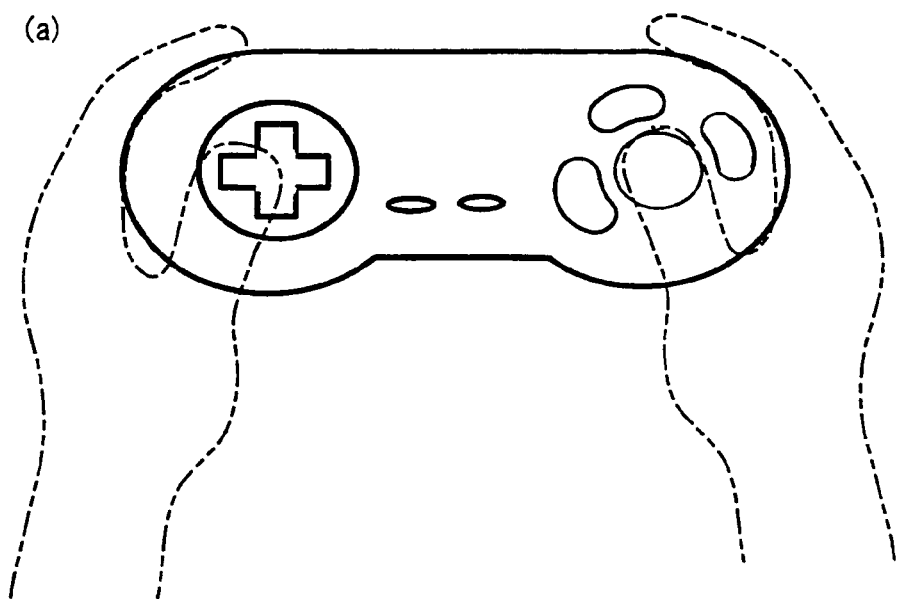
(b)
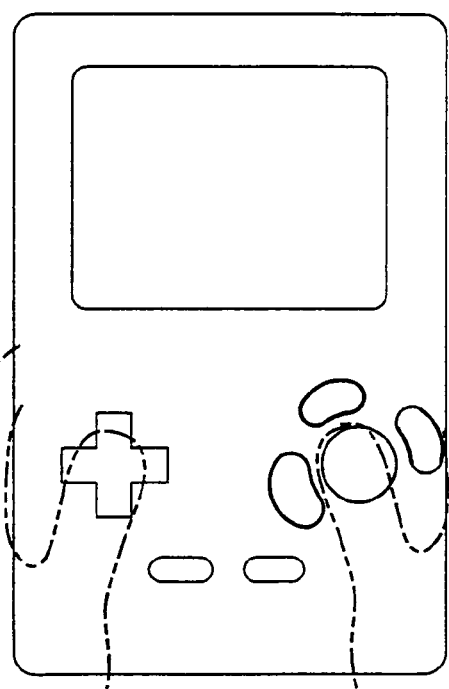

FIG. 17
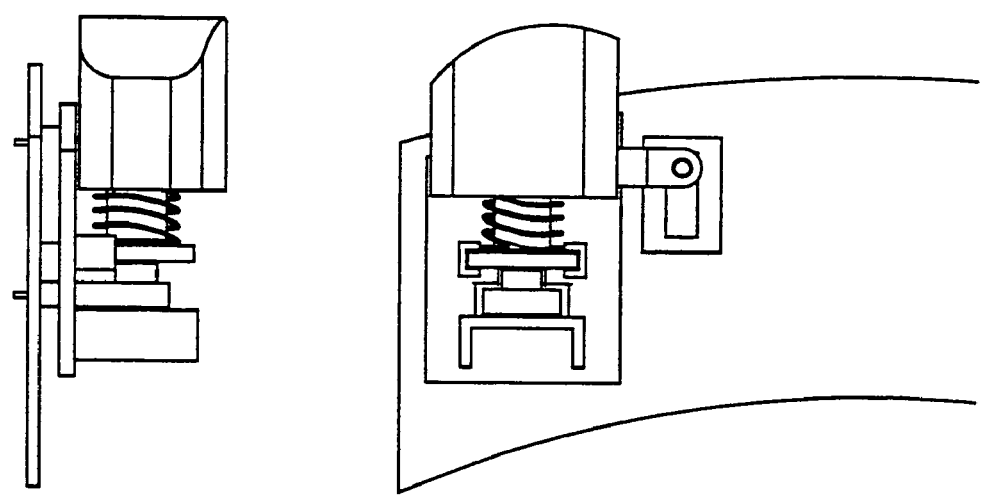
(a)
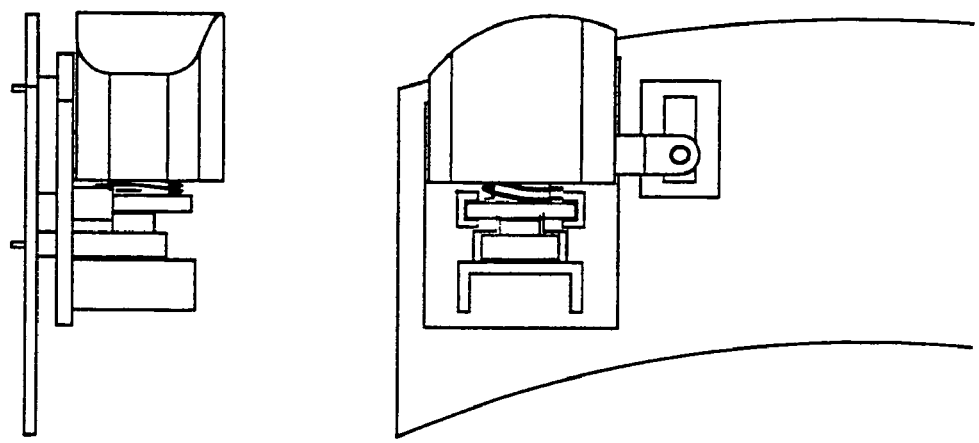
(b)
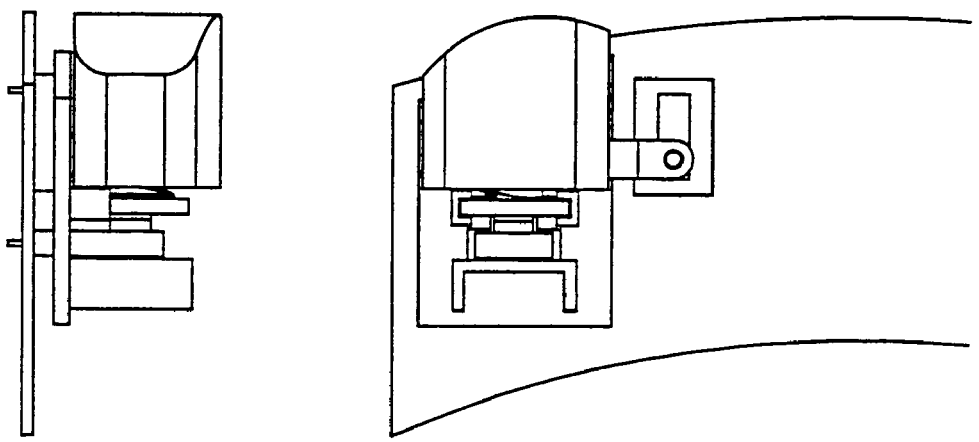
(c)

FIG. 18
(a)
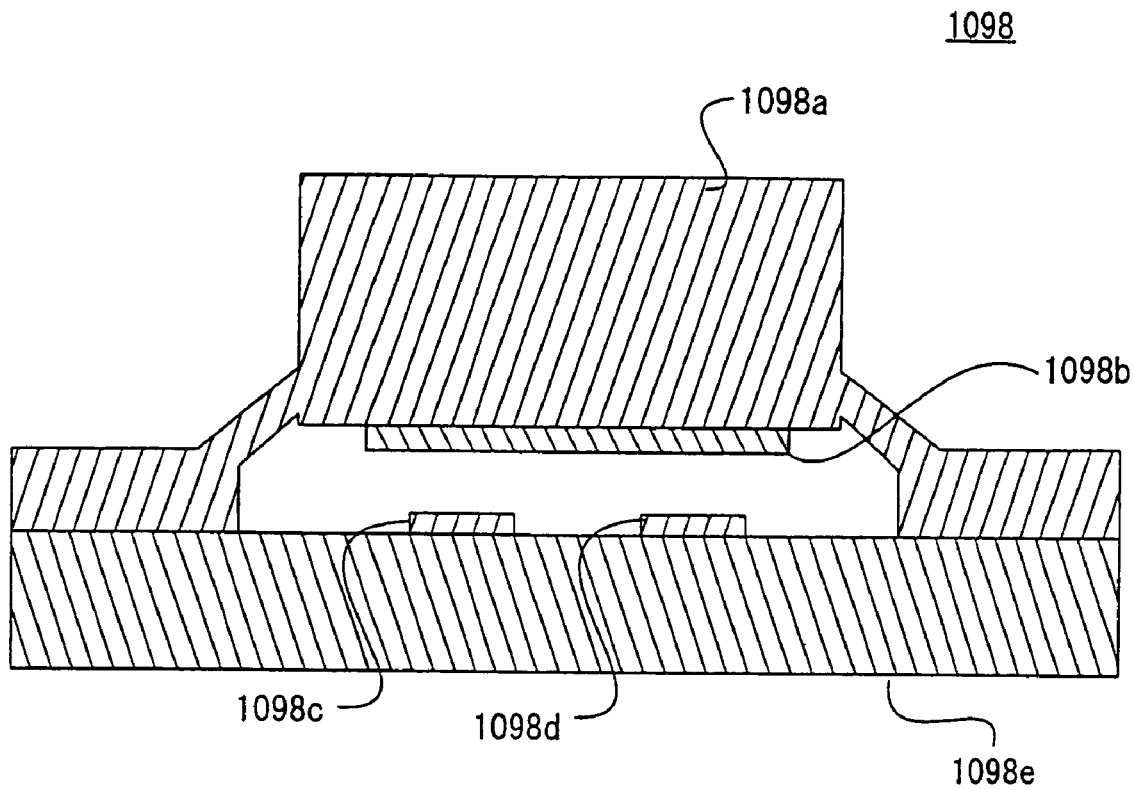
(b)
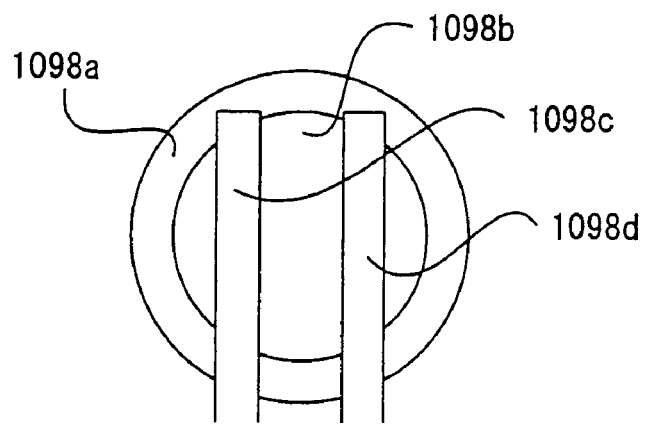

FIG. 19
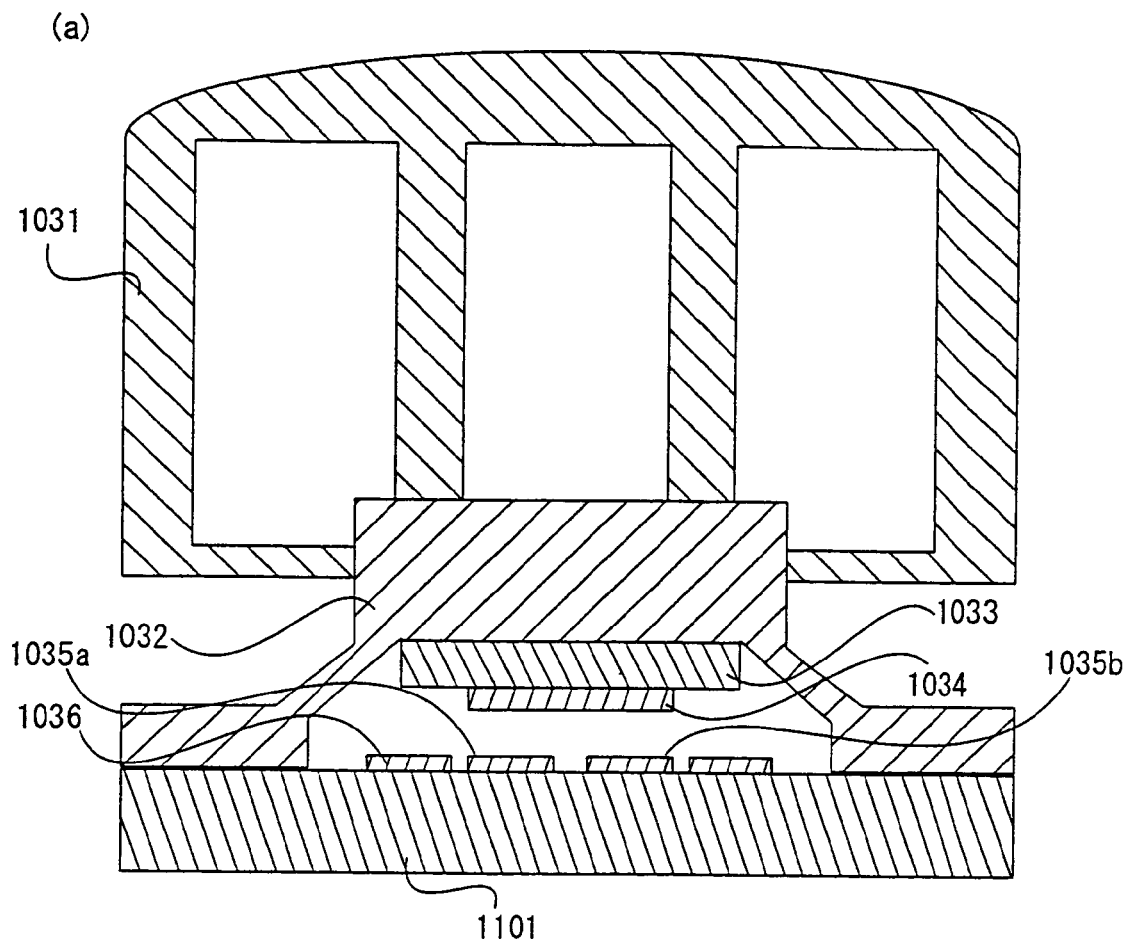
(a)
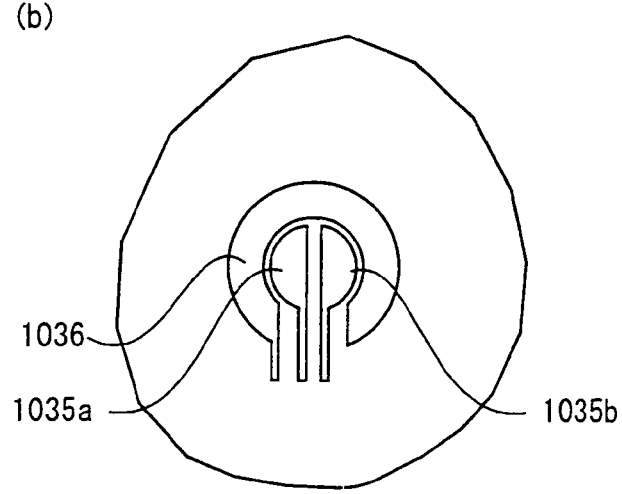
(b)

|  | b7 | b6 | b5 | b4 | b3 | b2 | b1 | b0 |
|---|---|---|---|---|---|---|---|---|
| 1st byte | START | Y | X | B | A | L | R | Z |
| 2nd byte | 0 | 0 | 0 | SHOCK | UP | DOWN | RIGHT | LEFT |
| 3rd byte | Main Analog X ||||||||
| 4th byte | Main Analog Y ||||||||
| 5th byte | Sub Analog X ||||||||
| 6th byte | Sub Analog Y ||||||||
| 7th byte | L Analog |||| R Analog ||||
| 8th byte | A Analog |||| B Analog ||||

(b)

|  | b7 | b6 | b5 | b4 | b3 | b2 | b1 | b0 |
|---|---|---|---|---|---|---|---|---|
| 1st byte | START | Y | X | B | A | L | R | Z |
| 2nd byte | 0 | 0 | 0 | SHOCK | UP | DOWN | RIGHT | LEFT |
| 3rd byte | Main Analog X ||||||||
| 4th byte | Main Analog Y ||||||||
| 5th byte | Sub Analog |||| Sub Analog ||||
| 6th byte | L Analog ||||||||
| 7th byte | R Analog ||||||||
| 8th byte | A Analog |||| B Analog ||||

(c)

|  | b7 | b6 | b5 | b4 | b3 | b2 | b1 | b0 |
|---|---|---|---|---|---|---|---|---|
| 1st byte | START | Y | X | B | A | L | R | Z |
| 2nd byte | 0 | 0 | 0 | SHOCK | UP | DOWN | RIGHT | LEFT |
| 3rd byte | Main Analog X ||||||||
| 4th byte | Main Analog Y ||||||||
| 5th byte | Sub Analog X |||| Sub Analog Y ||||
| 6th byte | L Analog |||| R Analog ||||
| 7th byte | A Analog ||||||||
| 8th byte | B Analog ||||||||

FIG. 35

TECHNIQUE PATTERN TABLE

| TECHNIQUE NUMBER | OPERATING HISTORY PATTERN | ATTACKING POWER | TECHNIQUE IMAGE |
|---|---|---|---|
| 1 | "COMPLETE DEPRESSING" → "HALF DEPRESSING" | 2 | IMAGE 1 |
| 2 | "HALF DEPRESSING" → "COMOLETE DEPRESSING" | 3 | IMAGE 2 |
| 3 | "COMPLETE DEPRESSING"→ "HALF DEPRESSING" | 5 | IMAGE 3 |
| 4 | "COMPLETE DEPRESSING"→ "HALF DEPRESSING" → "COMPLETE DEPRESSING"→ "HALF DEPRESSING" | 1 0 | IMAGE 4 |
| ... | ... | ... | ... |

FIG. 39
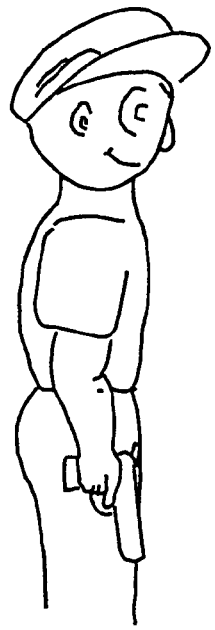
IMAGE A
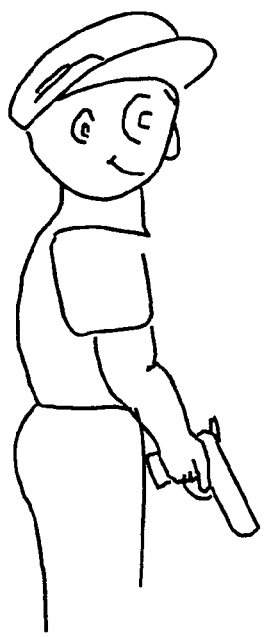
IMAGE B
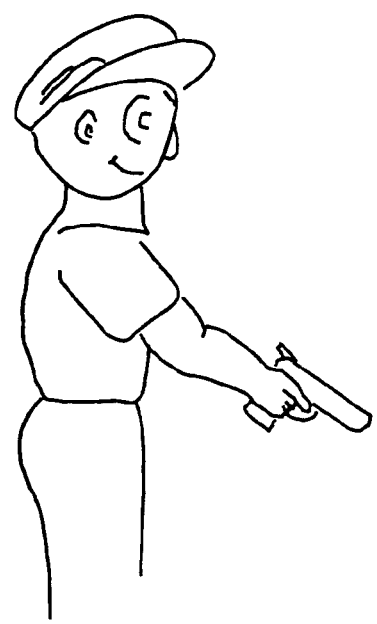
IMAGE C
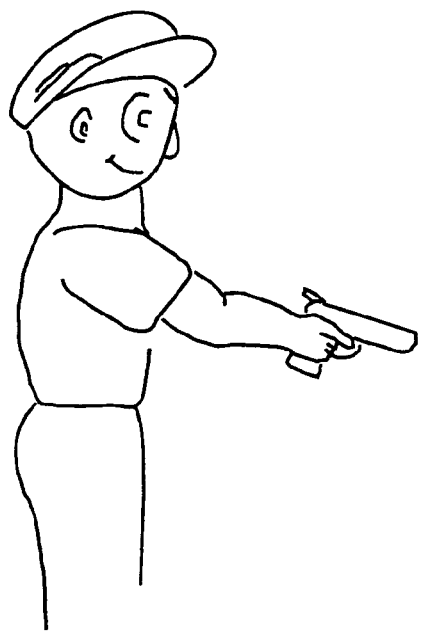
IMAGE D
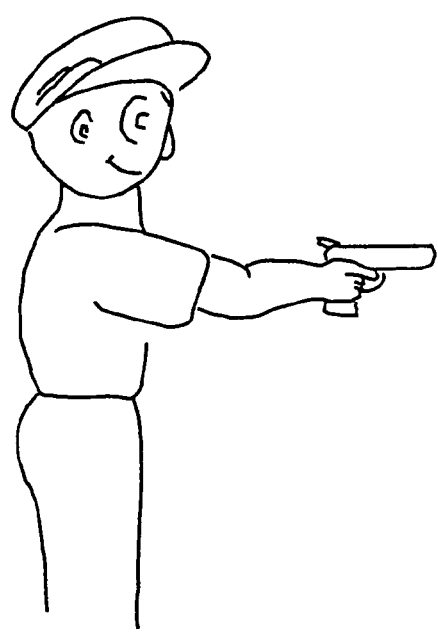
IMAGE E FIG. 40
(a)
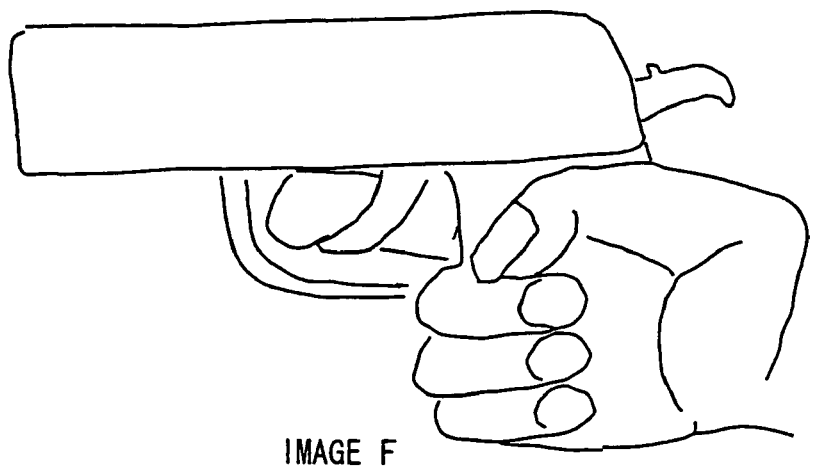
IMAGE F
(b)
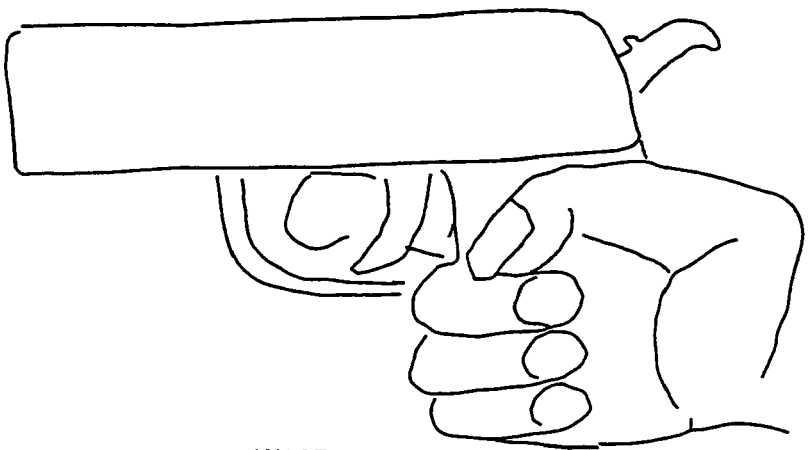
IMAGE G
(c)
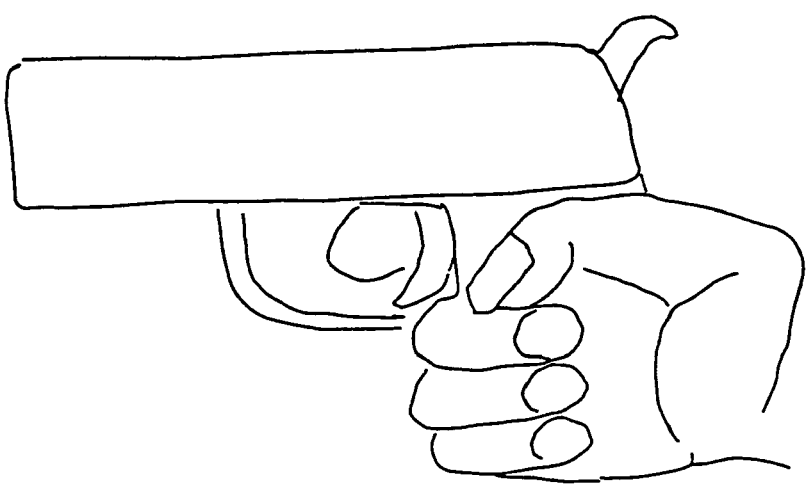
IMAGE H FIG. 47
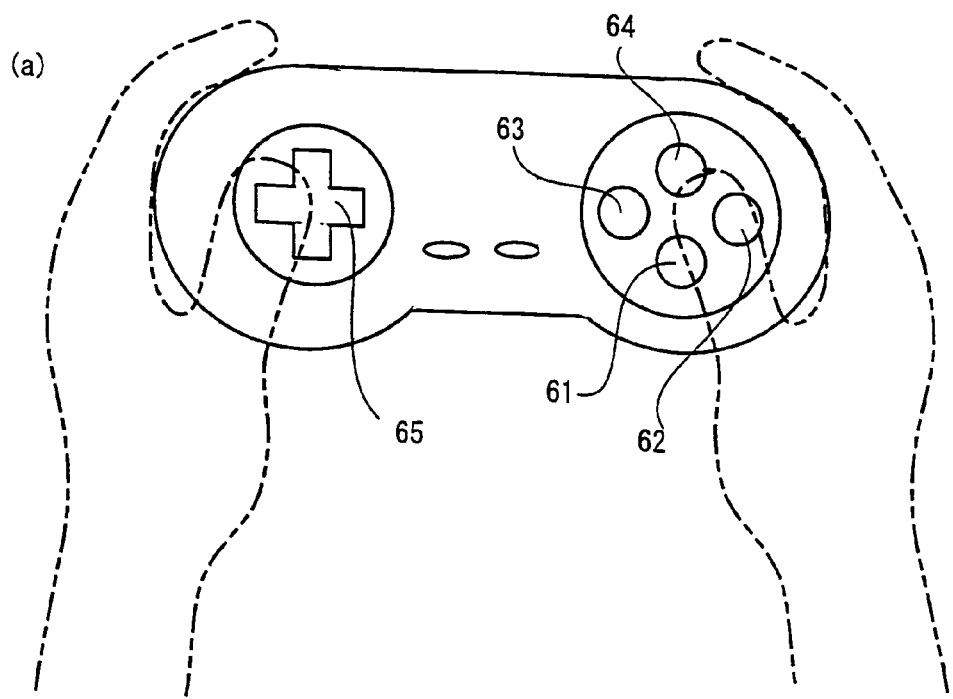
(a)
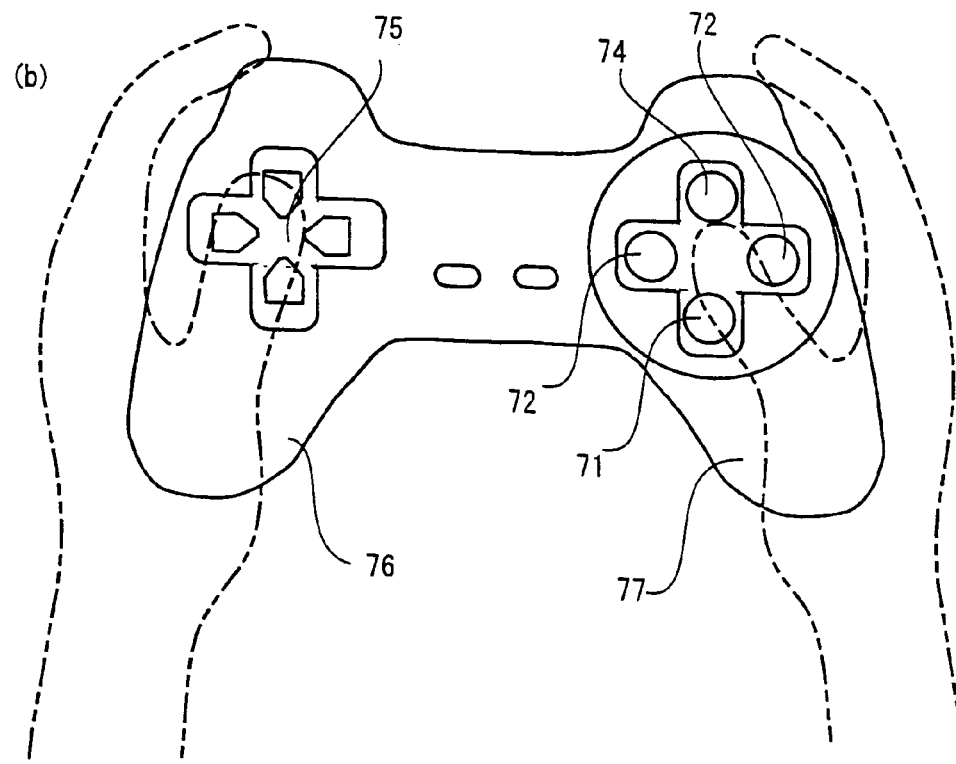
(b)

US 7,905,781 B2

INFORMATION PROCESSING APPARATUS, INFORMATION STORING MEDIUM AND PROGRAM THEREOF, AND OPERATING DEVICE FOR GAME MACHINE

This application is a continuation of U.S. application Ser. No. 11/070,204, filed Mar. 3, 2005 now U.S. Pat. No. 7,568,975, which is a divisional of U.S. application Ser. No. 10/111,325, filed Apr. 23, 2002 now U.S. Pat. No. 7,040,986. This application also claims the benefit of PCT/JP01/07210 and JP 2000-253067. The entire contents of each of these references is incorporated herein by reference.

TECHNICAL FIELD

The present invention relates to an information processing apparatus. More specifically, the present invention relates to an information processing apparatus which carries out an information processing such as a game, etc., by using an operating device which integrally includes a switch operated in an analog manner and a switch operated in a digital manner, an information storing medium used therefor, and a program thereof, for example.

The present invention further relates to an operating device for game machine. More specifically, the present invention relates to an operating device for game machine used for instructing a movement of an object and a character in playing a video game.

PRIOR ART

In a conventional information processing apparatus, especially, in a video game apparatus, a player operated an analog joystick and a digital button by different fingers so as to move a player object and cause the player object to attack a non-player object.

In addition, in the prior art, there was a switch integrally having an analog switch and a digital switch. However, once again in this case, the analog switch and the digital switch are merely selectively used, and therefore, an information processing (game processing) different from a case in which each of the analog switch and the digital switch is separately operated was not carried out.

Therefore, since the conventional game is nothing but a game to be played by separately operating the analog switch and the digital switch, there was a lack of freshness with respect to an operating technique.

Furthermore, an appearance view of a conventional operating device for game machine (hereinafter briefly referred to as "operating device") is shown in FIG. 47. FIG. 47(a) shows an operating device having a shape on which a housing is directly gripped by palms of both hands of a player, and disclosed in Japanese Patent Laying-open No.H9-167544 (corresponding U.S. Pat. No. 5,207,426), for example. FIG. 47(b) shows an operating device formed with grips 76 and 77 in a lower portion of a side surface of the housing.

In these apparatuses, direction designating switches 65 or 75 for designating a moving direction of a character or an object of the video game and an action instructing switch for instructing an action of a character, etc. are formed on one main surface of the housing in a vicinity of both sides surfaces. The action instructing switch includes four operating switches 61-64 or 71-74, and is arranged crosswise in vertical and horizontal directions viewed from a plane surface of the housing. Each operating switches 61-64 or 71-74 includes relatively small circular-shaped key tops. More specifically, each operating switches 61-64 or 71-74 is arranged to be distant by a constant distance to up and down and right and left from a central point when arranged crosswise, and there was no immediacy or was there no apparent immediacy therebetween. Furthermore, the key tops of each operating switches were same in height.

The operating device of the prior art had following problems. That is, each operating switch is distant by a constant distance up and down and right and left from a central point of the crosswise arrangement, thus operated according to subsequent methods. In a first operating method, the central point of the crosswise arrangement is defined as a reference position of a thumb finger, and it is operated by gradually shifting the thumb finger up and down and right and left so as to correspond to an operating switch to be operated. According to the first operating method, due to a fact that a position of the thumb finger naturally placed thereon while holding the housing is in a vicinity of the central point of the crosswise arrangement (see FIG. 47(a) or FIG. 47(b)), there is no awkwardness with respect to the position of the thumb finger at the reference position, and in addition, it is possible to operate by a movement at an equal distance in a case of operating any one of the operating switches. However, in general, there are high and low usage frequencies in a plurality of operating switches, and there is a need to move the thumb finger even when operating an operating switch with high usage frequency. As a result thereof, the functionality is not so good, and in addition, tiredness is easily caused in the thumb finger.

On the other hand, in a second method, defining a particular operating switch (lower switches 61 or 71 in a crosswise arrangement, for example) as a reference position of the thumb finger, in a case of operating a right operating switch (62 or 72), depress by shifting the thumb finger from the reference position to an upper right, in a case of operating a left operating switch (63 or 73), depress the thumb finger from the reference position to an upper left, and in a case of operating an upper switch (64 or 74), depress the thumb finger from the reference position to above. According to the second operating method, there is no need to move the thumb finger with respect to the particular operating switch, however, it requires a great amount of movement of the thumb finger in a case where other operating switches are to be operated, and in addition, since an amount of movement is not constant (in the aforementioned example, the amount of movement when operating the above operating switch is larger than the amount of movement when operating the left or the right operating switch), it often results in an erroneous operation, and tiredness in the thumb finger. Furthermore, the reference position of the thumb finger is different from a position of the thumb finger naturally placed thereon while holding the housing, thus causing tiredness.

In addition, in either above mentioned operating method, it often causes an erroneous operation in a case of a simultaneous depressing (in a case of simultaneously depressing a plurality of operating switches) or a successive depressing (in a case of successively operating a plurality of operating switches in an orderly manner), and in addition, a thumb finger tiredness is likely to be caused. More specifically, in a case of simultaneously depressing the operating switch 61 and the operating switch 64 (operating switch 71 and operating switch 74), simultaneously depressing the operating switch 62 and the operating switch 63 (operating switch 72 and operating switch 73), or simultaneously depressing the operating switch 63 and the operating switch 64 (operating switch 73 and the operating switch 74), it needs to avoid other operating switches, thus demanding an unnecessary force on the thumb finger, and as a result thereof, operability is poor. Furthermore, it is difficult to simultaneously depress the operating switch 61 and the operating switch 64 (operating switch 71 and operating switch 74), or the operating switch 62 and the operating switch 63 (operating switch 72 and operating switch 73) because of a wide distance between respective operating switches. Moreover, in a case of a successive depressing from the operating switch 61 to the operating switch 64 (from the operating switch 71 to the operating switch 74) or a successive depressing from the operating switch 62 to the operating switch 63 (from the operating switch 72 to the operating switch 73), an operability is poor because a moving distance of the thumb finger is large, and in addition, there is a possibility to contact other operating switches while moving.

In addition, in a positioning relationship between the upper and the lower operating switches (positioning relationship between the operating switch 61 and the operating switch 64, or positioning relationship between the operating switch 71 and the operating switch 74), a direction to which a thumb finger naturally extends when a player holds the housing is not an axial direction. Therefore, it results in an unnatural movement of the thumb finger with respect to the simultaneous depressing and the successive depressing of the upper and the lower operating switches, thus triggering tiredness in the thumb finger.

Moreover, it often occurs that an erroneous operating key is unintentionally depressed because a shape and a size of the key top of each operating switch are same and have no clear distinction.

Furthermore, with respect to an operating switch with high usage frequency, other operating switches are same in size, thus resulting in a poor operability.

Moreover, each operating switch is same in height, thus requiring to forcefully extend the thumb finger when operating the operating switch provided at an upper portion of the housing.

SUMMARY OF THE INVENTION

Therefore, it is a primary object of the present invention to provide an information processing apparatus in use of a novel operating technique, and an information storing medium used therefor, and a program thereof.

It is another object of the present invention to provide an information processing apparatus capable of carrying out a plurality of controls with a single finger, an information storing medium used therefor, and a program thereof.

It is still another object of the present invention to provide an information processing apparatus capable of diversifying changes onto the control when depressing a certain switch, an information storing medium therefor, and a program thereof.

It is still another object of the present invention to provide an information processing apparatus capable of detecting that a user is about to depress a given switch and expressing this on a screen, an information storing medium therefor, and a program thereof.

It is still another object of the present invention to provide an information processing apparatus capable of carrying out a special process with respect to a maximum operation of an analog switch by allowing the user to apparently recognize that the maximum operation has been applied to the analog switch, an information storing medium used therefor, and a program thereof.

It is yet still another object of the present invention to provide an operating device for game machine with a good functionality and capable of being correctly and easily operated.

It is another object of the present invention to provide an operating device for game machine most unlikely to cause a hand tiredness, more specifically, a tiredness in a thumb finger.

It is still another object of the present invention to provide an operating device for game machine capable of easily carrying out a simultaneous depressing and a successive depressing, and in addition, easily realizing various game operating methods.

An information processing apparatus (2: a reference number showing a corresponding portion in an embodiment described later, and so forth.) according to the present invention, comprises an operating means (1), a processing means (21) which carries out a process based on operating information from the operating means, and an image signal outputting means (22) which outputs image data generated by the processing means to a display means as an image signal, wherein the operating means includes an analog operating means (1091-1096; 1033, 1036) and digital switches (1098; 1034, 1035a, 1035b) arranged to be turned on in association with an operation of the analog operating means, and the processing means includes a first processing means (S1807; S2504, S2505; S2903; S3702; S3902-S3906) which carries out a first operation based on operating information of the analog operating means and a second processing means (S1803, S1805; S2502, S2409, S2410; S2902; S3704-S3708; S3907) to carry out a second process in association with the first process based on on/off information of the digital switches.

According to the present invention, since the analog switch and the digital switch are operated by a single switch, it is possible to carry out a process regarding the analog switch and a process regarding the digital switch by one operation of the player. In addition, since the process regarding the analog switch and the process regarding the digital switch are associated each other, it is possible to realize a conventionally unknown movement or action of a player object or the like, and an information processing using various kinds of operating techniques. Furthermore, following effects are available:

(1) It is possible to provide an information processing apparatus capable of carrying out a plurality of controls by a single finger;

(2) It is possible to give variations to a processing content upon operating the digital switch in accordance with an operation of the analog switch;

(3) It is possible to detect that the user is about to depress the digital switch by the analog switch, and express this on a screen; and (4) It is possible to carry out a special processing with respect to a maximum operation of the analog switch because the user can clearly recognize that the maximum operation is applied to the analog switch.

In a certain embodiment, the digital switch (1098) is arranged to be turned on when an operating amount of the analog operating means (1091-1096) approximately becomes a maximum.

In a preferred embodiment, the first processing means carries out processes (S1807; S2903) in accordance with an operating amount of the analog operating means, and the second processing means carries out processes (S1803; S2902) in response to the process of the first processing means when the operating amount of the analog operating means is maximum.

In addition, the processing means further includes a candidate storing means which stores a candidate of the second process, a selecting means (S1601) which selects a process from the candidate storing means, and a second process setting means (S1603, S1605) which sets a process selected by the selecting means as a second process.

Furthermore, the first processing means includes a measuring means (S3905) which accumulatively measures an operating amount of the analog operating means, and the second processing means changes a process size in accordance with an amount measured by the measuring means (S3907).

In a certain embodiment, the first processing means includes an operating speed calculating means (S3705) which calculates an operating speed of the analog operating means, and the second processing means changes a process size in accordance with the operating speed calculated by the operating speed calculating means before an on-operation of the digital switch (S3707).

In another embodiment, the first processing means carries out a process (S2401) to store an operating position of the analog operating means before an on-operation of the digital switch, and the second processing means changes a process content (S2409, S2410) in accordance with an operating position of the analog operating means which the first processing means stores (S2409, S2410).

In still another embodiment, the first processing means carries out a process (S2903) which successively displays a predetermined movement or action of a character, and the second processing means carries out a process (S2902) which causes the character to perform a succeeding movement in coordination with the predetermined movement or action.

In this case, the first processing means successively displays the predetermined movement or action in accordance with an operating amount of the analog operating means (S2903).

In an embodiment, the operating means further includes an operating means for movement (112) to instruct the character to move, and the processing means (2) further includes a movement controlling means (S2904) to control a movement of the character based on operating information of the operating means for movement, and the movement controlling means controls a movement amount of the character when the first processing means displays a progressing state of the predetermined movement (S3404).

The processing means described above further includes a non-player character controlling means (S3501, S3502) to control a non-player character not operated by a player, the succeeding movement by the second processing means is a movement which affects the non-player character, and the non-player character controlling means displays the non-player character in accordance with a display of a progressing state of the predetermined movement by the first processing means (S3504).

In a certain aspect of the present invention, the information processing apparatus (2) is provided with an operating means (1), a processing means (21) which carries out a process based on operating information from the operating means, and an image signal outputting means (22) which outputs image data generated by the processing means to a display means as an image signal, wherein the operating means includes an analog operating means (1091-1096; 1033, 1036) and digital switches (1098: 1034, 1035a, 1035b) arranged to be turned on when an operating amount of the analog operating means becomes a maximum, and the processing means includes state detecting means (S2401; S2701) which detects any one of a first state in which the digital switch is turned on, a second state in which an operating amount of the analog operating means is zero, and a third state in which the digital switch is turned off, and in addition, the operating amount of the analog operating means is not zero, and carried out different processes (S2408-S2410, S2710) according to an output of the state detecting means.

In this case, the processing means executes predetermined processes (S2708, S2709) when a history of a detecting output of the state detecting means becomes a predetermined pattern.

An information storing medium according to the present invention is an information storing medium (4) used for an information processing apparatus provided with an operating means including an analog operating means (1091-1096; 1033, 1036) and digital switches (1098; 1034; 1035a, 1035b) arranged to be turned on in association with and an operation of the analog operating means, a processing means (21) which carries out a process based on operating information from the operating means, and an image signal outputting means (22) which outputs image data generated by the processing means to a display means as an image signal, and stores a first program (S1807; S2504, S2505; S2903; S3702; S3902-S3906) to carry out a first process based on the operating information of the analog operating means, and a second program (S1803, S1805; S2502, S2409, S2410; S2902; S3704-S3708; S3907) to carry out a second process in association with the first process based on on/off information of the digital switches.

A program according to the present invention is a program executed by an information processing apparatus provided with an operating means including an analog operating means (1091-1096; 1033, 1036) and digital switches (1098; 1034, 1035a, 1035b) arranged to be turned on in association with an operation of the analog operating means, a processing means (21) which carries out a process based on operating information from the operating means, and an image signal outputting means (22) which outputs image data generated by the processing means to a display means as an image signal, and includes a first program (S1807; S2504, S2505; S2903; S3702; S3902-S3906) for carrying out a first process based on the operating information of the analog operating means, and a second program (S1803, S1805; S2502, S2409, S2410; S2902; S3704-S3708; S3907) for carrying out a second process in association with the first process based on on/off information of the digital switches.

A operating device for game machine (1) according to the present invention is in use for instructing a movement or action of a character appearing in a game, and comprises a housing (100), a main switch (103), and a sub-switch (104, 105, 106). The main switch (103) is arranged on one main surface of the housing (100) in a vicinity of one side surface and in a vicinity of a thumb finger of one side holding the housing. The sub-switch (104, 105, 106) is arranged in plural number to be circumferentially distributed around the main switch (103) in an area excluding a lower area of the main switch, and in addition, in which the thumb finger is movable. In addition, the sub-switch (104, 105, 106) is constituted in such a manner as to include a first sub-switch (106) arranged at an upper area of the main switch (103), a second sub-switch (104) arranged at a left area of the main switch (103), and a third sub-switch (105) arranged at a right area of the main switch, and each is a form smaller than a form of the main switch.

Note that in the description of the present invention, a "shape" of the operating switch refers to a shape when a key top of the operating switch is seen from above.

According to the above mentioned operating device for game machine, a relatively large operating switch (main switch) is arranged at a position of a thumb finger of one hand when the player holds the housing. Therefore, the player can exactly and effortlessly operate the switch. Furthermore, at a circumference of the main switch, a plurality of sub-switches are arranged. The sub-switches are selected to be a shape smaller than the main switch, and it is possible to easily carry out a successive depressing and a simultaneous depressing because a distance between the main switch and the sub-switch can be shortened. Furthermore, the sub-switch is not to be arranged below the main switch, thus the sub-switch is not an obstacle when the player depresses the main switch which can further improve an operating sensation of the main switch.

In a preferred embodiment, the aforementioned main switch (103) has a shape formed to be circular, and the sub-switches (104, 105, 106) are arranged on a concentric circle centered on the main switch (103). According to this embodiment, it is possible for the player to comprehend a positioning relationship between the main switch and the sub-switch, thus minimizing an erroneous operation.

Furthermore, the first sub-switch (106) is preferably arranged on a first axis (52) slanting a longitudinal axis (51) of the housing (100) passing a center of the main switch (100) toward a center of the housing (100) by a predetermined degree.

Normally, the player holds the housing of the operating device for game machine in a state where his forearm is inwardly faced (a state where forearms of both hands widen toward the end). At this time, the thumb finger which holds the housing of the operating device for game machine is also faced inwardly as are the forearms. According to the aforementioned embodiment, the main switch and the sub-switches are arranged on an axis which slants a longitudinal axis of the housing toward a center of the housing by a predetermined degree, and the first sub-switch is arranged in a direction in which the thumb finger naturally extends from a position of the main switch which is a normal position, thus easy to successively depress and simultaneously depress between the main switch and the sub-switch.

Note that in a case that the main switch is arranged in a vicinity of a right side surface of the housing, the first sub-switch is arranged on an axis slanting a longitudinal axis of the housing by a predetermined degree counterclockwise, and in a case that the main switch is arranged in a vicinity of a left side surface of the housing, the first sub-switch is arranged on an axis slanting the longitudinal axis of the housing by a predetermined degree clockwise.

In the aforementioned embodiment, the second sub-switch (104) and the third sub-switch (105) are arranged at a symmetrical position toward the first axis (52) as an example. In this example, the player can easily comprehend a positioning relationship between the second sub-switch and the third sub-switch, thus minimizing an erroneous operation.

Another operating device for game machine according to the present invention comprises a housing (100), a main switch (103), and a first sub-switch (106). The main switch (103) is arranged on one main surface of the housing in a vicinity of one side surface, and in a vicinity of a thumb finger of one side holding the housing. The first sub-switch (106) is arranged in an upper area of the main switch (103), and in addition, arranged on a first axis (52) slanting a longitudinal axis (51) of the housing passing a center of the main switch (103) toward a center direction of the housing, and has a shape smaller than a shape of the main switch.

According to the operating device for game machine, a relatively large operating switch (main switch) is arranged at a position of a thumb finger of one hand when the player holds the housing, thus possible for the player to exactly and effortlessly operate this switch. In addition, the first sub-switch is arranged in a direction to which the thumb finger naturally extends from a position of the main switch which is a normal position, thus easy to carry out a successive depressing and a simultaneous depressing between the main switch and the sub-switch.

Note that the housing (100) further comprises a grip (101) protruding toward a direction approximately parallel to the first axis (52) from a lower area of the main switch (103) and having a shape on which the player can tighten his grip thereon by a palm of one hand. According to this embodiment, the player can naturally bring a degree at which the housing is held into being synchronism with a positioning relationship between the main switch and the sub-switch. Therefore, the effects by the positioning relationship of the aforementioned operating switch are easily demonstrated.

In addition, in a preferred embodiment, the aforementioned first sub-switch (106) has a key top formed to be higher than a key top of the main switch (103).

According to this preferred embodiment, the key top of the first sub-switch is designed to be high, thus possible to easily operate as a result that an amount of extending the thumb finger becomes small in a case that the first sub-switch is operated by extending the thumb finger from a position of the main switch which is the normal position, and if a tip of the thumb finger is placed on the first sub-switch by placing a stomach portion of the thumb finger on the main switch, a good operating sensation is expected. Furthermore, in a case that only the first sub-switch is operated, the main switch is not to be operated erroneously.

Moreover, a sub-switch arranged to be closer to a central side of the housing than the main switch (103) out of the second sub-switch (104) and the third sub-switch (105) has its key top formed to be lower than the key top of the main switch (103). However, in a case that the main switch is arranged in a vicinity of a right side surface of the housing, the key top of the second sub-switch is formed to be lower than the key top of the main switch, and in a case that the main switch is arranged in a vicinity of a left side surface of the housing, the key top of the third sub-switch is formed to be lower than the key top of the main switch.

According to this embodiment, when operating the main switch, the second or the third sub-switch is not an obstacle, and in addition, when operating the second or the third sub-switch, an operating sensation through which the thumb finger is naturally placed on the key top of the second or third sub-switch when moving the thumb finger from the main switch to both directions is obtained. Furthermore, it is possible to distinguish the main switch and the second or third sub-switch by a finger tip sensation or feeling, thus possible to prevent to operate erroneously.

Note that the sub-switches (104, 105, 106) may be formed to be a shape extending along an outer circumference of a shape of the main switch (103). In this case, it is possible to enlarge a surface dimension of the key top of the sub-switch, and in addition, minimize an interval between the main switch and the sub-switches.

More specifically, the aforementioned operating device for game machine further comprises a direction designating operating portion which is arranged on one main surface of the housing (100) in a vicinity of the other side surface, and in a vicinity of a position of the thumb finger of the other hand which holds the housing, and for designating a moving direction of characters appearing in the game. According to this example, it is possible to independently instruct a movement or action content of the character and a movement direction, thus possible to diversify an operation of the characters so as to increase savor of the game.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing another example of an operating state of the controller;

FIG. 12 is an illustrative view showing a modified example of the present invention;

FIG. 17 is an illustrative view showing a transition state of an operation of the R switch;

FIG. 18 is an illustrative view showing a digital switch of the R switch;

FIG. 19 is an illustrative view showing an A button;

FIG. 21 is an illustrative view showing a format of operating data of a controller;

FIG. 35 is an illustrative view showing a technique pattern table used in the fighting game;

FIG. 39 is an illustrative view showing an example of images in the gun game;

FIG. 40 is an illustrative view showing another example of the images in the gun game;

FIG. 47 is an illustrative view showing a conventional operating device for game machine.

BEST FORM FOR PRACTICING THE INVENTION

Figure 1:
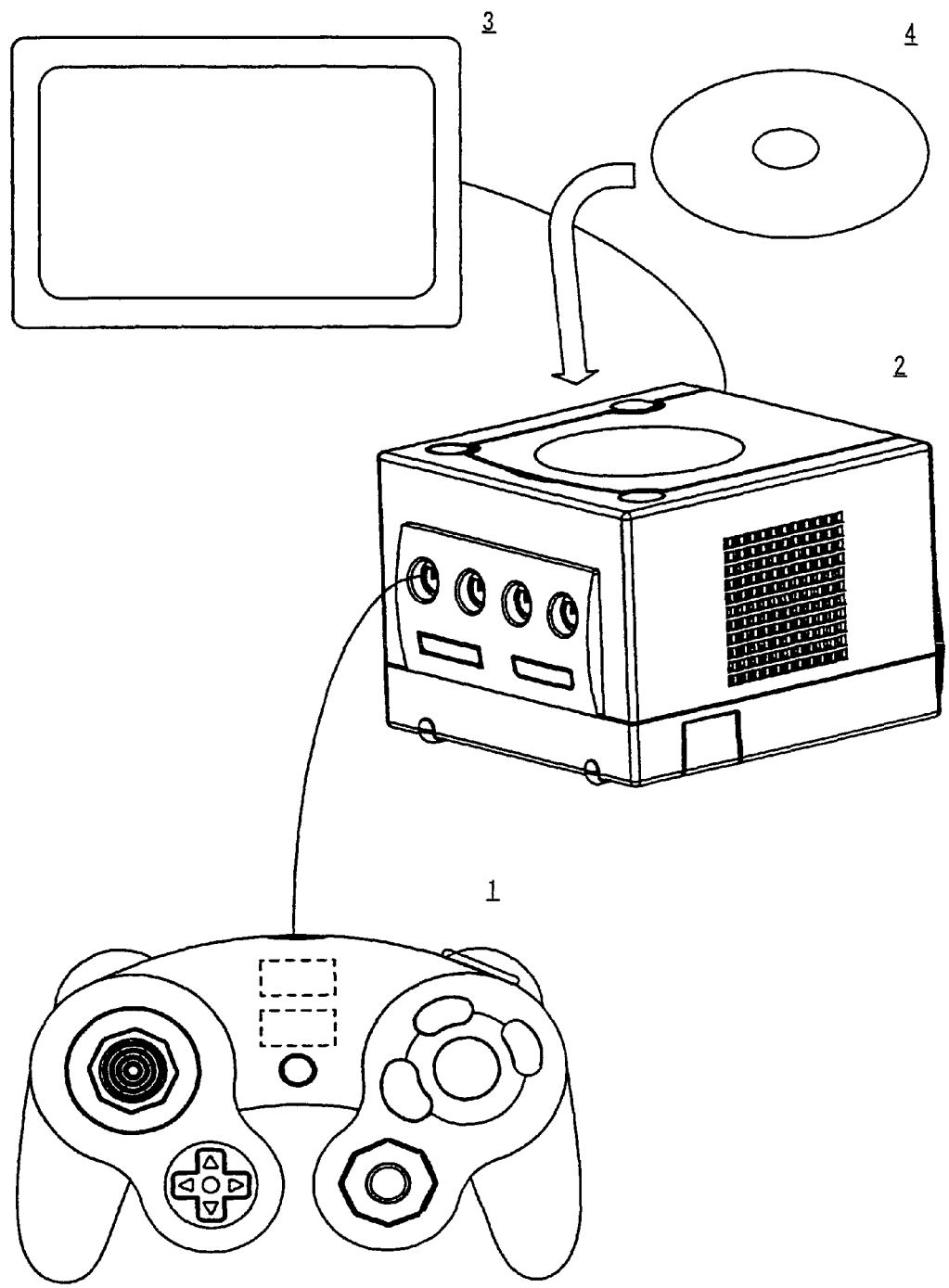
FIG. 1 is an appearance view showing a game machine system of one embodiment of the present invention.

FIG. 1 is an appearance view of a game machine system of one embodiment of the present invention. The game machine system of the present invention includes a controller 1, i.e. an operating device for game machine, a game machine main body 2, i.e. one example of an information processing apparatus, a television receiver 3, and a game disk 4. The controller 1 is coupled with the game machine main body 2 by a cable or wirelessly coupled (radio wave, infrared light, etc.) so that it is possible to send and receive data between the controller 1 and the game machine main body 2 with each other. The game machine main body 2 is a video game machine which executes a game program based on operating data from the controller 1 and outputs a video signal and an audio signal. The television receiver 3 is to generate images and voices based on the video signal and the audio signal output from the game machine main body 2. The game disk 4 is an information storing medium such as a DVD, a CD-ROM, a magnetic disk, and etc., for example, and program data including the aforementioned game program, image data and audio data are stored on this game disk 4 in advance.

Note that although only one controller is shown in FIG. 1, it is possible to connect a plurality of controllers to the game machine main body 2 so as to play one game among a plurality of players. In addition, it is needless to say that the present invention is not only applicable to a video game machine but also to a portable game machine.

Figure 2:
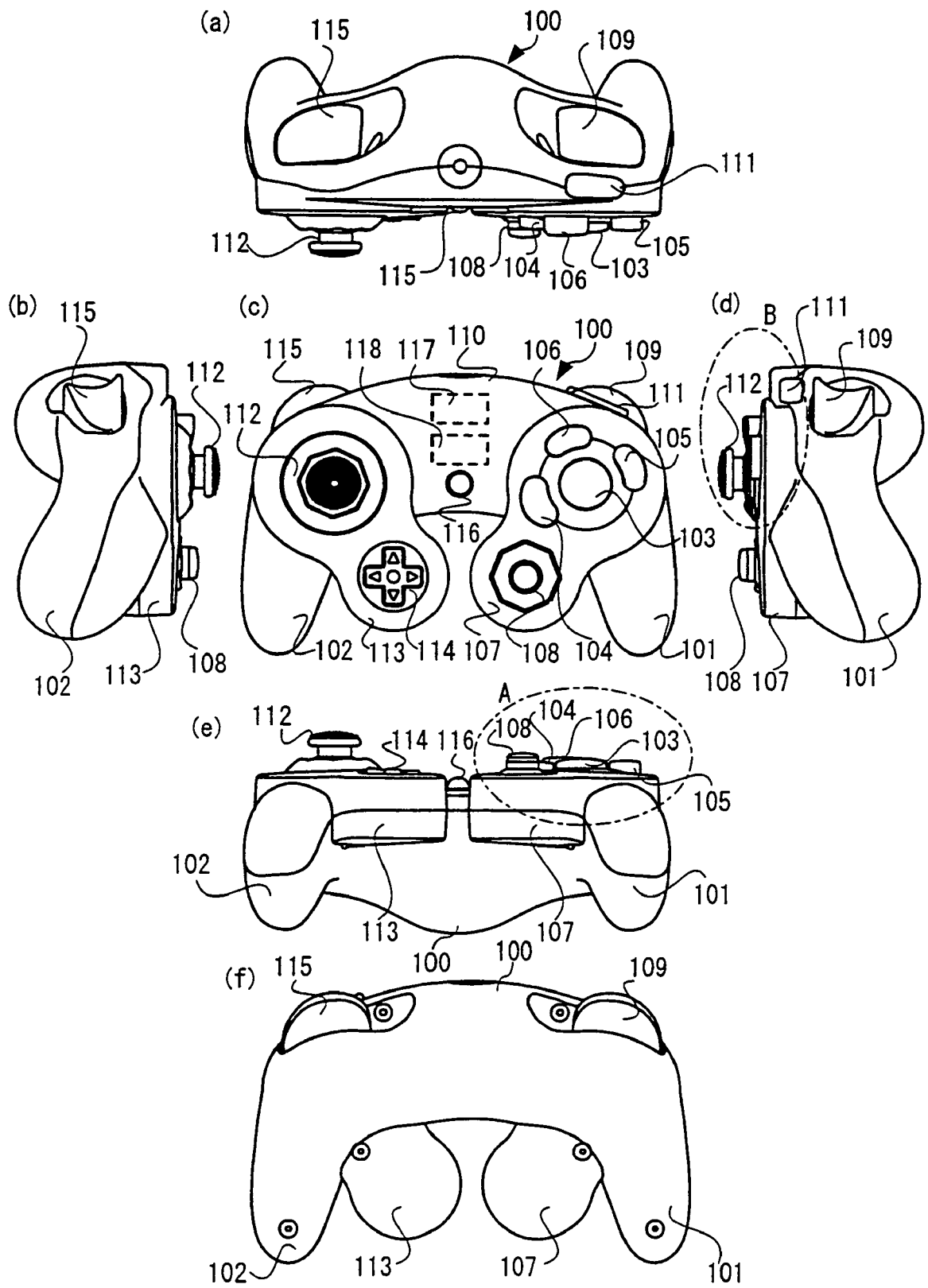
FIG. 2 is a hexagonal chart showing a controller of this embodiment.

FIG. 2 is a hexagonal chart of the controller 1. FIG. 2(*a*) is a top view, FIG. 2(*b*) is a left side view, FIG. 2(*c*) is a front view, FIG. 2(*d*) is a right side view, FIG. 2(*e*) is a bottom view, and FIG. 2(*f*) is a rear view. The controller 1 includes a housing 100. A grip 101 and a grip 102 are formed at a lower portion of right and left sides of the housing 100. The grip 101 or the grip 102 is held in such a manner as to be gripped by a middle finger, a third finger and a little finger of a right or left hand of the player.

In a vicinity of a right side surface of one main surface of the housing 100 (surface indicated by FIG. 2(*c*)), an A button 103, a B button 104, an X button 105, and a Y button 106 are arranged. The A button 103 serves as a main switch, and the B button 104, the X button 105 and the Y button 106 serve as sub-switches. These operating switches are operated by a right-hand thumb finger, and primarily used for instructing or designating a movement or action of a character (principal character or the like) in a game.

In a vicinity of a left side surface of one main surface of the housing 100 (surface indicated by FIG. 2(*c*)), a main analog joystick 112 is arranged. This operating switch is operated by a left-hand thumb finger, and primarily used for instructing or designating a movement direction or an action direction of the character (principal character or the like) in the game.

Note that an arranging position of a cluster of the operating switches 103, 104, 105, and 106 for instructing the action and the operating switch 112 for instructing the movement direction may be reversed right to left and vice versa.

A right protrusion 107 is formed at a left side (at a lower oblique left of the switch 103) of the grip 101. The protrusion 107 is provided with a sub-analog joystick 108 arranged at a position to which a right-hand thumb finger slides from the A button 103 to left. A left protrusion 113 is formed at a right side (at a lower oblique right of the main analog joystick 112) of the grip 102. The left protrusion 113 is provided with a cross button 114 arranged at a position to which a left-hand thumb finger slides from the main analog joystick 112 to right. The cross button 114 has a cross-shaped key top capable of instructing to move in four directions, up, down, right and left, for example, and four digital switches each of which corresponds to each four direction. The sub-analog joystick 108 and the cross button 114 are primarily used for instructing or designating a moving direction of a character (leading character, etc.) in the game.

In addition, an R switch 109 is arranged at a side surface of the housing 100 positioned at an upper portion of the cluster of the operating switches 103, 104, 105, and 106 for instructing the action. The R switch 109 is to be operated by a right-hand index finger of the player, and although different depending on a content of the game program, primarily used for instructing a movement other than an instruction of a moving direction of the character such as "accelerate", "punch", etc. Furthermore, a Z button 111 is arranged in a vicinity of the R switch 109.

Furthermore, an L switch 115 is formed at a side surface of the housing 100 positioned at an upper portion of the main analog joystick 112. The L switch 115 is to be operated by a left-hand index finger of the player, and a same kind of switch as the aforementioned R switch 109.

A start switch 116 is formed on the controller 1 at an approximately center portion of the housing 100 (intermediate portion between the A button 103 and the analog joystick 112) and at a position to be operationable by either a right-hand thumb finger or a left-hand thumb finger. The start switch 116 is a digital switch.

Next, descriptions are hereinafter given in detail with respect to the cluster of the operating switches 103, 104, 105, and 106 for instructing or designating a movement or action which is one of advantages of the present invention. The A button 103 is arranged at an approximately center of the cluster of these operating switches, and designed to be large in size. In addition, the A button is preferably arranged to be at a position in a vicinity of a right-hand thumb finger when an average player holds the grip 101 by right hand. For a reason of good operability, the A button 103 is also preferably assigned as a button with high usage frequency.

At a left side of the A button 103, the B button 104 is arranged, at a right side thereof, the X button 105 is arranged, and at an upper portion thereof, the Y button 106 is arranged. Thus, since sub-switches 104-106 are arranged to be dispersed at a circumference of the A button 103 which is a main switch, it is possible to operate by slightly shifting from the main switch right to left or up to down, thus a good functionality or operability.

In addition, below the A button 103 (toward a direction of a stem or root of the thumb finger from the A button 103), no sub-switch is provided so as not to become an obstacle when the A button 103 is depressed by the right-hand thumb finger. Accordingly, it is possible to prevent from erroneously depressing another switch when operating a frequently used A button 103.

Figure 3:
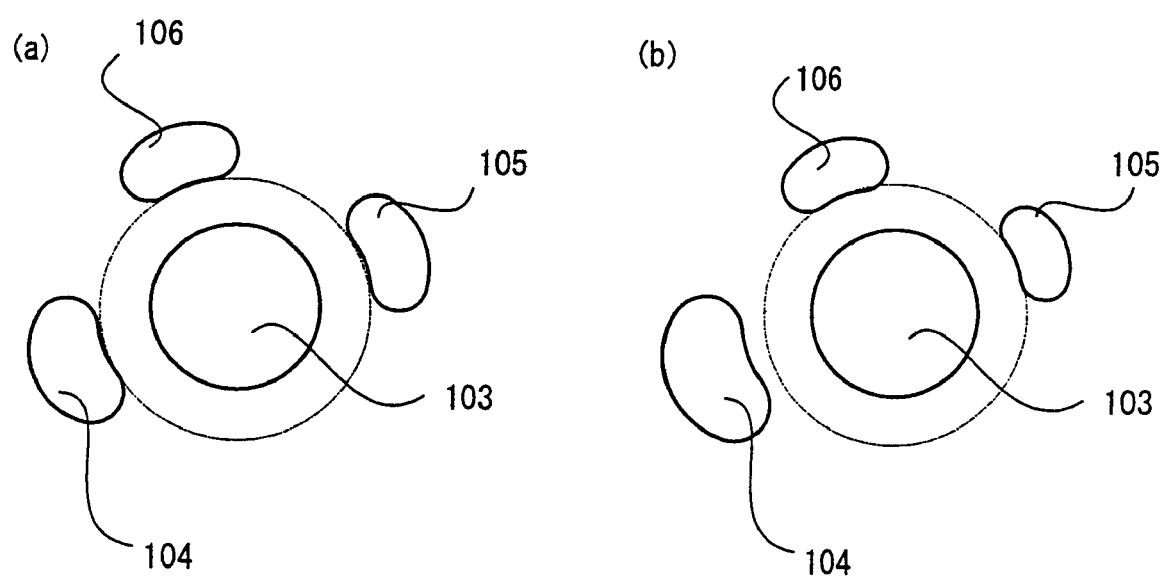
FIG. 3 is an illustrative view showing positions of sub-switches arranged at a circumference of a main switch.

Preferably, the sub-switches (B button 104, X button 105, and Y button 106) are provided on a concentric circle centering on the A button (FIG. 3(*a*)). Accordingly, each of sub-switches 104-106 is arranged at an equal distance from the main switch, thus easy for the player to intuitively grasp positions of the sub-switches. Note that respective sub-switches may have an outer edge portion thereof arranged on the concentric circle, or a center portion thereof arranged on the concentric circle.

In a case that the respective sub-switches are different in size, e.g. in a case that a given sub-switch (B button 104, for example) is larger in size compared to other sub-switches (X button 105 and Y button 106, for example) as shown in FIG. 3(*b*), for example, the sub-switch in question (B button 104) may be arranged to be distant from the main switch 103. By doing this, it becomes possible to prevent an erroneous operation by securing a distance between a relatively large sub-switch in size and the main switch.

Furthermore, it is preferred that the sub-switch be a flat shape in a circular direction (shape extending along an outer periphery of a shape of the A button, a pea-shaped as of this embodiment, for example). Accordingly, the distance between the main switch and each sub-switch is shortened. Therefore it becomes easier to depress simultaneously and successively, and results in less erroneous operations. The reasons are described hereinafter.

Figure 4:
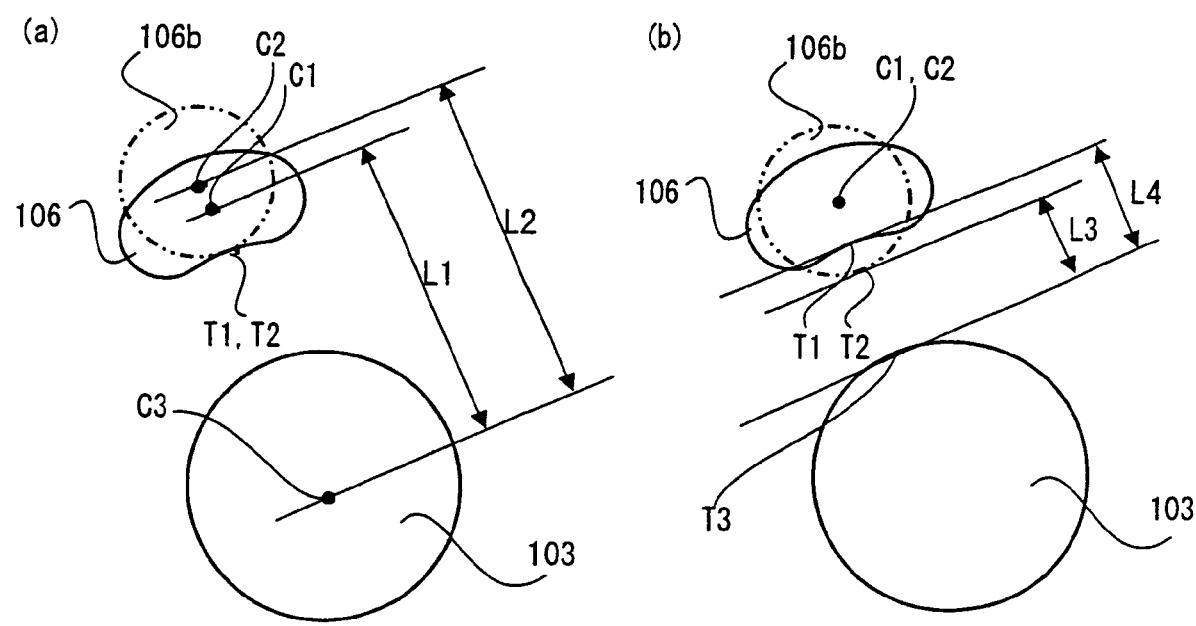
FIG. 4 is an illustrative view showing an advantage in a case that a shape of a sub-switch is brought into a shape extending along an outer periphery of a plane shape of the main switch.

FIG. 4 is an illustrative view which compares an extending-shaped sub-switch and a circular sub-switch. Herein, a center (center of gravity) of the extending-shaped sub-switch indicated by a solid line is C1, an end point closer to the main switch is T1, and in addition, a center (center of gravity) of the circular sub-switch 106*b* indicated by a two-dotted line is C2, and an end point closer to the main switch 103 is T2. Furthermore, a center of the main switch 103 is C3, and an end point closer to the sub-switch is T3. Note that a surface area of the extending-shaped sub-switch 106 and a surface area of the circular sub-switch 106 *b* are equal to each other.

In order to facilitate the simultaneous depressing and the successive depressing, the closer a distance among respective operating switches (intercentral distances, to be precisely), the easier to operate. Referring to FIG. 4(a), provided that the end point T1 and the T2 be same in position, a distance L1 between the center C1 of the extending-shaped sub-switch 106 and the center C3 of the main switch 103 is shorter compared to a distance L2 between the center C2 of the circular sub-switch 106b and the center C3 of the main switch 103 (L1<L2). That is, by bringing the sub-switch into an extending shape, the intercentral distances between the main switch become shorter, thus easier to simultaneously or successively depress the main switch and the sub-switch.

On the other hand, in a case of separately depressing each operating switch, the erroneous operation is minimized when distances among each operating switch (distance between outer edges of respective operating switches, to be precisely) are remote to a certain degree. Referring to FIG. 4(b), if the center C1 and the center C2 are same in position, a distance L4 between the end point T1 of the extending-shaped sub-switch 106 and the end point T3 of the main switch 103 is longer compared to a distance L3 between the end point T2 of the circular sub-switch 106b and the end point T3 of the main switch 103 (L3<L4). That is, by bringing the sub-switch into an extending-shape, the distances between the outer edges of the main switch and the sub-switch become remote, thus reducing the erroneous operation.

Figure 5:
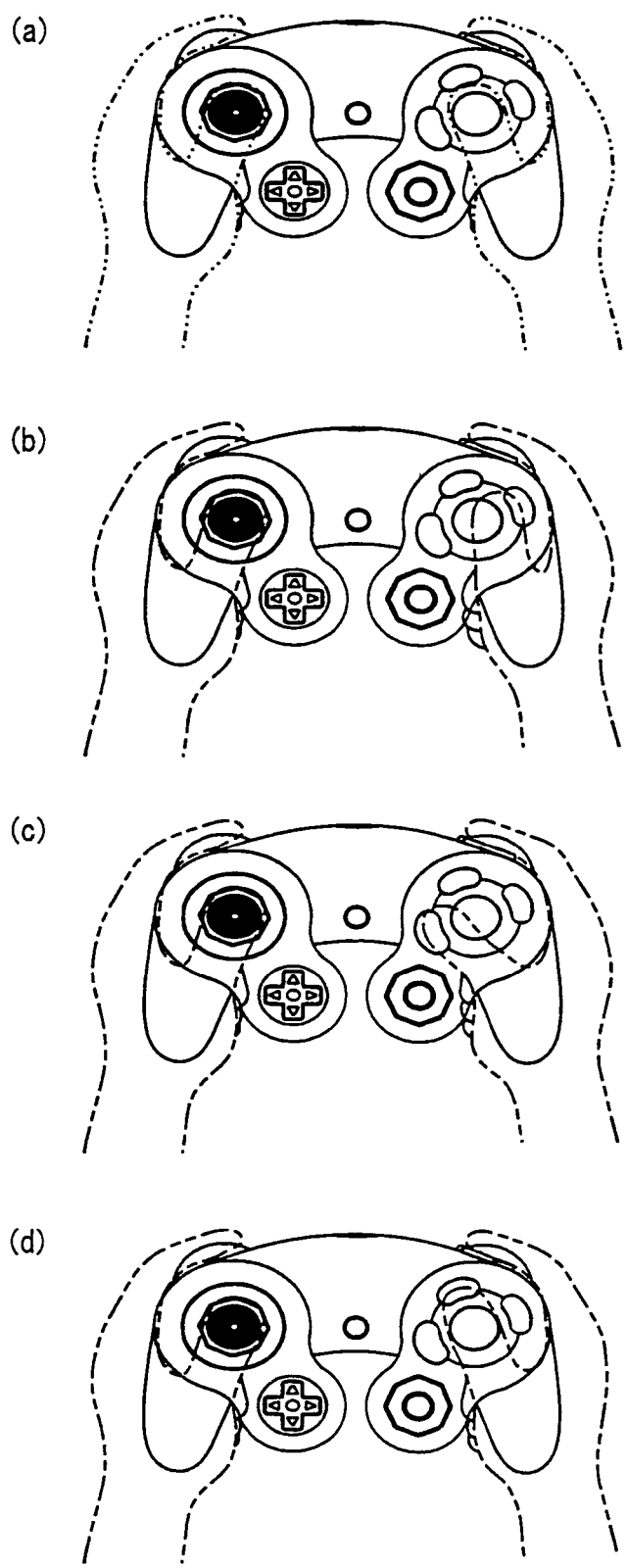
FIG. 5 is an illustrative view showing one example of an operating state of a controller.

A case that the A button 103 is depressed by the right-hand thumb finger is shown in FIG. 5(a). A case that the A button 103 and the X button 105 are simultaneously depressed is shown in FIG. 5(b). Likewise, a case that the A button 103 and the B button 104 are simultaneously depressed is shown in FIG. 5(c), and a case that the A button 103 and the Y button 106 are simultaneously depressed is shown in FIG. 5(d). Furthermore, a case that three buttons, that is, the A button 103, the X button 105 and the Y button 106 are simultaneously depressed is shown in FIG. 6(a). A case that three buttons, that is, the A button 103, the B button 104 and the Y button 106 are simultaneously depressed is shown in FIG. 6(b). As understood from these, the A button 103 is easy to operate, and the A button 103 and each sub-switch are easy to simultaneously depress (as with a case of the successive depressing).

Figure 7:
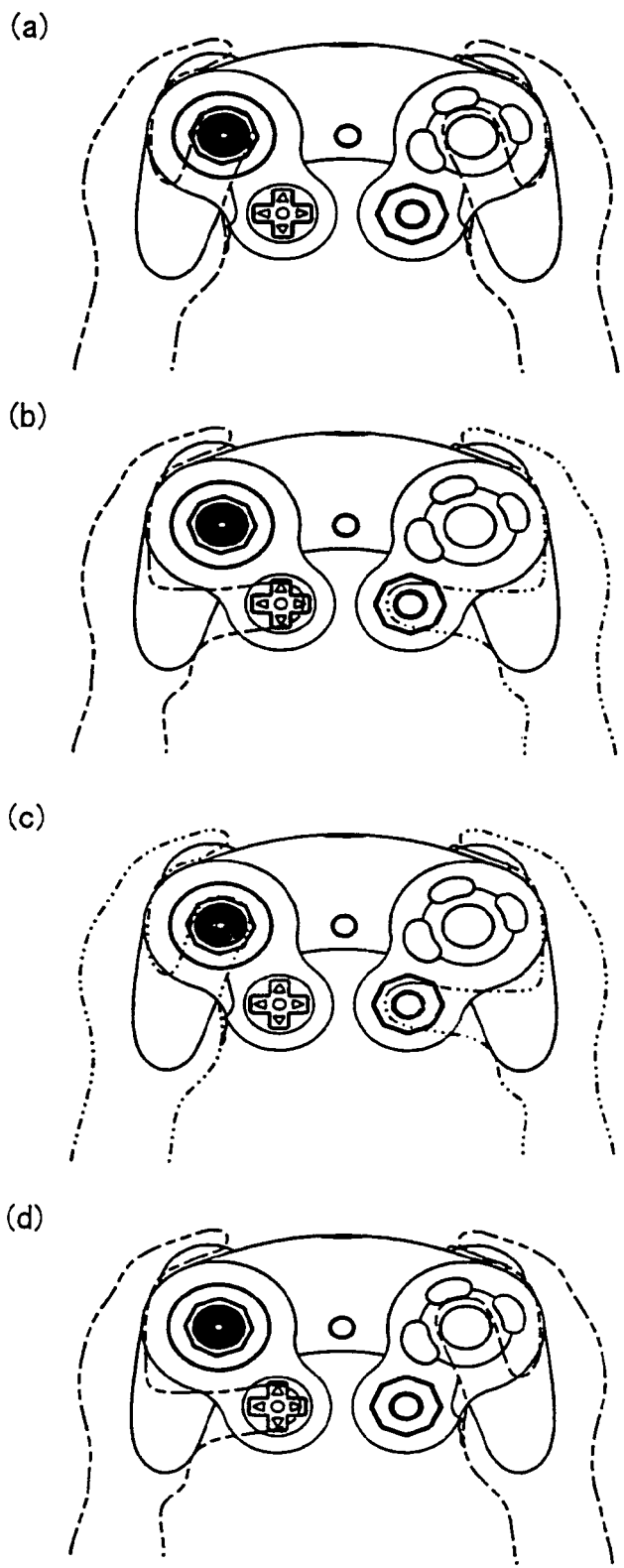
FIG. 7 is an illustrative view showing still another example of an operating state of the controller.

Note that FIG. 7(a) shows a case that the main switch 103 is operated by a right hand, and the main analog joystick 112 is operated by a left hand, FIG. 7(b) shows a case that the sub-analog joystick 108 is operated by a right hand, and the cross key 114 is operated by a left hand, FIG. 7(c) shows a case that the sub-analog joystick 108 is operated by a right hand, and the main analog joystick 112 is operated by a left hand, and FIG. 7(d) shows a case that the main switch 103 is operated by a right hand and the cross key 114 is operated by a left hand.

Figure 8:
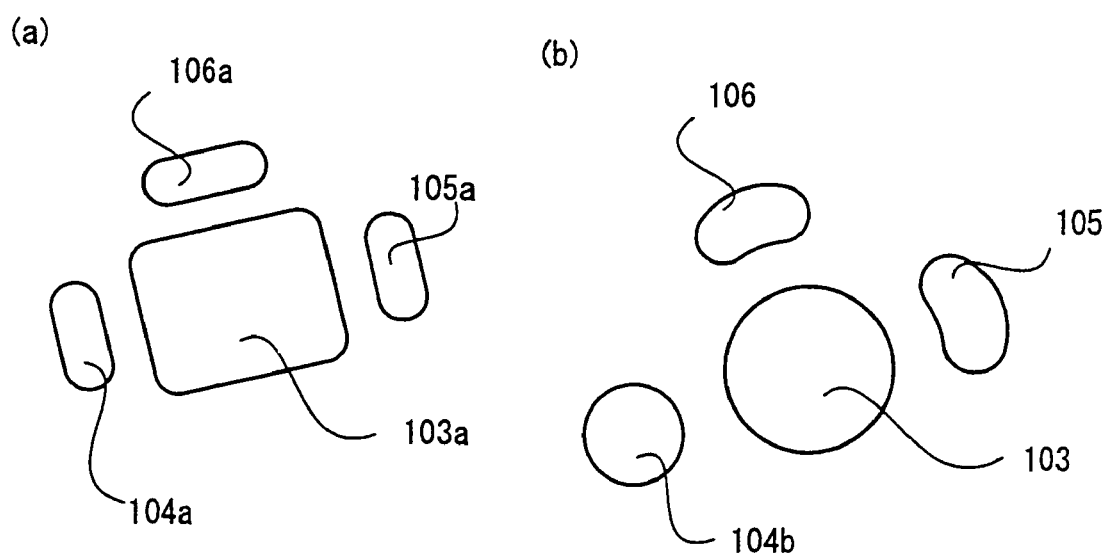
FIG. 8 is an illustrative view showing a modified example of the main switch and the sub-switches.

In addition, rectangle-shaped sub-switches 104a, 105a, and 106a may be arranged at a circumference of a square-shaped main switch 103a as shown in FIG. 8(a). Furthermore, the sub-switch may simply be a circular shape 104b as shown in FIG. 8(b) instead of a shape extending along an outer periphery of the shape of the A button. Note that in this case, no effect described by referring to FIG. 4 is expected.

Figure 9:
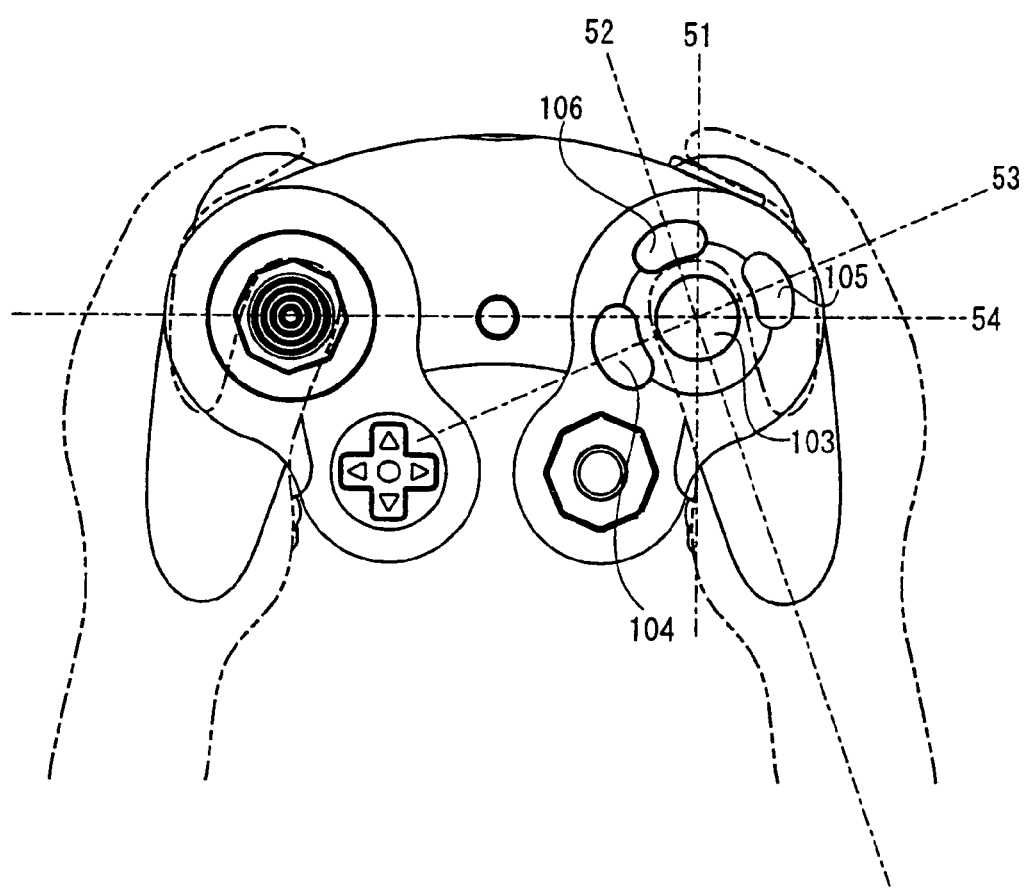
FIG. 9 is an illustrative view showing that the main switch and the sub-switches are arranged on a slanted axis.

Referring to FIG. 9, descriptions are made with respect to slanting a positioning relationship of each operating switch. The Y button 106 is placed above the A button 103, and arranged on a first axis (axis 52) having a longitudinal axis (axis 51) of the housing passing a center of the A button 103 slanted toward a counterclock direction by a predetermined degree or angle. Note that if a longitudinal direction is a lateral axis (axis 54) in a horizontally extending housing, the longitudinal axis (axis 51) of the housing is an axis orthogonally intersecting the axis 54.

Herein, the first axis (axis 52) is preferably selected to be in a direction toward which the thumb finger naturally faces when the player holds the housing 100. When the player holds the housing 100, his thumb finger turns to an inner side direction. Therein, the first axis (axis 52) is an axis having the longitudinal axis (axis 51) slanted in a counterclock direction by a predetermined degree or angle. Note that in a case that the cluster of the operating switches 103, 104, 105, and 106 for instructing a movement or action is provided at a left side area of the housing 100, the first axis (axis 52) is an axis having the longitudinal axis (axis 51) slanted in a clock direction.

Accordingly, the Y button 106 is placed at a position to which the thumb finger naturally extends, and therefore, unnecessary force is not imposed on the thumb finger when operating the Y button, thus easy to operate.

The B button 104 and the X button 105 are arranged on an axis (axis 53) passing through a center of the A button 103 and orthogonally intersecting the first axis (axis 52). Note that although it may be possible to be arranged above or below the axis (axis 53) angular to the first axis, in a case of being arranged below, the B button 104 and the X button 105 are to be arranged at a position not to interfere the thumb finger operating the A button 103. In addition, the B button 104 and the X button 105 are preferably arranged at a symmetrical position with respect to the first axis (axis 52).

Accordingly, a direction to which the thumb finger naturally faces when the player holds the housing being a reference, the B button 104 and the X button 105 can be operated by moving the thumb finger to a left or a right direction from the reference, hence a good operability.

It is preferred that the grips 101 and 102 are protruded in a direction approximately parallel to the first axis 52. Accordingly, the thumb finger of the player is naturally faced to the first axis direction. However, even in a case that the grips 101 and 102 are not protruded in a direction approximately parallel to the first axis 52 (in a case of protruding in a direction approximately parallel to the longitudinal axis 51 of the housing 100, for example), there is no need that a protruding direction of the grips 101 and 102 is a direction approximately parallel to the first axis 52 because it is sufficient if a direction of the thumb finger is naturally faced to the first axis 51.

Figure 10:
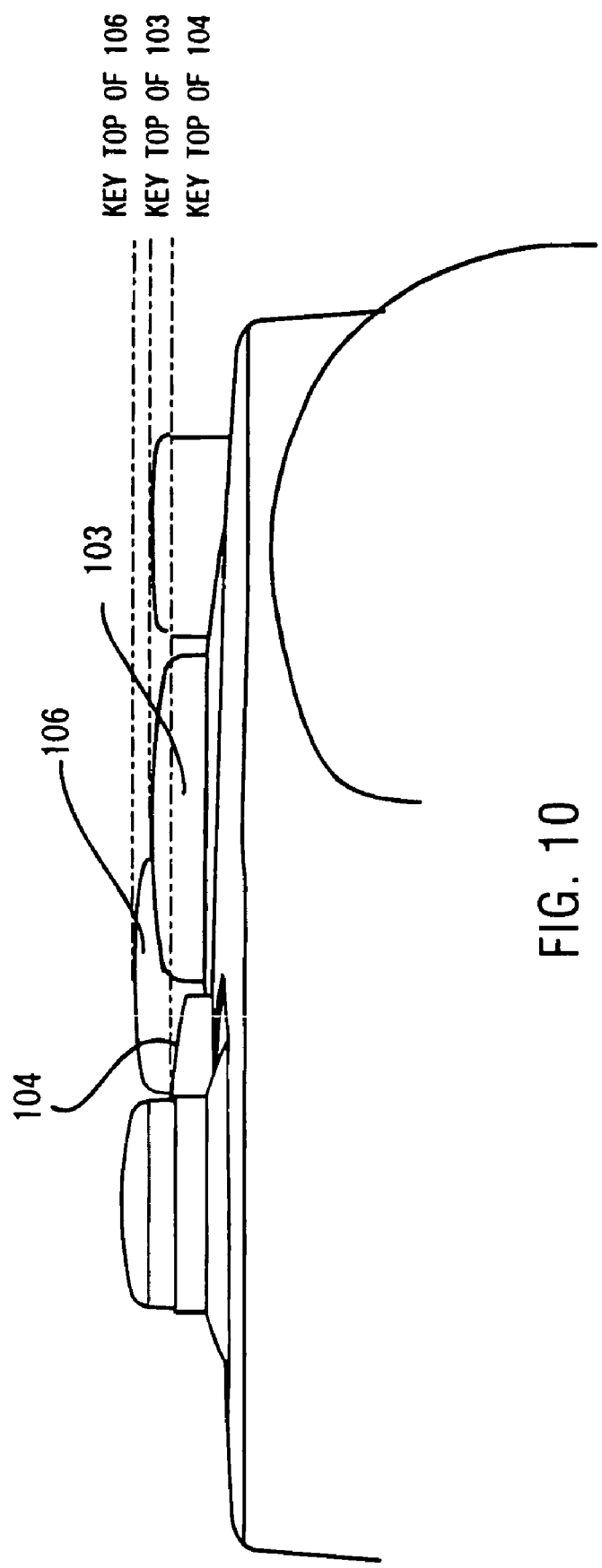
FIG. 10 is an illustrative view showing a difference in height between key tops of the main switch and the sub-switches.
Figure 11:
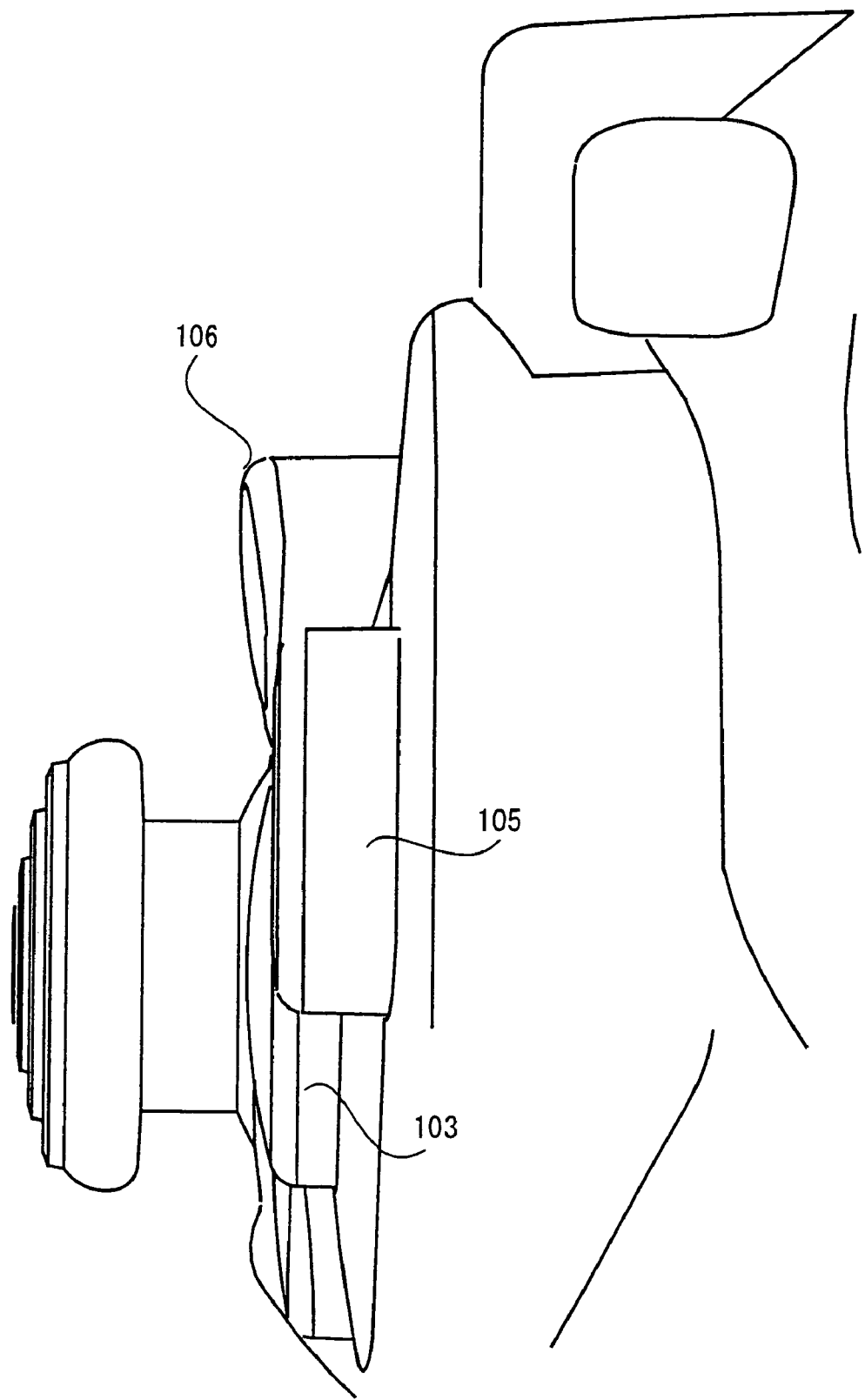
FIG. 11 is an illustrative view showing an inclination of a Y button.

FIG. 10 is an enlarged view of a right-hand operating area of the controller 1 (A area in FIG. 2(e)). The key top of the Y button 106 arranged at an upper portion of the housing than the A button 103 is designed to be higher than the key top of the A button 103. That is, by making the key top of the operating switch (Y button 106) remotely placed from the thumb finger higher, a distance from the thumb finger to the key top becomes to be shortened, thus resulting in a good operability or functionality. At this time, the key top of the Y button 106 may be in such a shape as to be gradually lowering from an upper portion direction of the housing to a lower portion direction of the housing (see FIG. 11 which is an enlarged view of a B area in FIG. 2(d)).

Also, the key top of the B button 104 provided at a left portion of the A button 103 is designed to be lower than the key top of the A button 103. In doing so, it is possible to obtain an operating sensation in which the thumb finger is naturally placed on the key top of the B button 104 when rotating the thumb finger from the A button to a left direction.

Note that the key arrangement and structure in the above mentioned embodiment is applicable to a controller having no grip shown in FIG. 12(a), and also applicable to a portable game apparatus shown in FIG. 12(b).

The A button 103 and the B button 104 described above have a function as a digital switch and a function as an analog switch. The function as an analog switch is a function which outputs digital data of eight bits indicated by a numerical value of 0-255, for example, in proportion to a depressing depth (or a force) according to a principle of a variable resister, a variable capacitor, or the like. The function as a digital switch is a function which detects a switch-on or -off, and outputs digital data of one bit. Note that in below descriptions, a digital output of the A button 103 is described as "A button 103 (digital)", and an analog output of the A button 103 is described as "A button 103 (analog)" (also true of the B buttons). Note that a detecting mechanism of the A button 103 and the B button 104 are described later by referring to FIG. 19.

In addition, the X button 105, the Y button 106, and the Z button 11 are digital switches, and the R switch 109 and the L switch 115 have a function as a digital switch and a function as an analog switch similar to the A button 103 and the B button 104. However, a detecting mechanism of the R switch 109 and the L switch 115 is different from the detecting mechanism of the A button 103 and the B button 104. The detecting mechanism of the R switch 109 and the L switch 115 are described later by referring to FIG. 13 to FIG. 18. Note that in below descriptions a digital output of the R switch 109 is described as "R switch 109 (digital)", and an analog out of the R switch 109 is described as "R switch 109 (analog)" (also true of the L switch 115).

Furthermore, as indicated by a dotted line in FIG. 2(c), a vibration motor 117 and a jolting sensor 118 are contained within the housing 100 of the controller 1. The vibration motor 117 is a motor to which an eccentric weight is attached, and generates a vibration by its rotation according to a command from the game machine main body 2 so as to give a vibrating sensation to the player who grips the controller 1.

The jolting sensor 118 is an impact sensor used in a passometer, for example, and outputs "1" when an impact more than a predetermined level is applied to the controller 1, and outputs "0" to the contrary thereto. A game which takes advantage of the output of the jolting sensor 118 may be a game which takes advantage of an impact which a player deliberately applies to the controller 1 (an object in a game being oscillated by swaying the controller, etc), or a game which uses an impact which the player does not deliberately apply to the controller 1, (in a case that the controller is wildly oscillated out of total immersion into the game, that the controller is mistakenly operated as a result of being surprised at a game screen, and etc, for example).

Figure 13:
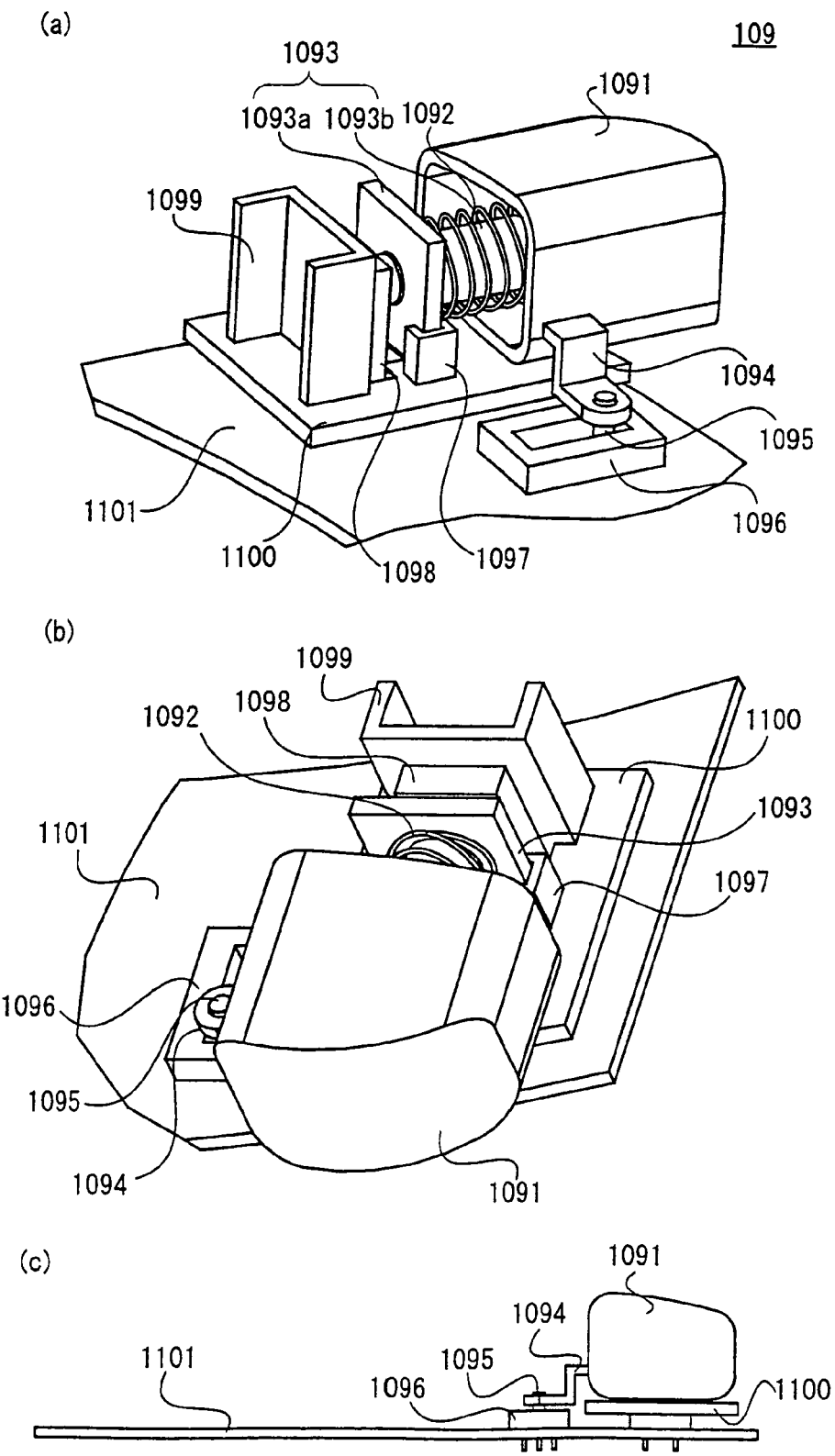
FIG. 13 is an illustrative view showing structure of an R switch.
Figure 14:
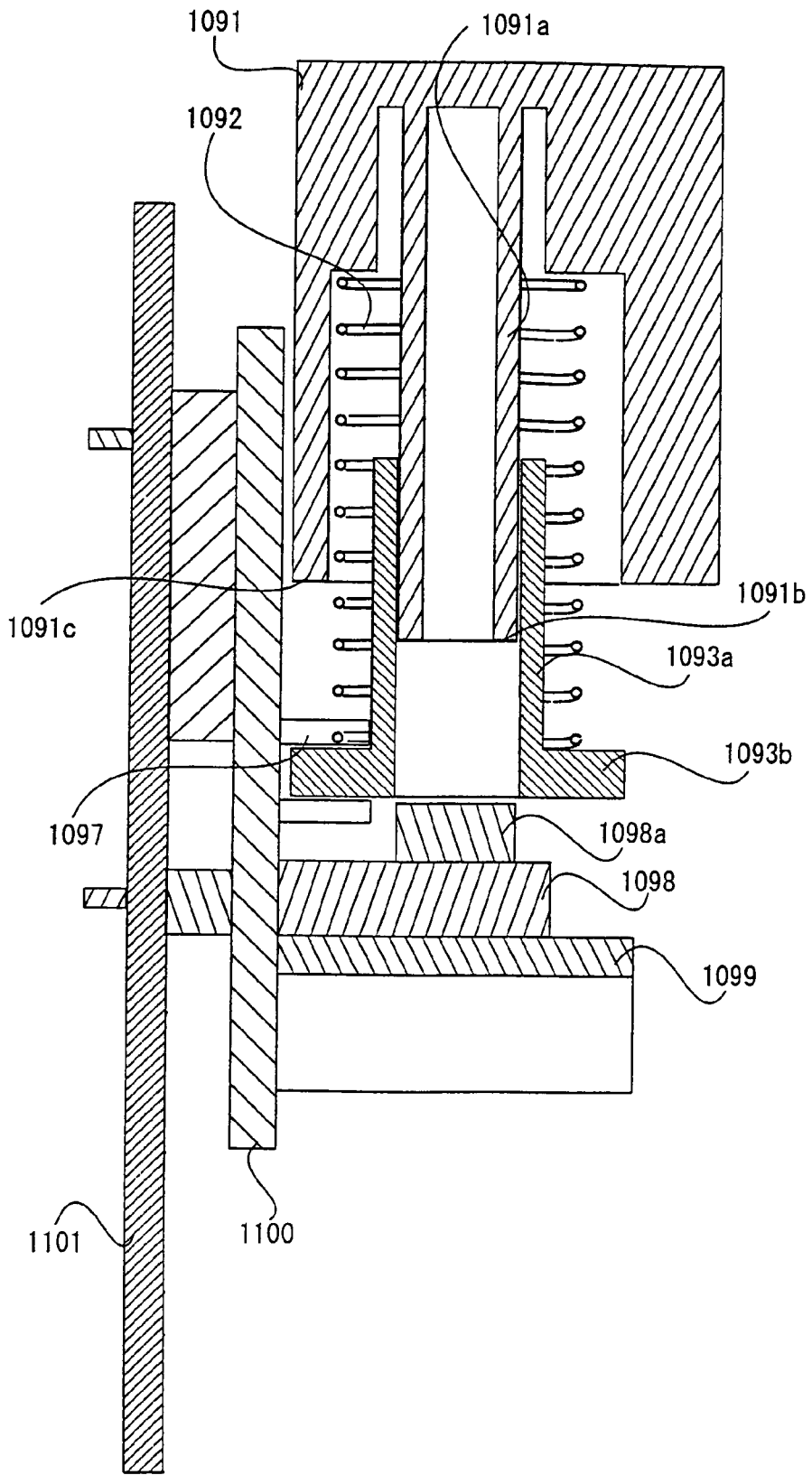
FIG. 14 is a sectional illustrative view showing an operating state (release) of the R switch.
Figure 15:
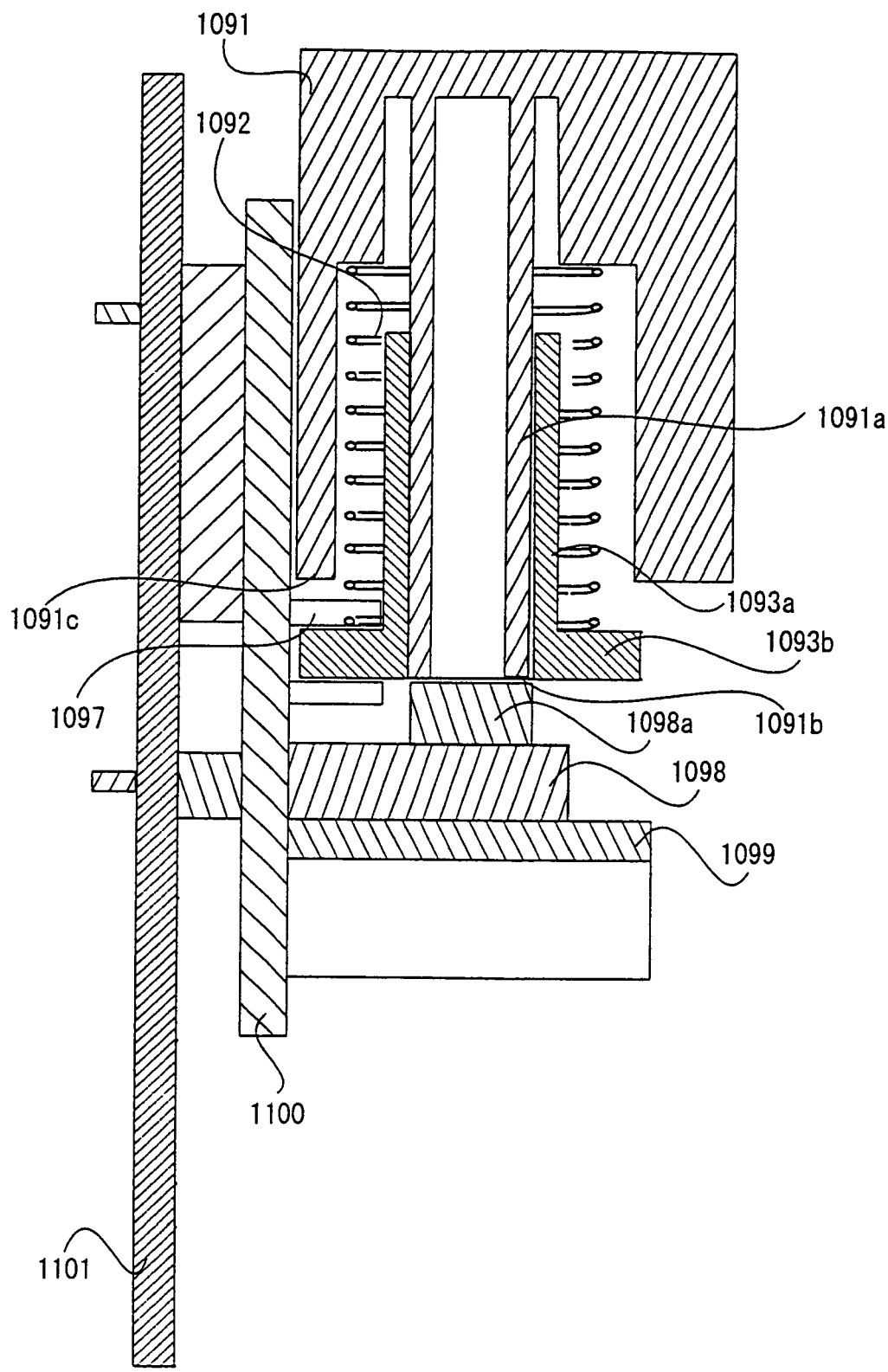
FIG. 15 is a sectional illustrative view showing an operating state (half depressed) of the R switch.
Figure 16:
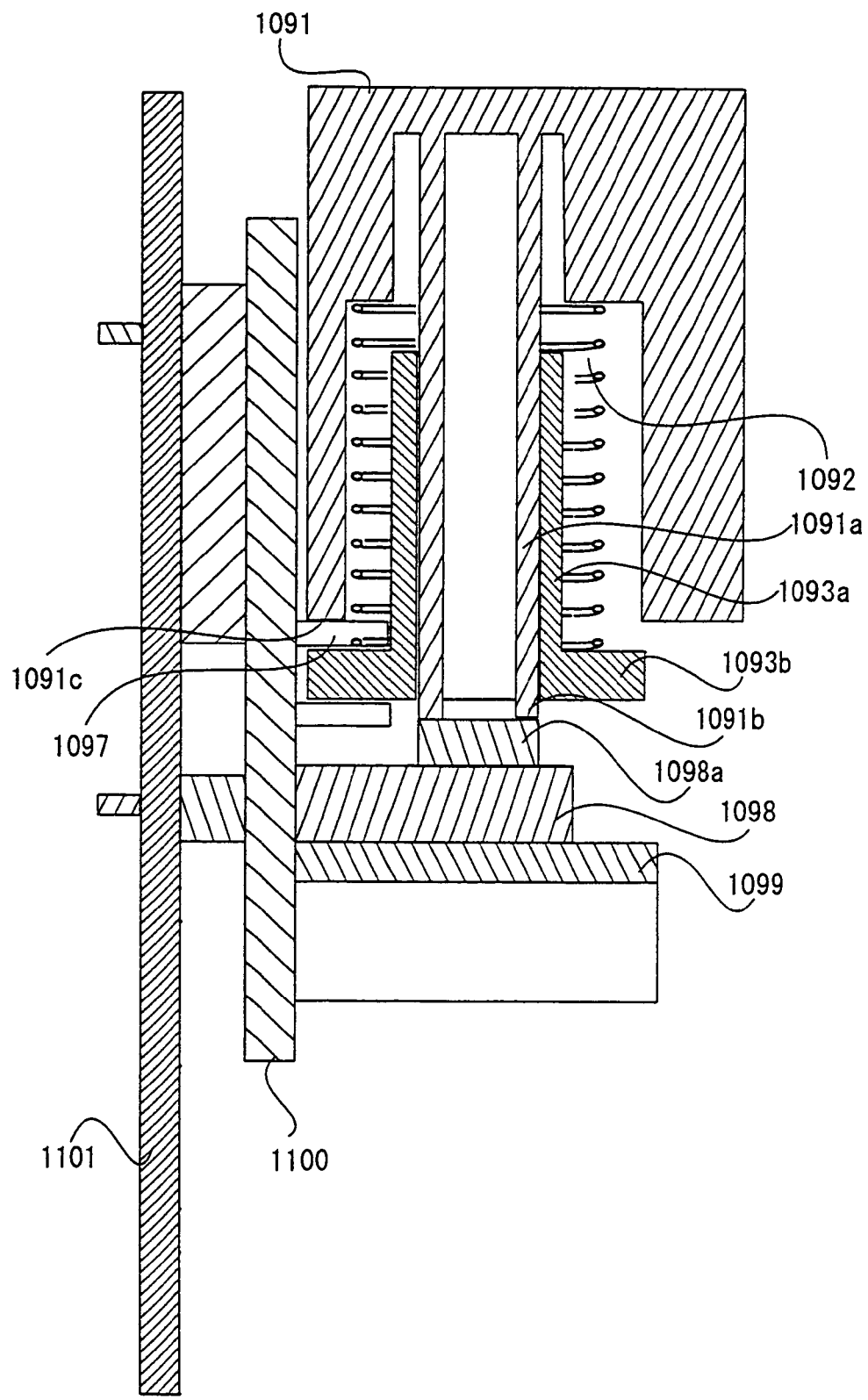
FIG. 16 is a sectional illustrative view showing an operating state (completely depressed) of the R switch.

Next, by referring to FIG. 13 to FIG. 18, descriptions are made with respect to the mechanism of the R switch 109 (the L switch 115 has a likewise mechanism). FIG. 13 is an appearance view of the R switch 109, and FIG. 14 to FIG. 16 are sectional views. By referring to FIG. 13, the R switch 109 is formed with an operating portion 1091, a spring 1092, an operating portion base 1093, a joint portion 1094, a slide rod 1095, a guide 1096, a stopper 1097, a digital switch 1098, a digital switch base 1099, and a pedestal 1100, and secured to a substrate 1101 of the controller 1.

A mechanism in which the operating portion 1091 moves upwardly and downwardly is realized by the operating portion 1091, the spring 1092, and the operating portion base 1093. The operating portion 1091 is a part to which a finger of the player contacts, and has a cylindrical portion 1091a inside thereof as shown in FIG. 14. The operating portion base 1093 is formed of a cylindrical portion 1093a having a hollow inner portion and a pedestal portion 1093b as shown in FIG. 14. The cylindrical portion 1091a of the operating portion 1091 is inserted into the hollow portion of the cylindrical portion 1093a of the operating portion base 1093, and capable of moving upward and downward along the hollow portion. The spring 1092 is arranged at a circumference of the cylindrical portion 1093a of the operating portion base 1093. The spring 1092 supports the operating portion 1091, and if the player depresses the operating portion 1091, the spring 1092 is compressed, and the operating portion 1091 moves downward while having a resistor due to an elasticity.

A variable resistor mechanism varied in response to a position of the operating portion 1091 is realized by the joint portion 1094, the slide rod 1095, and the guide 1096. One tip end of the joint portion 1094 is fixed to a side surface of the operating portion 1091, and moves in conjunction with a movement of the operating portion 1091. The slide rod 1095 is firmly fixed to the other tip end of the joint portion 1094. The slide rod 1095 is inserted into the guide 1096 attached to the substrate 1101, and moves in conjunction with a movement of the joint portion 1094 along the guide 1094. A resistance value of the variable resistor changes due to the movement of the slide rod 1095, and an analog value in accordance with a position of the slide rod 1095 is output.

The digital switch 1098 is provided below the operating portion base 1093. In addition, the stopper 1097 for restricting the operating portion 1091 to move downward is secured to a side surface of the operating portion base 1093. The digital switch 1098 is attached to the digital switch base 1099. The base 1093, the stopper 1097, and the digital switch base 1099 are fixed to the pedestal 1100. The pedestal 1100 is secured to the substrate 1101.

When the R switch 109 becomes a maximum depressed state, and the operating portion 1091 moves to a lowermost position, a tip end 1091b of the cylindrical portion 1091a of the operating portion 1091 turns on the digital switch 1098, and this is described in detail by referring to FIG. 14 to FIG. 16. FIG. 14 to FIG. 16 are sectional views of the R switch 109. FIG. 14 is an illustrative view showing a state where the R switch 109 is not operated by a player. In this state, the operating portion 1091 is supported by the spring 1092, and positioned at an upper portion. The tip end 1091b of the cylindrical portion 1091a of the operating portion 1091 is positioned at an intermediate portion of the hollow portion within the cylindrical portion 1093a of the operating portion base 1093.

FIG. 15 is an illustrative view showing a state where the player depresses the R switch 109. The operating portion 1091 pushes-down and compresses the spring 1092. Although positioned lower than a state shown in FIG. 14, the tip end 1091b of the cylindrical portion 1091a of the operating portion 1091 has not come to contact the digital switch 1098. Furthermore, there is a gap between a tip end 1091c of an outer side portion of the operating portion 1091 and the stopper 1097.

FIG. 16 is an illustrative view showing a state where the player has completely pushed-down the R switch 109. The operating portion 1091 further squeezes and compresses the spring 1092, and is located at a lowermost position. At this time, the tip end 1091c of the outer side portion of the operating portion 1091 contacts the stopper 1097, and the operating portion 1091 is restricted not to move further downward. In addition, the tip end portion 1091b of the cylindrical portion 1091a of the operating portion 1091 contacts and depresses the digital switch 1098, and the digital switch 1098 is rendered an on-state.

Accordingly, first, the R switch 109 serves as an analog switch. More specifically, the operating portion 1091 moves when operating the R switch 109, and an analog value in correspondence to a position of the R switch 1091 is output. Then, when the R switch 109 is completely depressed, the digital switch 1098 is rendered the on-state in conjunction thereto, and the digital value is output therefrom.

FIG. 17 is an illustrative view showing a progressing state of the operation of the R switch 109. FIG. 17(a) is an illustrative view showing a state where the R switch 109 is not operated by the player. The slide rod 1095 of the variable resistor mechanism is placed at an upper most position. FIG. 17(b) is an illustrative view showing a state where the player has depressed the R switch 109. The slide rod 1095 is placed at an intermediate portion. FIG. 17(c) is an illustrative view showing a state where the R switch 109 is completely squeezed as a result that the player further depresses it. The slide rod 1095 is placed at a lowermost position.

FIG. 18 is an illustrative view showing the digital switch 1098. FIG. 18(a) is a sectional view thereof. The digital switch 1098 is formed with an elastic member 1098a, a conductive rubber 1098b, electrodes 1098c, 1098d, and a substrate 1098e. The elastic member 1098a forms a space between the substrate 1098e. The conductive rubber 1098b is secured to an inner upper surface of the space portion at a side of the elastic member 1098e. On the substrate 1098e of the space portion, and at a position opposite the conductive rubber 1098b, the electrodes 1098a and 1098d are attached. FIG. 18(b) is a diagram seen from above. A circular conductive rubber 1098d is fixed to a circular elastic member 1098a, and the electrodes 1098c and 1098d are arranged therebelow.

As mentioned earlier, if the R switch 109 is completely depressed, the tip end 1091b of the cylindrical portion 1091a of the operating portion 1091 pushes down the elastic member 1098a of the digital switch 1098. The elastic member 1098a is deformed and held downward, and the conductive rubber 1098b attached to the elastic member 1098a is also held down. The conductive rubber 1098b contacts the electrodes 1098c and 1098 simultaneously, and causes the electrodes 1098c and 1098d to short-circuit so as to turn on a digital output. Note that of this embodiment, although a click sensation or feeling is applied to the player by a deformation of the elastic member 1098a, it may be also possible to cause the click sensation by using a tact switch, and etc.

Next, by referring to FIG. 19, a mechanism of the A button 103 is described (B button 104 has a similar mechanism). The A button 103 is formed with an operating portion 1031, an elastic member 1032, an analog detecting portion 1033, a conductive rubber 1034, and electrodes 1035a, 1035b and 1036, and attached to the substrate 1101 of the controller 1. The elastic member 1032 forms a space between the substrate 1101. To an inner upper surface of the space portion at a side of the elastic member 1032, the analog detecting portion 1033 and the conductive rubber 1034 are secured. On the substrate 1101 of the space portion and at a position opposite the conductive rubber 1034, the electrodes 1035a and 1035b are attached, and at a position opposite the analog detecting portion 1033, the electrode 1036 is attached. The analog detecting portion 1033 and the electrode 1036 are to form a variable capacitor, and change an electrostatic capacity in accordance with an area that the both are opposed or overlapped.

Firstly, descriptions are made with respect to a mechanism of the A button 103 as a digital switch. If a player depresses the operating portion 1031, the elasticity portion 1032 is downwardly held down in association therewith. Then, the conductive rubber 1034 is downwardly held down, and then contacted with the electrodes 1035a and 1035b simultaneously, thereby to short-circuit the electrodes 1035a and 1035b, and also to turn on the digital output.

If the A button 103 is further depressed (if a force is applied) from a state where the digital output is turned on (a state where short-circuited by contacting the conductive rubber 1034 to the electrodes 1035a and 1035b), the conductive rubber is crushed and deformed, and a part of the analog detecting portion 1033 and the electrode 1036 are overlapped. If the A button is still further depressed (if a force is applied) from this state, the conductive rubber 1034 is further deformed, then area that the analog detecting portion 1033 and the electrode 1036 are overlapped becomes larger. Thus, opposite area or overlapped area between the analog detecting portion 1033 and the electrode 1036 becomes increasingly larger by further depressing the A button 103 from a state where the digital output is turned on, and the electrostatic is changed in association therewith, thereby to output the analog value in response to an operating amount of the A button.

As described above, both the R switch 109 (also true of the L switch 115) and the A button 103 (also true of the B button 104) are provided with a function as a digital switch and a function as an analog switch, however, different in mechanism. Firstly, the R switch 109 (also true of the L switch 115) serves as an analog switch, and then serves as a digital switch when a maximum depressing is applied. On the other hand, the A button 103 (also true of the B button 104) firstly serves as a digital switch, and then serves as an analog switch by further depressing (applying force). With respect to a method of usage as a game of the A button 103 (also true of the B button 104), in addition to a function as a digital switch (shot at a goal when depressing the button in a soccer game, for example), it is considered to detect a force to depress the button (that is, a level of excitement of the player) and reflect it to the game by detecting the force to depress the digital button by the analog switch.

Figure 20:
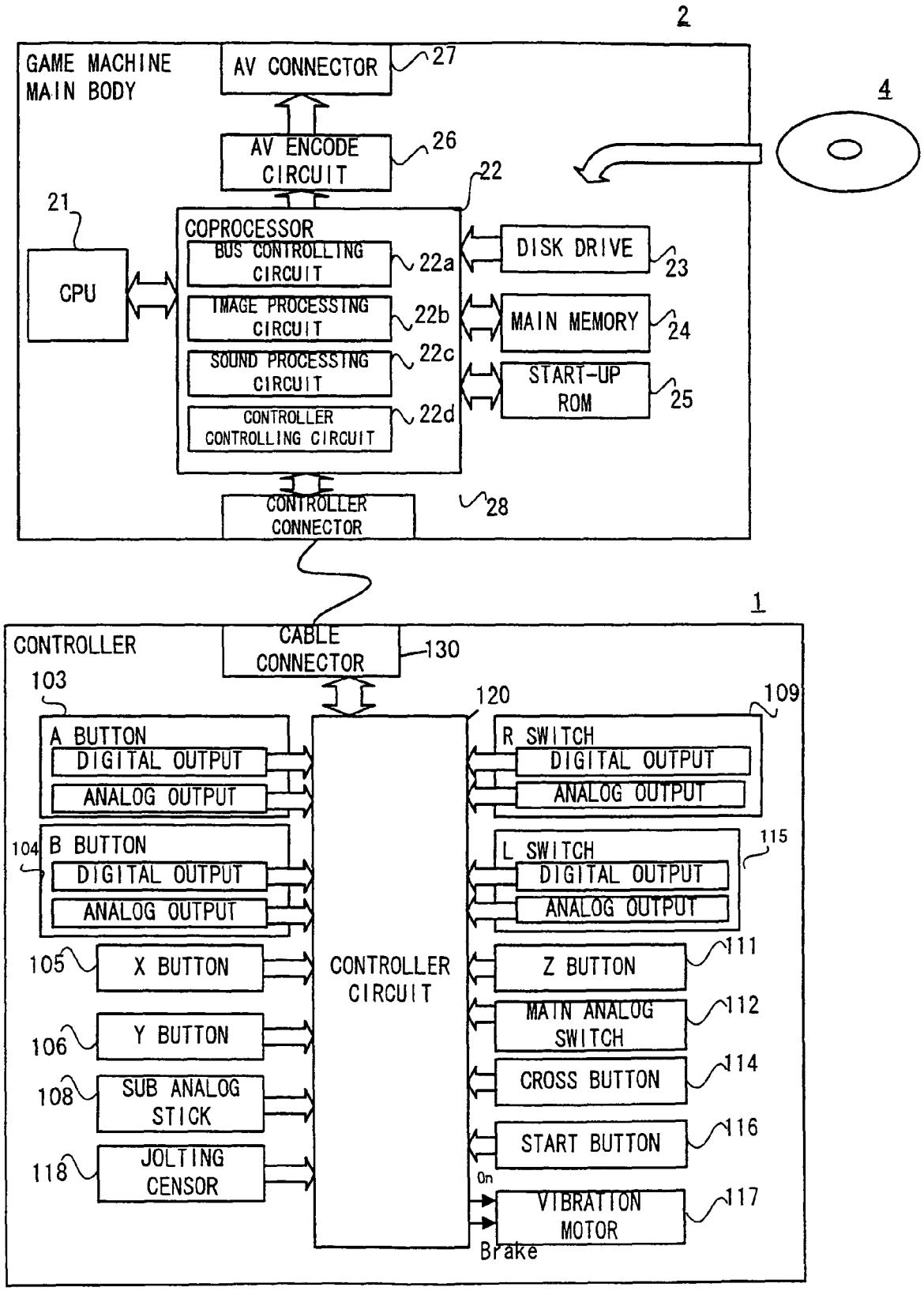
FIG. 20 is a block diagram showing the game machine system of FIG. 1 embodiment.

FIG. 20 is a block diagram of a game machine system of this embodiment. The controller 1 is, as described before, provided with the A button 103, the B button 104, the X button 105, the Y button 106, the sub analog joystick 108, the R switch 109, the Z button 111, the main analog joystick 112, the cross button 114, the L switch 115, and the start button 116, and further internally provided with a controller circuit 120, the vibration motor 117, and the jolting sensor 118. The A button 103, the B button 104, the R switch 109, and the L switch 115 are provided with a digital output and an analog output.

The controller circuit 120 generates operating data described later by referring to FIG. 21 from all inputting means and an output of the jolting sensor 118 in accordance with a command from the game machine main body 2, and also outputs an on signal and a brake signal toward the vibration motor.

The on signal and the brake signal are applied to the vibration motor 117 from the controller circuit 120 according to a command output from the game machine main body 2. The vibration motor 117 continues to rotate during a time period that the on signal is input from the controller circuit 120, and stops rotating when the on signal is not output any more. Herein, the vibration motor 117 of this embodiment continues to rotate (vibrate) due to an inertia for a while after the on signal is not output because a small weight is attached inside the motor. On the other hand, if the brake signal is output from the controller circuit 120, the motor stops rotating (vibrate) instantly because the motor is forcibly stopped. Accordingly, the vibration motor 117 of this embodiment can obtain an appropriate vibration effect in a game by distinguishingly using a stoppage without brake and a stoppage with brake. In addition, the controller 1 is provided with a cable connector 130 to which a cable for sending and receiving data between the game machine main body 2 is connected.

The game machine main body 2 is provided with a central processing unit 21 (hereinafter referred merely to as "CPU"). A coprocessor 22 is connected to the CPU 21. The coprocessor 22 includes a bus controlling circuit 22a, an image processing circuit 22b for generating image data, a sound processing circuit 22c for generating sound data, and a controller controlling circuit 22d. The bus controlling circuit 22a controls a bus to exchange data between the CPU 21 and peripheral circuits (a main memory 24, the image processing circuit 22b, the sound processing circuit 22c, the controller controlling circuit 22d, and etc.). The image processing circuit 22b carries out a polygon coordinate transformation and a light source processing, and lusterizes the polygon data onto an image to be displayed so as to transform into a data format capable of being stored into a frame memory within the main memory 24. The controller controlling circuit 22d receives operating data from one or a plurality of controllers in a bit serial fashion, and also sends a command to the controllers.

In addition to the CPU 21, a disk drive 23, the main memory 24, a start-up ROM 25, an AV encoding circuit 26, and a controller connector 28 are connected to the coprocessor 22. Furthermore, an AV connector 27 is connected to the AV encoding circuit 26.

The disk drive 23 is a device which receives a medium such as a DVD, a CD-ROM or a magnetic disk, and etc. and reads data within the medium. The read data is transferred to the main memory 24 via the bas controlling circuit 22a. Note that it may be constituted by using a cartridge in which a semiconductor memory is used. In this case, a cartridge connector is provided in place of the disk drive 23.

The main memory 24 includes an image data storing area for storing a display list for an image display, image data, and etc., a sound data storing area for storing sound data, a program storing area for storing a game program, and a frame buffer area for storing the image data generated by the image processing circuit 22b to be transformed into display image data to be displayed on a screen. The data read out by the disk drive 23 is stored in the image data storing area, the sound data storing area or the program storing area, and read out by the CPU 21 to be subjected to a predetermined process by the same. A start-up program that the CPU 21 executes first when a power switch of the game machine main body 2 is depressed is stored in the start-up ROM 25.

The AV encoding circuit 26 is a circuit for transforming the image data from the image processing circuit 22b and the sound data from the sound processing circuit 22c into a signal to be output to the television receiver 3. The AV connector 27 is a connector for connecting an AV cable to be connected to the television receiver 3. The control connector 27 is a connector for connecting a cable to be connected to the controller.

Next, a schematic operation of the game machine system of this embodiment is described. First, a player sets the game disk 4 into the disk drive 23. Then, if a power switch (not shown) is depressed, the CPU 21 executes the start-up program stored in the start-up ROM 25. More specifically described, the CPU 21 displays a start-up screen in accordance with the start-up program. Then, a reading command of the game disk 4 is output to the disk drive 23 via the bas controlling circuit 22a of the coprocessor 22. The disk drive 23 reads out data from the game disk 4 in accordance with the command, and outputs it to the bas controlling circuit 22a. The bas controlling circuit 22a writes the read-out data into a predetermined area of the main memory 24. If the disk drive 23 cannot read the data of the game disk because no game disk is inserted therein, a text such as "INSERT DISK", and etc, for example is displayed by using data within the start-up ROM.

The CPU 21 starts a game processing based on the data (the program data, the polygon data, the texture data, and etc.) read from the game disk 4 and written in the main memory 24. In the game processing, the CPU 21, as necessary, outputs a command to the controller circuit 120 of the controller 1. There are a plurality of kinds of commands such as an operating data request command, a vibration on command, and a vibration brake command, for example. These commands are output to the controller circuit 120 via the controller controlling circuit 22d of the coprocessor 22, the controller connector 28, the cable, and the cable connector 130.

The CPU 21 outputs the operating data request command when the operating data of the controller 1 is required. In receipt of the operating data request command, the controller circuit 120 generates operating data described later by referring to FIG. 21 based on an output from the inputting means and the jolting sensor 118, and outputs to the cable connector 130. The CPU 21 executes a program in receipt of the operating data via the cable, the controller connector 28, and the bas controlling circuit 22a.

The CPU 21 outputs the vibration on command when intending to vibrate the vibration motor 117, and outputs the vibration brake command when intending to forcibly stop the vibration. The controller circuit 120, in receipt of these commands, outputs the on signal or the brake signal to the vibration motor 117.

The image processing circuit 22b generates the game image in receipt of an image generating command output by the CPU 21 based on the program. In addition, the sound processing circuit 22c generates a game sound in receipt of a sound generating command. These game image data and the game sound data are transformed into a video signal and an audio signal by the AV encoding circuit 26, and output to the television receiver 3 via the AV connector 27. Note that specific game contents will be described later by referring to FIG. 22 to FIG. 46.

FIG. 21 is a format of the operating data generated by the controller circuit 120. In FIG. 21, "START", "Y", "X", "B", "A", "L". "R", and "Z" are data areas for digital outputs (either 0 or 1) of the start button 116, the Y button 106, the X button 105, the B button 104 (digital), the A button 103 (digital), the L switch 115 (digital), the R switch 109 (digital), and the Z button 111, respectively. "SHOCK" is the data area of an output of the jolting sensor 118 (in a case of an impact more than a predetermined level, "1", otherwise "0"). "Main Analog X" and "Main Analog Y" are data areas of an analog output of an X direction and a Y direction of the main analog joystick 112. "Sub Analog X" and "Sub Analog Y" are data areas of analog outputs of an X direction and a Y direction of the sub analog joystick 108. "L Analog", "R Analog", "A Analog" and "B Analog" are data areas of analog output values of the L switch 115 (analog), the R switch 109 (analog), the A button 103 (analog) and the B button 104 (analog), respectively.

Although the operating data is always eight-byte data, it is possible, if set accordingly, to select three kinds of formats (FIG. 21(a), FIG. 21(b), FIG. 21 (c)). The controller 1 of this embodiment is provided with the main analog joystick 112, the sub analog joystick 108, the A button 103, the B button 104, the R switch 109, and the L switch 115 as an analog switch. However, depending on which three kinds of formats to be selected, it is determined to change to which switch a high resolution is assigned out of these analog switches.

In a format shown in FIG. 21(a), eight bits are respectively assigned to the X direction and the Y direction of the main analog joystick 112 and the sub analog joystick 108. Four bits are assigned to the A button 103, the B button 104, the R switch 109, and the L switch 115, respectively. This is a format selected in a case that it requires a high resolution to the main analog joystick 112 and the sub analog joystick 108.

In a format shown in FIG. 21(b), eight bits are respectively assigned to the X direction and the Y direction of the main analog joystick 112, the L switch 115 (analog), and the R switch 109 (analog). Four bits are assigned to the X direction and the Y direction of the sub analog joystick 108, the A button 103 (analog), and the B button 104 (analog), respectively. This is a format selected in a case that it requires a high system resolution to the main analog joystick 112, the L switch 115 (analog) and the R switch 109 (analog).

In a format shown in FIG. 21(c), eight bits are respectively assigned to the X direction and the Y direction of the main analog joystick 112, the A button 103 (analog), and the B button 104 (analog). Four bits are assigned to the X direction and the Y direction of the sub analog joystick 108, the L switch 115 (analog), and the R switch 109 (analog), respectively. This is a format selected in a case that it requires a high resolution to the main analog joystick 112, the A button 103 (analog) and the B button 104 (analog).

Any one of the formats of FIG. 21(a), FIG. 21(b), and FIG. 21(c) is selected according to a content of the game. The game machine main body 2 outputs an operating data request command uniquely assigned by each format. The controller circuit 120 generates the operating data in any one of formats of FIG. 21(a), FIG. 21(b), and FIG. 21(c) according to a kind of the operating data request command.

By referring to FIG. 22 to FIG. 29, descriptions are made with respect to a race game which is one embodiment of the present invention. In the race game of this embodiment, a player controls a direction of his or her machine by operating the main analog joystick 112 of the controller 1, applies an acceleration control (accelerator control) of its machine by operating the R switch 109 (analog), and applies an acceleration (turbo) control which is larger than usual acceleration or applies a brake control (the player can arbitrarily select either the turbo control or the brake control) when the R switch 109 (analog) becomes turned on. In addition, when the A button 103 (digital) becomes turned on, a shooting control of a machine gun is applied toward an enemy machine operated by the computer, and when the B button 104 (digital) becomes turned on, the shooting control of a pistol is applied.

Figure 22:
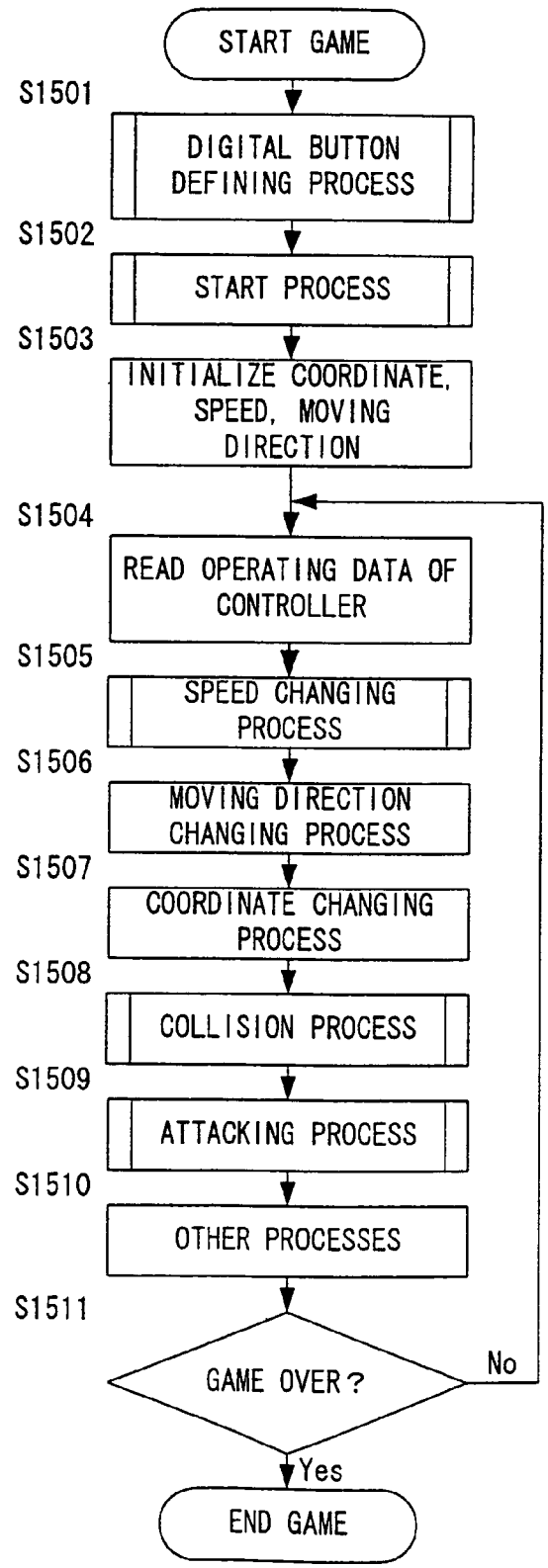
FIG. 22 is a flowchart (main routine) showing an operation of a race game which is one embodiment of the present invention.
Figure 23:
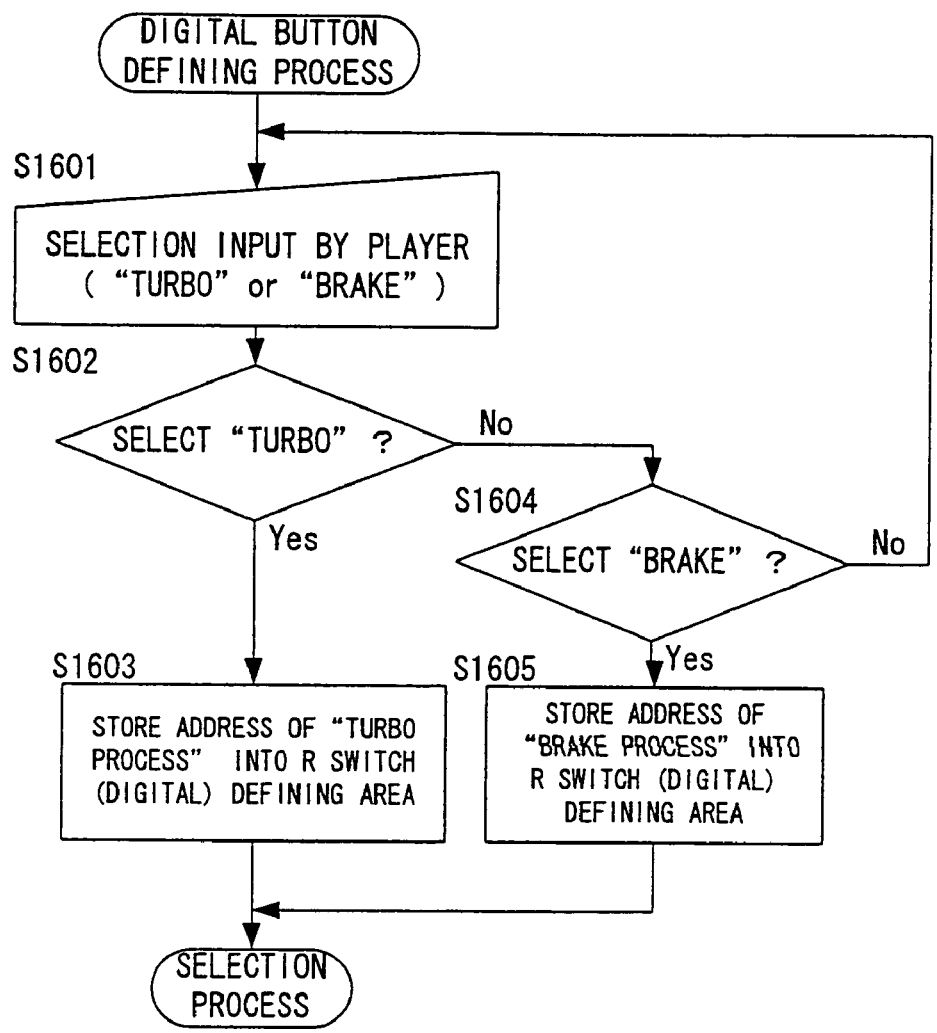
FIG. 23 is a flowchart showing an operation of a digital button defining process in the race game.
Figure 24:
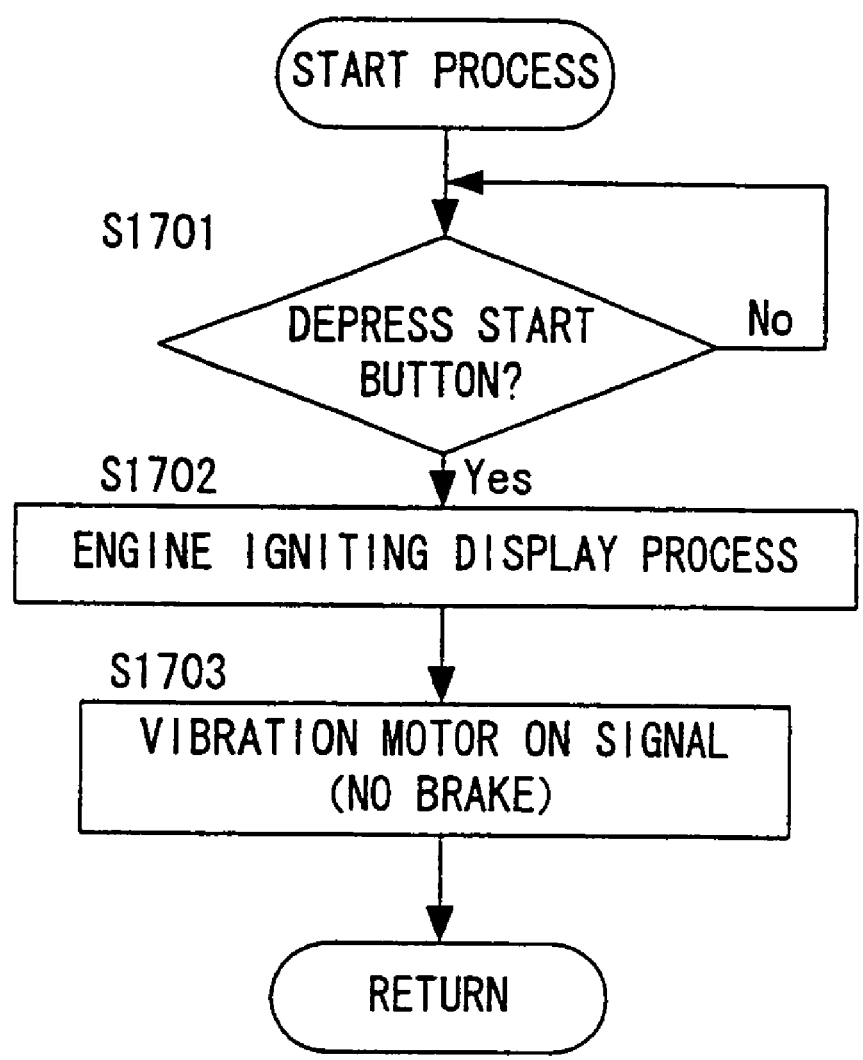
FIG. 24 is a flowchart showing an operation of a starting process in the race game.

FIG. 22 to FIG. 29 are flowcharts of a program stored in the game disk 4, read out by the disk drive 23, and executed by the CPU. FIG. 22 is a flowchart of a main routine. Upon starting the game (inserts the game disk 4 into the disk drive 23, and turns on a power of the game machine main body), firstly, in a step S1501, a digital button defining process subroutine described later by referring to FIG. 23 is executed. After the step S1501, a starting process subroutine described later by referring to FIG. 24 is executed in a step S1502. After the step S1502, an initializing process of a coordinate machine, a speed, a moving direction, etc. of the own machine are carried out in a step S1503.

After the step S1503, the operating data of the controller 1 is read out in a step S1504. More specifically, data of the format described before by referring to FIG. 21 is generated by the controller circuit 120, and read out by the CPU 21 via the cable connector 130, the cable 5, the control connector 28, and the coprocessor 22. Note that of this embodiment, the format (b) in FIG. 21 is in use.

Figure 25:
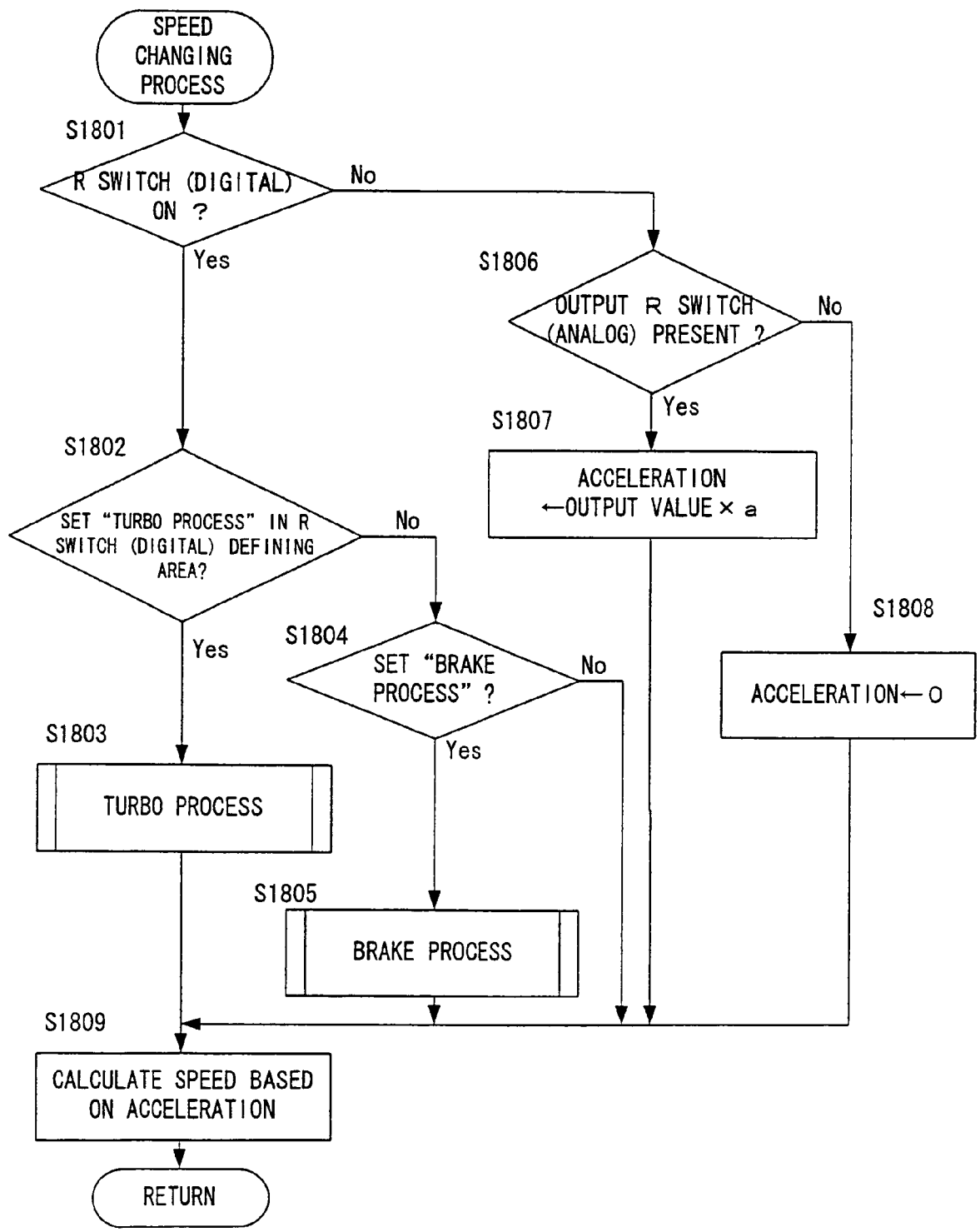
FIG. 25 is a flowchart showing an operation of a speed changing process in the race game.

After the step S1504, a speed changing process subroutine described later by referring to FIG. 25 is executed in a step S1505. After the step S1505, a process for determining the moving direction of the own machine is carried out in a step S1506. More specifically, a changing process of the moving direction of the own machine is carried out based on operating information of the main analog joystick 112 (a value of "Main Analog X" and "Main Analog Y" in FIG. 21).

Figure 26:
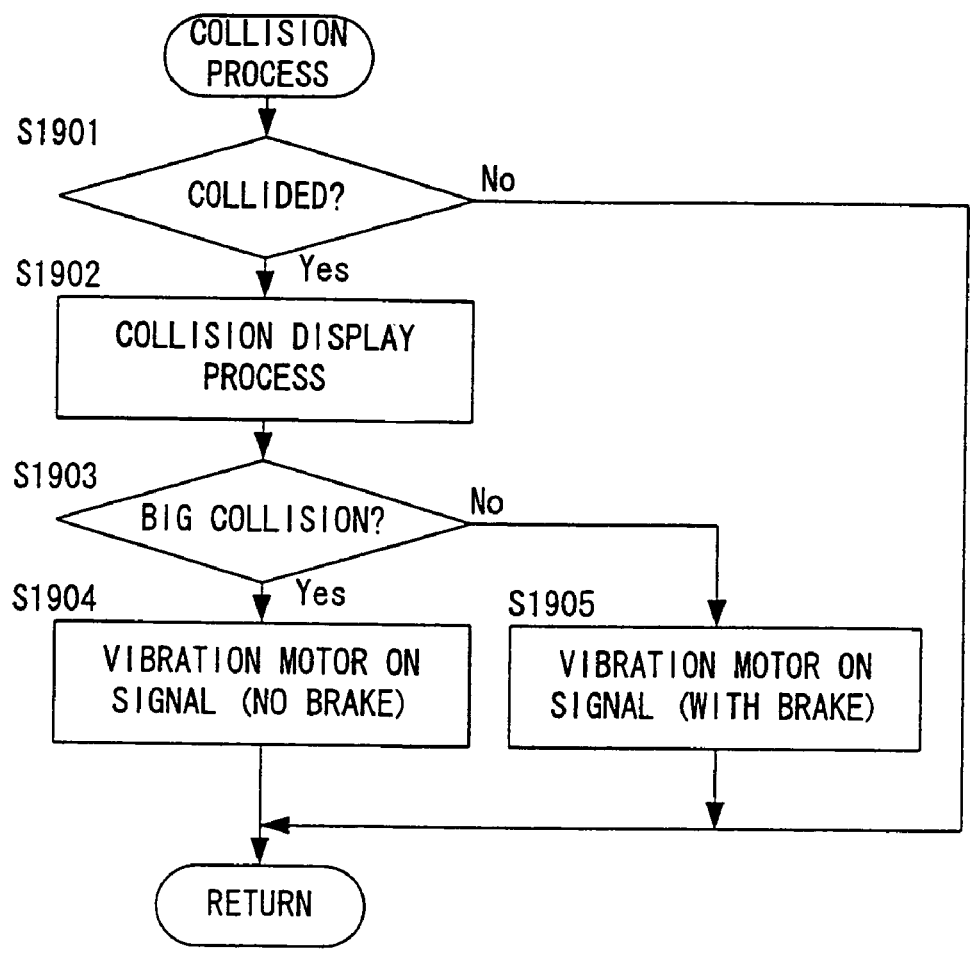
FIG. 26 is a flowchart showing an operation of a collision process in the race game.
Figure 27:
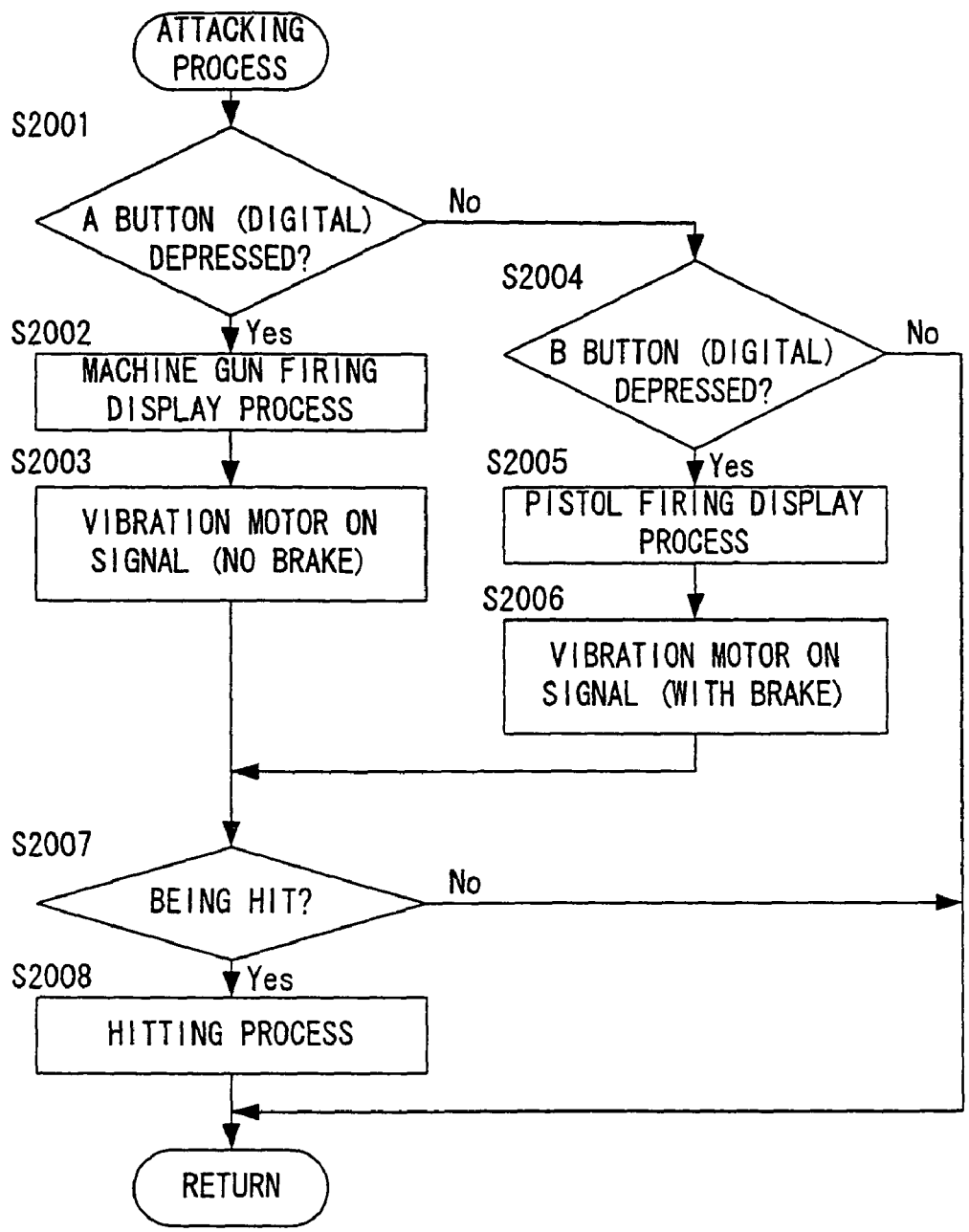
FIG. 27 is a flowchart showing an operation of an attacking process in the race game.

After the step S1506, a coordinate changing process is carried out in a step S1507. More specifically, a changing process of the coordinate of own machine is carried out based on the speed, the moving direction of its own machine determined in the steps S1505 and S1506, and the coordinate of last time. After the step S1507, a collision process described later by referring to FIG. 26 is carried out in a step S1508. After the step S1508, an attacking process described later by referring to FIG. 27 is carried out in a step S1509. After the step S1509, other processes are carried out in a step S1510. More specifically, a moving process of the enemy machine, an attacking process, an image process, a sound process, and etc. are carried out. After the steps S1510, it is determined whether or not the game has been over in a step S1511, and in case of the game over, the game is ended. If it is determined that the game is not over, the process returns to the step S1504 so as to repeat the game process.

FIG. 23 is a flowchart of the digital button defining process in the step S1501 of the main routine in FIG. 22. In this digital button defining process, a definition of a process carried out in a case that the R switch 109 (digital) becomes turned on (in a case that "R" in FIG. 21 becomes "1") is executed. In this embodiment, there are two selection items, that is, the turbo process and the braking process, and the player can arbitrarily select either one of the two (it may be also possible to select from more than three selection items). Note that since the turbo process and the braking process are a process in association with an acceleration control (steps S1806, S1807, and S1808 in FIG. 25) defined to the R switch 109 (analog), it is possible to carry out a plurality of operations (acceleration and turbo or acceleration and brake) associated only with the operation of the R switch 109 by a single switch. Furthermore, it is possible to facilitate the operation and increase a level of a taste or savor if the player can set the definition of the R switch 109 (digital).

Firstly, an input process to select either one of the turbo process or the braking process by the player is carried out in a step S1601. After the step S1601, it is determined whether or not the player selected the turbo process or whether or not the player selected the braking process in steps S1602 and S1604. If it is determined that the turbo process is selected in the step S1602, the digital button definition process is ended after an address in which a program of the turbo process is stored in a definition area of the R switch 109 (digital) is stored in a step S1603. In addition, if it is determined that the braking process is selected in the step S1604, the digital button definition process is ended after the address in which a program of the braking process is stored in a definition area of the R switch 109 (digital) is stored in the step S1605.

FIG. 24 is a flowchart of the starting process in the step S1502 of the main routine in FIG. 22. A staging process at a time of staring the race game is carried out in the starting process. Firstly, in a step S1701, it is determined whether or not a start button 116 is depressed (whether "START" is "1" or not in FIG. 21). While the start button 116 is not depressed, the process of the step S1701 is repeated. If it is determined that the start button 116 is depressed, the process proceeds to a step S1702 so as to carry out an engine igniting display process. More specifically, a process for displaying an image in which the engine of own machine is ignited is carried out. After the step S1702, a signal to turn on the vibration motor 117 (no brake) is produced in a step S1703. By rendering the on signal of the vibration motor 117 a signal without brake in the step S1703, it is possible to reproduce a vibration in a more real manner when the engine starts. The starting process is ended after the step S1703.

Figure 28:
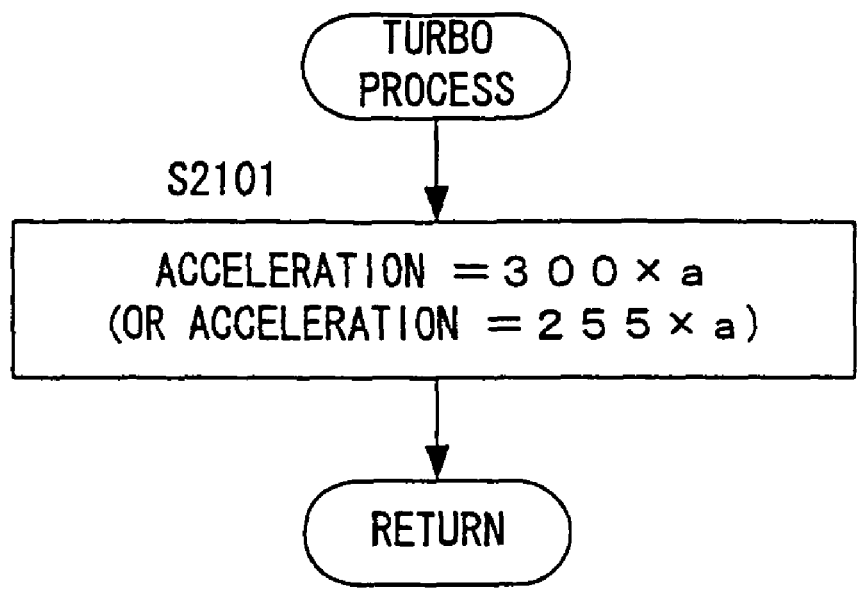
FIG. 28 is a flowchart showing an operation of a turbo process in this race game.
Figure 29:
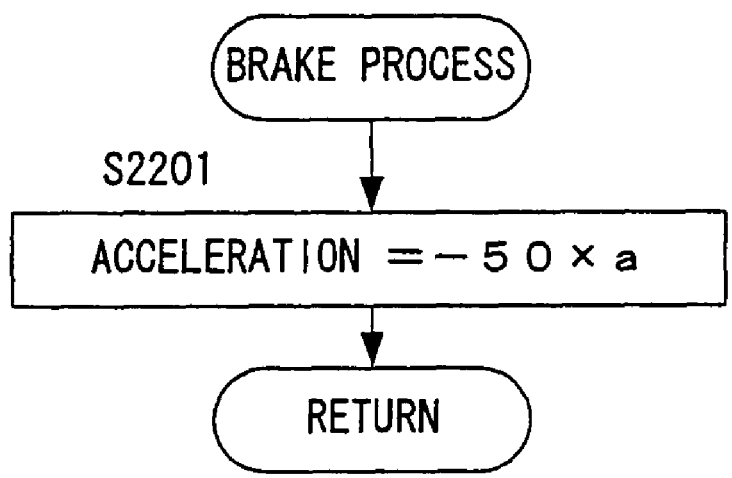
FIG. 29 is a flowchart showing an operation of a braking process in this race game.

FIG. 25 is a flowchart of the speed changing process in the step S1505 of the main routine in FIG. 22. In the speed changing process, a process for changing the speed of the own machine is carried out based on the operating information of the R switch 109. Firstly, in a step S1801, it is determined whether or not the R switch 109 (digital) is on (whether or not "R" in FIG. 21 is "1"). If determined that it is on, a stored content of the definition area of the R switch 109 (digital) is referred to in steps S1802 and S1804, and if the turbo process is set, the process proceeds to a step S1809 after the turbo process described later by referring to FIG. 28 is carried out in a step S1803. In addition, in a case that the braking process is set, the process proceeds to the step S1809 after the braking process described later by referring to FIG. 29 is carried out in a step S1805.

If it is determined that the R switch 109 (digital) is not turned on in the step S1801, the process proceeds to a step S1806 so as to determine whether or not there is an output of the R switch 109 (analog) (whether or not "R Analog" in FIG. 21 is equal to or more than 1). If determined that there is the output, the process proceeds to the step S1809 after setting a value multiplying a constant value a to the output value of the R switch 109 (analog) (a value of "R Analog" in FIG. 21) as an acceleration in a step S1807. Note that the constant value a is appropriately set in light of a balance of the game. If it is determined that there is no output of the R switch 109 (analog) in a step S1806, the process proceeds to the step S1809 after setting the acceleration to 0 in a step S1808. A speed of the own machine is calculated based on the set acceleration and the speed of last time in the step S1809.

FIG. 26 is a flowchart of the collision process in the step S1508 of the main routine in FIG. 22. In this collision process, it is determined whether or not the own machine collides with the enemy machine or an obstacle. In a case of the collision therewith, a staging process with respect to the collision is carried out. Firstly, it is determined whether or not the own machine collides with the enemy machine or the obstacle in a step S1901. Specifically, carried out by comparing a coordinate of the own machine and the coordinate of the enemy machine or the obstacle. If it is determined that there is no collision, the colliding process is ended. If it is determined that there is the collision, an image for showing a collision state is displayed in a step S1902. After the step S1902, it is determined whether or not the collision is a big collision in a step S1903. Herein, the big collision refers to cases of being collided with the enemy machine or the obstacle at a high speed or being collided head-on. If the big collision is determined, an on signal of the vibration motor (no brake) is produced in a step S1904. By rendering the signal produced in the step S1904 a signal without brake, a vibration of a case where a collision energy is large is reproduced in a real manner. The collision process is ended after the step S1904.

If it is determined not a big collision in the step S1903, the on signal of the vibration motor (with brake) is produced in a step S1905. By rendering the signal produced in the step S1905 a signal with brake, a vibration of a case where the collision energy is small is reproduced in a real manner. Note that it may be possible that the signal produced in the step S1905 is a signal having a smaller amount of vibration of the vibration motor 117 than the signal produced in the step S1904. The collision process is ended after the step S1905.

FIG. 27 is a flowchart of the attacking process in the step S1509 of the main routine in FIG. 22. In the attacking process, a process in which a machine gun and a pistol are fired against the enemy machine is carried out. Firstly, it is determined whether or not the A button 103 (digital) is depressed (whether or not "A" in FIG. 21 is "1") in a step S2001. If it is determined that the A button 103 (digital) is depressed, an image for showing a state in which the machine gun is fired is displayed in a step S2002. After the step S2002, the on signal of the vibration motor (without brake) is produced in a step S2003. By rendering the signal produced in the step S 2003 a signal without brake, an impact when firing the machine gun is reproduced in a real manner. The process proceeds to a step S2007 after the step S2003.

If it is determined that the A button 103 (digital) is not depressed in the step S2001, it is determined whether or not the B button 104 (digital) is depressed (whether or not "B" in FIG. 21 is "1") in a step S2004. If it is determined that the B button 104 (digital) is not depressed, the attacking process is ended. If it is determined that the B button 104 (digital) is depressed, an image showing a state in which the pistol is fired is displayed in a step S2005. After the step S2005, the on signal (with brake) of the vibration motor is produced in a step S2006. By rendering the signal produced in the step S2006 a signal with brake, it is possible to reproduce an impact when firing the pistol in a real manner. Note that the signal produced in the step S2006 may be a signal having a smaller amount of vibration of the vibration motor 117 than the signal produced in the step S2003. The process proceeds to the step S2007 after the step S2006.

It is determined whether or not the machine gun or the pistol hits the enemy machine in the step S2007. If it is determined that the target is not hit, the attacking process is ended. If it is determined that the target is hit, the attacking process is ended after carrying out a hitting process (process to give a damage to the enemy machine) in a step S2008.

FIG. 28 is a flowchart of the turbo process in the step S1803 of the speed changing process in FIG. 25. In a step S2101, 300× a is set as an acceleration, and then the turbo process is ended. Since a maximum output value of the R switch 109 (analog) is 255, it becomes to set the acceleration larger than a case of depressing the R switch 109 (analog) at a maximum amount. Note that in a case that 255× a is set as the acceleration, and the R switch 109 (digital) becomes turned on in the step S2101, it may be possible that an acceleration equal to an maximum output value of the R switch (analog) is set. In doing so, it is possible to keep an output with respect to an maximum operation at an constant value in a case that there is a deviation or error in the output of the analog switch.

FIG. 29 is a flowchart of the braking process in the step S1805 of the speed changing process in FIG. 25. In a step S2201, −50× a is set as an acceleration, and then the braking process is ended.

Figure 30:
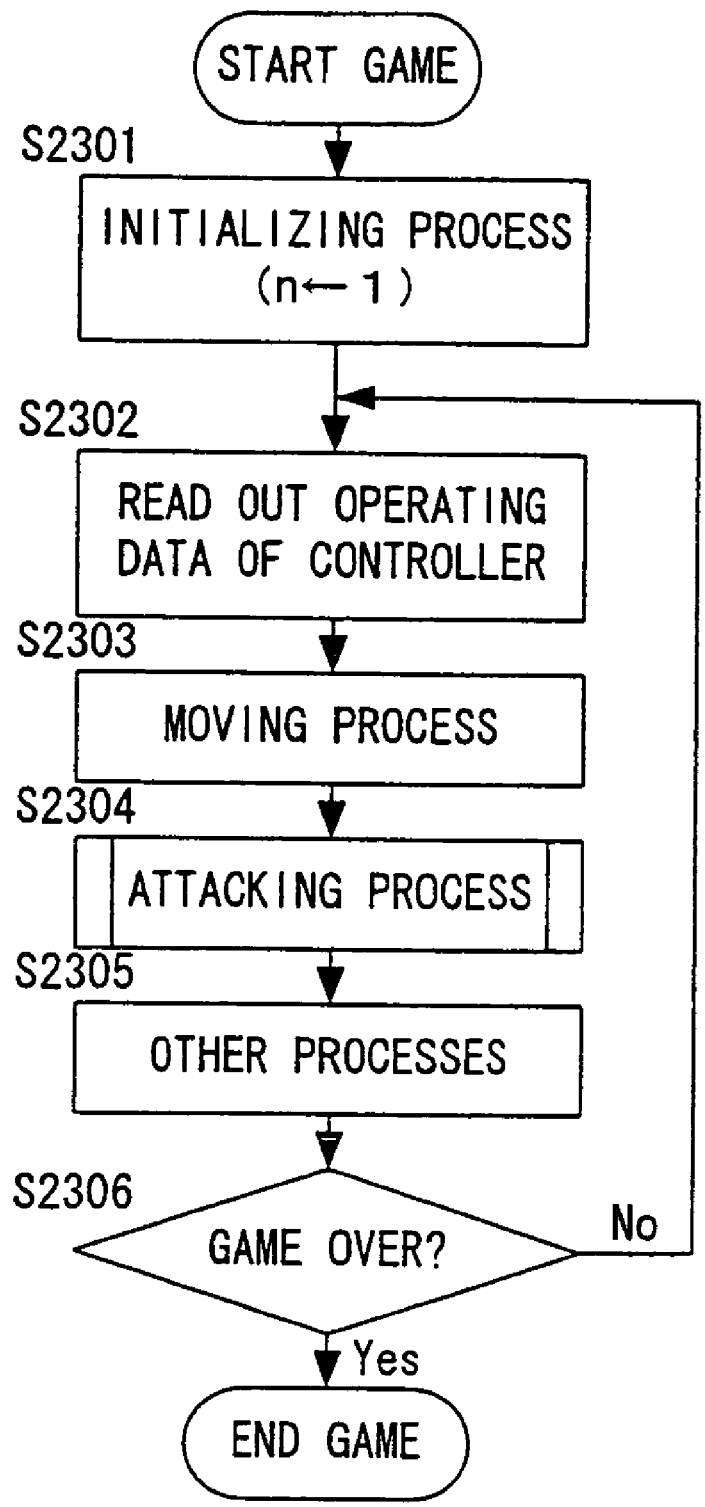
FIG. 30 is a flowchart (main routine) showing an operation of a boxing game which is another embodiment of the present invention.
Figure 31:
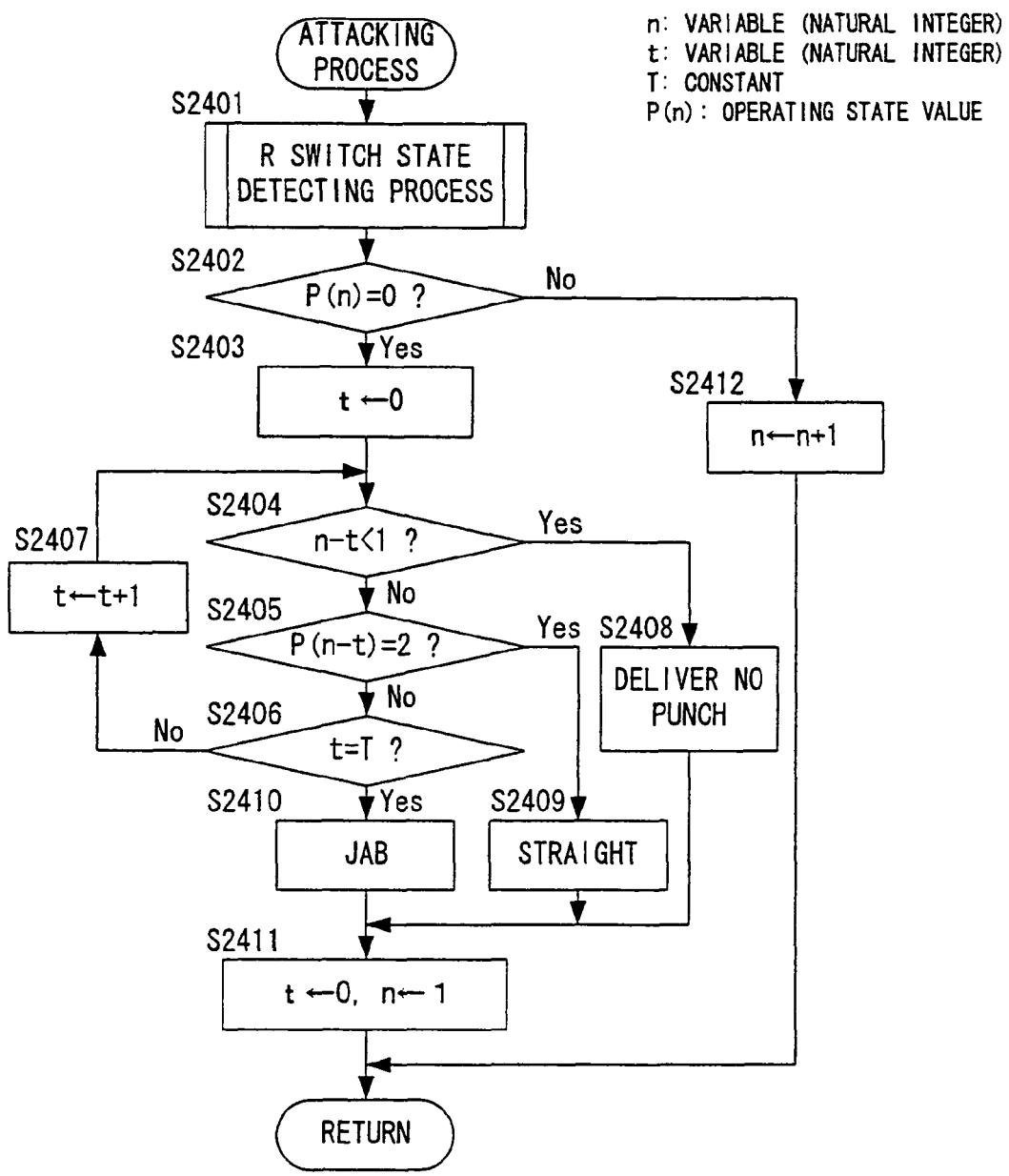
FIG. 31 is a flowchart showing an operation of an attacking process in the boxing game.
Figure 32:
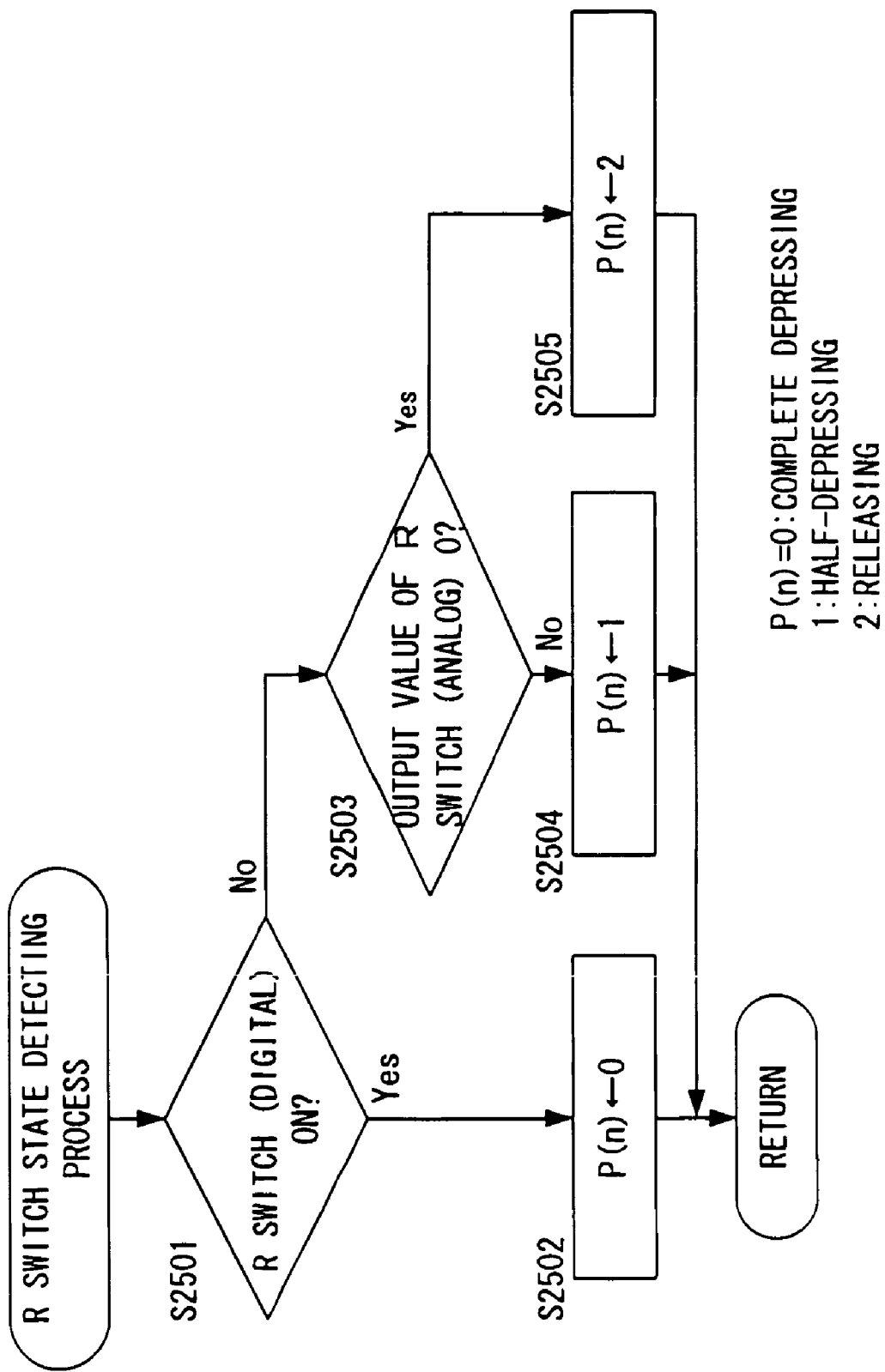
FIG. 32 is a flowchart showing an operation of an R switch state detecting process in the boxing game.

Next, descriptions are made with respect to a boxing game which is another embodiment of the present invention by referring to FIG. 30 to FIG. 32. In the boxing game of this embodiment, a player moves and controls a player boxer (boxer operated by the player) by operating the main analog joystick 112 of the controller 1, and delivers a right punch by operating the R switch 109. When the R switch 109 (digital) becomes turned on, the right punch is delivered. However, kinds of punches (jab or straight) are changed according to a state of the R switch 109 (analog) before which the R switch 109 (digital) becomes turned on. When the L switch 115

(digital) becomes turned on, a process to deliver a left punch is carried out similar to the right punch.

FIG. 30 to FIG. 32 are flowcharts of a program carried out in the CPU 21. FIG. 30 is a flowchart of a main routine. Upon starting the game, an initializing process is first carried out in a step S2301. A process in which 1, for example is set to a variable n and other processes are carried out. Herein, the variable n is a variable used in an attacking process described later by referring to FIG. 31. After the step S2301, operating data of the controller 1 is read in a step S2302. More specifically, a process similar to the aforementioned step S1504 is carried out. Note that a format (b) in FIG. 21 is used of this embodiment.

After the step S2302, a moving process of the player boxer is carried out in a step S2303. More specifically, a moving process of the player boxer is carried out based on the operating information of the main analog joystick 112 (value of "Main Analog X" and "Main Analog Y" in FIG. 21). If the value of the Main Analog X is plus (+), the player boxer is caused to move to a right direction according to the value, if the value of the Main Analog X is minus (-), the player boxer is caused to move to a left direction according to the value, if the value of the Main Analog Y is plus (+), the player boxer is caused to move to a forward direction according to the value, and if the value of the Main Analog Y is minus (-), the player boxer is caused to move to a backward direction according to the value, for example.

After the step S2303, an attacking process described later by referring to FIG. 31 and FIG. 32 is carried out in a step S2304. After the step S2304, other processes are carried out in a step S2305. More specifically, a moving process of the enemy boxer, an attacking process, an image process, a sound process, and etc. are carried out.

After the step S2305, it is determined whether or not the game is over in a step S2306. If it is determined that the game is over, the game is ended. If it is determined that the game is not over, the process returns to the step S2302 so as to repeat the game process.

FIG. 31 is a flowchart of the attacking process of the player boxer in the step S2304 of the main routine in FIG. 30. In this attacking process, a process to change kinds of the punches is carried out based on the operating data of the R switch 109 ("R" and "R Analog" shown in FIG. 21). In the attacking process, the variable n is a variable to be incremented one frame by one frame in a period that the R switch 109 (digital) is turned off, and an index variable for storing an operating state of the R switch 109 (complete depressing state, half depressing state or releasing state) for each frame into P(n). In this embodiment and other embodiments, data of the controller 1 is received one frame by one frame in synchronism with a television frame. However, it is possible for a programmer to arbitrarily set a reception timing of the controller data. In this case, the variable n is incremented at every time that the controller data is received.

In addition, a variable t is a variable for decreasing the index variable for determining a past operating state of the R switch 109. A constant T is a natural number representing a predetermined period (several ten frame periods, for example), and an appropriate value is set therefor in view of a game balance.

At first, a state of the R switch 109 is detected, and a process to store the state is carried out in the step S2401. Descriptions are specifically made by using FIG. 32. First, it is determined whether or not the R switch 109 (digital) is turned on (R switch 109 is completely depressed, that is, a state in which the R switch 109 is completely forced down) in a step S2501. If the R switch 109 (digital) is turned on, the variable P(n) is rendered 0 in a step S2502, and the process proceeds to a step S2402. The process proceeds to a step S2503 if the R switch 109 (digital) is turned off in the step S2501. It is determined whether or not an output value of the R switch 109 (analog) is 0 (specifically, it is determined whether or not a value of "R Analog" shown in FIG. 21 is 0) in the step S2503. If the output value of the R switch 109 (analog) is not 0 (R switch 109 is half depressed), the variable P(n) is rendered 1 in a step S2504, and the process proceeds to the step. S2402. If the output value of the R switch 109 (analog) is 0 (R switch is released) in the step S2503, the variable P(n) is rendered 2 in a step S2505, and the process proceeds to the step S2402.

It is determined whether or not the variable P(n) is equal to 0 (R switch 109 is completely depressed) in the step S2402, and if the variable P(n) is coincident with 0, the process proceeds to a step S2403 so as to set the variable t to 0. After the step S2403, it is determined whether or not n-t is equal to or less than 1 in a step S2404, if n-t is not less than (<) 1, the process proceeds to a step S2405. In the step S2405, it is determined whether or not P(n-t) is coincident with 2 (that is, it is determined whether or not the operating state of the R switch 109 at a frame before t frames is a releasing state), and if P(n-t) is not equal to 2, the process proceeds to a step S2406. In the step S2406, it is determined whether or not t is coincident with T (predetermined period), and if t is not coincident with T, the process proceeds to a step S2407, and then returns to the step S2404 after incrementing t.

The process proceeds to a step S2408 if n-t is less than (<) 1 in the step S2404, and further proceeds to a step S2411 not delivering the punch. This process is carried out to prevent not to deliver an exact punch movement when a period from when the punch is delivered last time until when the R switch 109 is completely depressed this time is shorter than T. Although no punch was to be delivered for a predetermined time of this embodiment, in a case of displaying the punch action in an animation manner, it may be possible to arrange that a next punch is not to be delivered until an animation display is ended.

The process proceeds to a step S2409 if P(n-t) is equal to (=) 2 in the step S2405, the CPU 21 outputs to the coprocessor 22 a command to generate image data in which the player boxer delivers a straight punch, and then proceeds to the step S2411. To be described more specifically, if there is a period during which the R switch is released within the T frame period before the player completely depresses the R switch 109 (that is, the R switch 109 becomes a completely depressing state from a releasing state), the player boxer delivers the straight punch.

The process proceeds to a step S2410 if t is equal to (=) T in the step S2406, and the CPU 21 outputs to the coprocessor 22 a command to generate image data in which the player boxer delivers a jab, and then proceeds to a step S2411. More specifically, if there is no period during which the R switch is released within the T frame period before the player completely depresses the R switch 109, that is, the R switch is left in a half-depressing state during the T frame period (that is, the R switch has become a half-depressing state to a complete depressing state), the player boxer strikes the jab. The process proceeds to the step S2305 after resetting the variable t to 0 and the variable n to 1 in the step S2411.

If the variable P(n) is not equal to (=) 0 (R switch 109 is not completely depressed) in the step S2402, the process proceeds to a step S2412. In the step S2412, the variable n is incremented by 1, and the process proceeds to the step S2305. Therefore, it continues to store data of the operating state (whether complete depressing or half depressing or releasing) of the R switch 109 until the R switch 109 is completely depressed.

If the game shown from FIG. 30 to FIG. 32 is executed as described above, an attacking process to deliver the straight (punch) is applied after delivering the jab in a case that after the player half-depresses the R switch 109 for a while, and completely depresses, and thereafter, the player removes a finger so as to release the R switch, and completely depresses the R switch 109 instantly, for example. According to this embodiment, it is possible to perform a plurality of controls based on operations of a single switch (R switch 109), thus enabling to apply a complicated control by a simple operation.

Note that with respect to a left hand attack, by using the L switch 115, it is possible to apply a control similar to the right hand attack.

Figure 33:
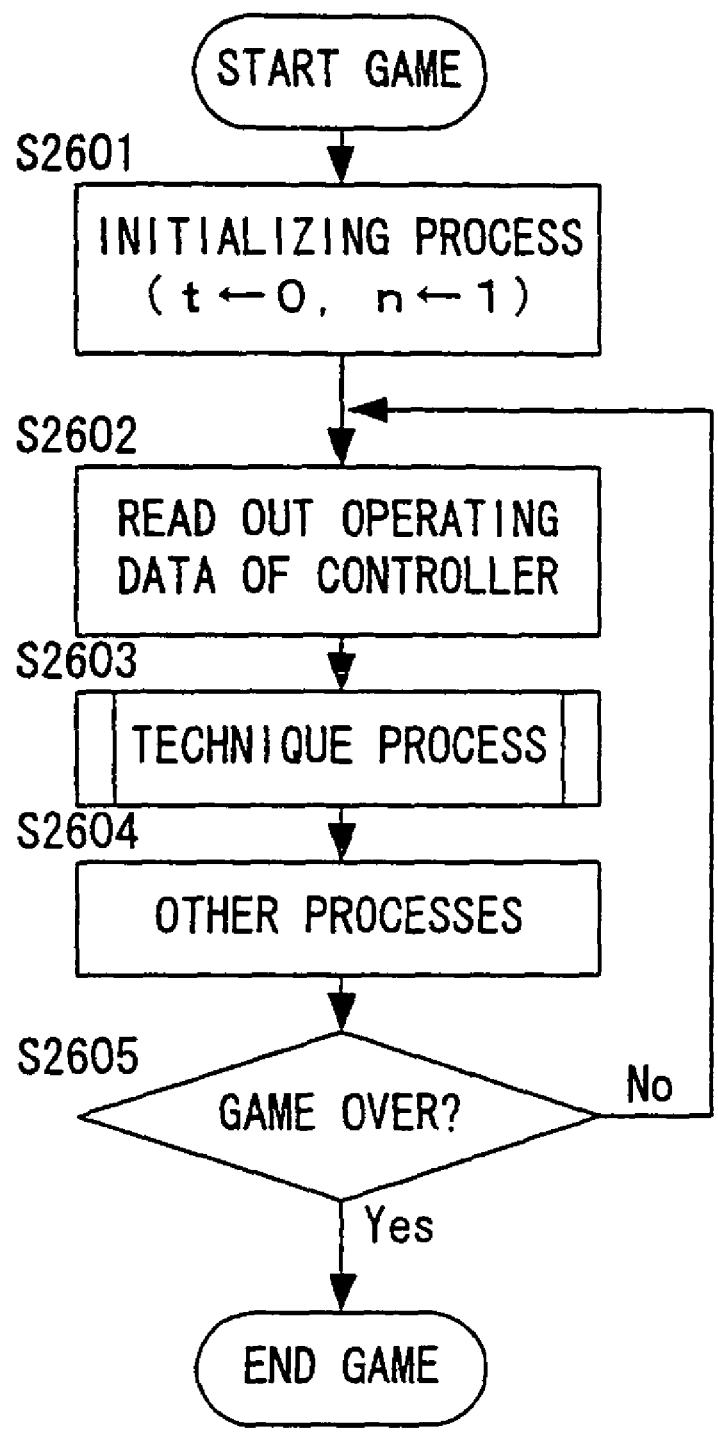
FIG. 33 is a flowchart (main routine) showing an operation of a fighting game which is another embodiment of the present invention.
Figure 34:
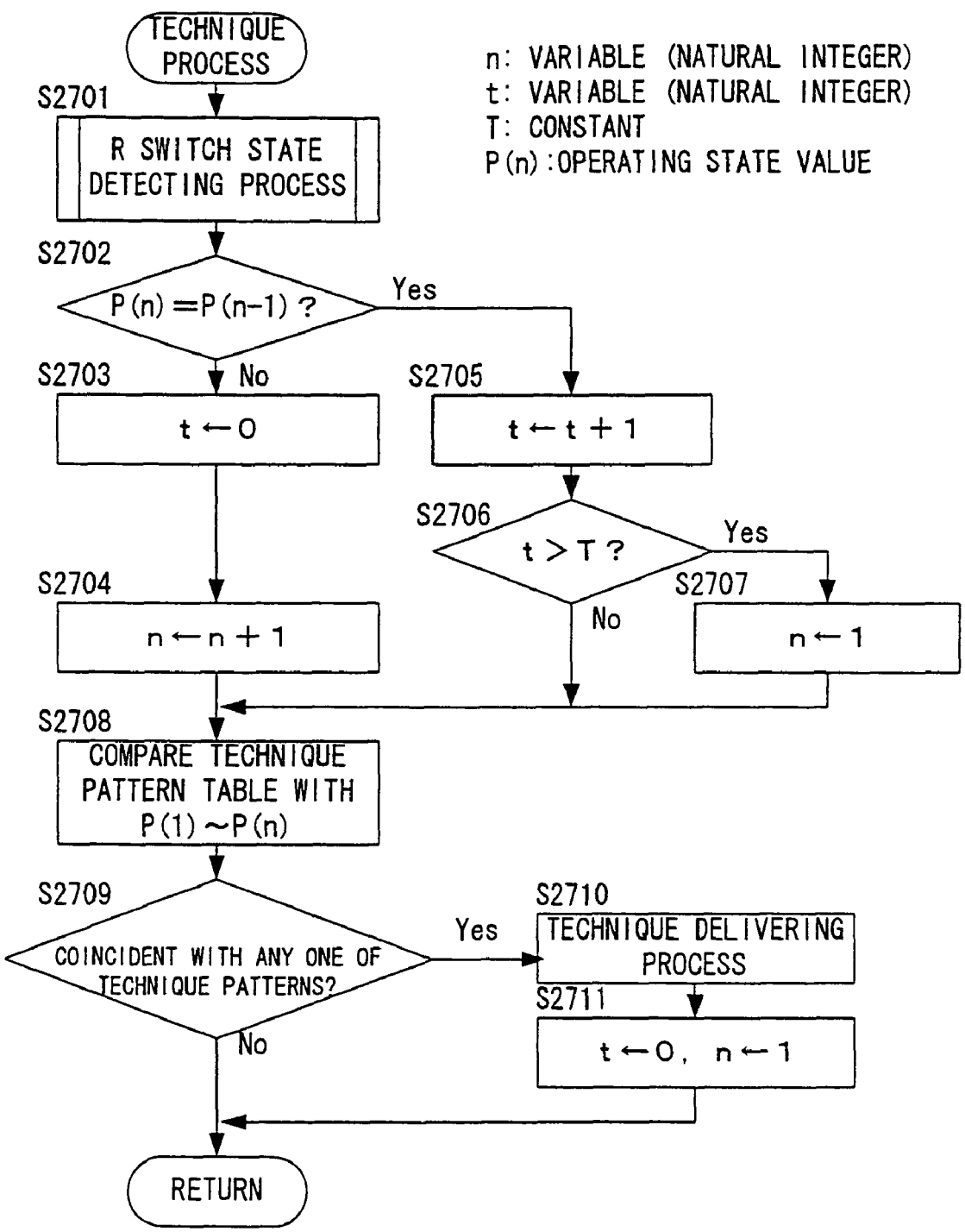
FIG. 34 is a flowchart showing an operation of a technique process in the fighting game.

Next, descriptions are made regarding a fighting game which is another embodiment of the present invention by referring to FIG. 33 to FIG. 35. In the fighting game of this embodiment, the player controls a movement of a character of a fighter (hereinafter briefly referred to as "player character") by operating the main analog joystick 112 of the controller 1, and controls delivering a technique by operating the R switch 109 (analog). In a case that delivered technique hits an enemy fighter character controlled by the computer, a damage is done to the enemy fighter character, and in a case that the technique delivered by the enemy fighter character hits the player character, the damage is done to the player character. Then, this is a game in which one of either side which accumulates a damage more than a constant value is lost.

FIG. 33 is a flowchart of a main routine. Upon starting the game, an initializing process is first carried out in a step S2601. More specifically, a process to render a variable t 0, and a variable n 1 is carried out. Herein, the variable t and the variable n are variables used in a technique process described later by referring to FIG. 34. After the step S2601, a process to read out operating data of the controller is carried out in a step S2602. After the step S2602, the technique process described later by referring to FIG. 34 is carried out in a step S2603.

After the step S2603, other processes are carried out. More specifically, a technique that the enemy fighter character delivers is determined, and it is determined whether or not the technique delivered by the enemy fighter character hits the player character. If being hit, a damage on the player character is calculated. Furthermore, an image process and a sound process are carried out. After a step S2604, it is determined whether or not the game is over in a step S2605, and if it is determined that the game is over, the game is ended. If it is determined that the game is not over, the process returns to the step S2602 so as to repeat the game process.

FIG. 34 is a flowchart of the technique process in the step S2603 of the main routine in FIG. 33. In the technique process, an operating state of the R switch 109 (complete depressing, half-depressing, or releasing state) is detected, and a history of the operating state is stored, and thereby to carry out a process to determine a technique to be delivered according to the history. In the technique process, the variable t is a variable for measuring a period during which the state of the R switch 109 remains unchanged (a period during which a state of the complete depressing continues, a period during which a half-depressing continues, or a period during which a releasing state continues). In addition, the variable n is an index variable for storing the history of the operating state of the R switch 109 into P(n). The constant T is a natural number representing a predetermined period (several ten frames of periods), and an appropriate value is set therefor in view of a game balance.

Firstly, an R switch state detecting process similar to FIG. 32 in the aforementioned embodiment is carried out in a step S2701. An operating state of the R switch 109 is detected by this process. After the step S2701, it is determined whether or not P(n) is equal to (=) P(n−1) in a step S2702. That is, it is determined whether or not a present operating state of the R switch 109 (P(n)) is coincident with the operating state of the R switch 109 of last time (P(n−1)). If it is determined that it is not coincident, the process proceeds to a step S2703 so as to reset the variable t to 0. After the step S2703, a process to increment the variable n is carried out in a step S2704. The process proceeds to a step S2708 after the step S2704.

If it is determined that the operating state (P(n)) of the present R switch 109 and the operating state (P(n−1)) of the R switch 109 of last time are coincident with each other in the step S2702, the process proceeds to a step S2705 so as to carry out a process to increment t. After the step S2705, it is determined whether or not t is greater than T (predetermined period) (t>T) in a step S2706. That is, it is determined whether or not there is any change to the operating state of the R switch 109 for a constant time (T) period. If it is determined that t is not greater than T, the process proceeds to the step S2708. If it is determined that t is greater than T (t>T), the process proceeds to a step S2707 so as to reset the variable n to 1. That is, the index of the operating history is reset to 1. After the step S2707, the process proceeds to the step S2708.

A technique pattern table as shown in FIG. 35 is referred to in the step S2708. On the technique pattern table, a technique number, an operating history pattern, an attacking power, and data of a technique image are stored. The technique number is a number applied to the kinds of techniques. An operating history of the R switch 109 to deliver the technique is defined to the operating history pattern. If the R switch 109 is operated in order of "complete depressing" to "half depressing", for example, a technique 1 is delivered. Likewise, if the R switch 109 is operated in order of "half depressing" to "complete depressing", a technique 2 is delivered. Note that as described before, in a case that the state of the R switch 109 remains unchanged for a constant period (T), the variable n is reset (operating history is reset), and therefore, it requires to carry out a following operation within the constant period (T). It is also possible to define three or four histories like a technique 3 or a technique 4 (it is also possible to define more than five histories). Note that although only four kinds of the technique are defined in FIG. 35, it is possible to define as many techniques as possible.

In the step S2708, P (1)-P(n), that is, the history that the player actually operated are compared with the operating history pattern on the technique pattern table. After the step S2708, it is determined whether or not P(1)-P(n) is coincident with one of the techniques of the operating history patterns out of the technique pattern table in a step S2709. If it is determined that none of the operating history pattern of the techniques is coincident, the technique process is ended. If it is determined that any one of the operating history pattern of the techniques is coincident, the process proceeds to a step S2710 so as to carry out a technique delivering process. More specifically, a technique image display (based on the technique image data defined on the technique pattern table), a hitting judgment of the delivered technique, and in addition, a damage process of the enemy fighter character (based on the attacking power data defined on the technique pattern table) are carried out. After the step S2710, t is reset to 0 and the variable n is reset to 1 in a step S2711. After the step S2711, the technique process is ended.

The R switch 109 of the embodiment has a function as a digital switch and a function as an analog switch. Furthermore, since the digital switch accompanies a click sensation, the player can clearly recognize a complete depressing state by sensing the click sensation in a case of the complete depressing. That is, it is possible for the player with ease to clearly distinguish three states, that is, the releasing state, the half-depressing state, and the complete depressing. In a conventional switch, a state which the player could clearly distinguish was only two states, that is, the releasing state and the depressing state. In contrast thereto, in a game which uses the R switch 109 of the embodiment of the present invention, there is a versatility with respect to a functioning state because it is possible to clearly distinguish the three states, thus allowing to apply various game effects according thereto. In addition, in a case that the process is changed according to the operating history as of this embodiment, versatility is brought about with respect to a combination of the operating history, thus possible to increase savor or taste of the game.

Next, a gun game which is another embodiment of the present invention is described by referring to FIG. 36 to FIG. 42. In the gun game of this embodiment, the player controls a movement of a player character in possession of a gun by operating the main analog joystick 112 of the controller 1, and controls to fire the gun by operating the R switch 109. Herein, in a case that the R switch 109 (digital) becomes turned on (a state of complete depressing), a process to fire the gun is carried out. In a case that before the R switch 109 (digital) becomes turned on and the R switch 109 (analog) is being in operation (a state of half-depressing), the gun is not fired, however, an action display in which the gun is held is carried out. In a case that a bullet hits an enemy character controlled by the computer, a damage is applied to the enemy character.

Figure 36:
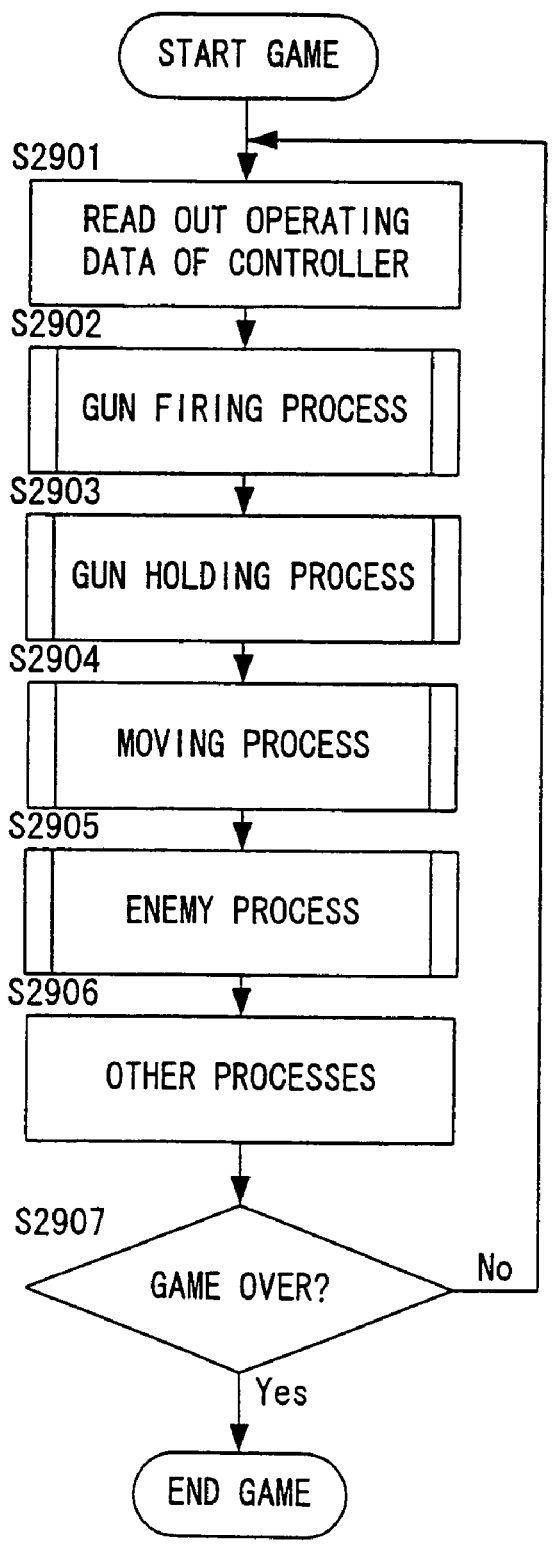
FIG. 36 is a flowchart (main routine) showing an operation of a gun game which is another embodiment of the present invention.
Figure 37:
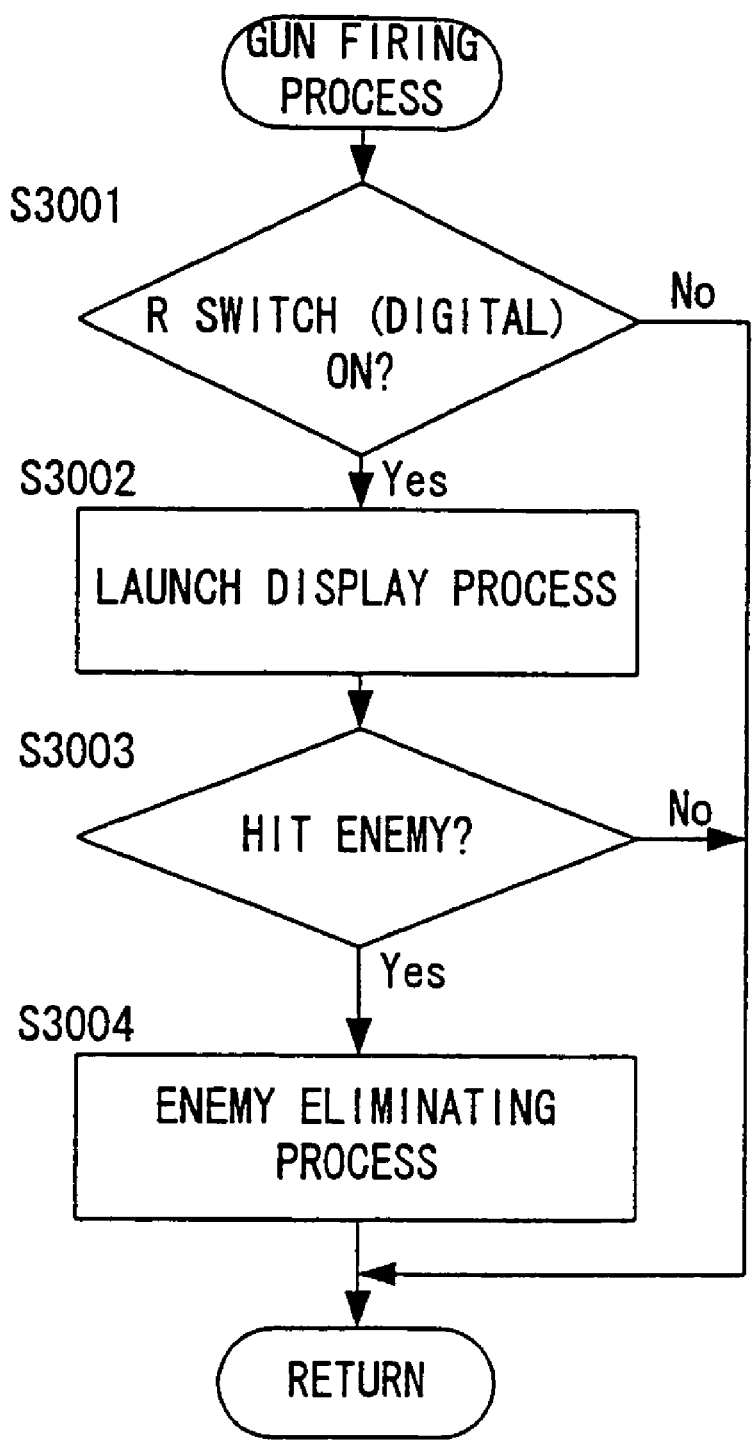
FIG. 37 is a flowchart showing an operation of a gun firing process in the gun game.
Figure 38:
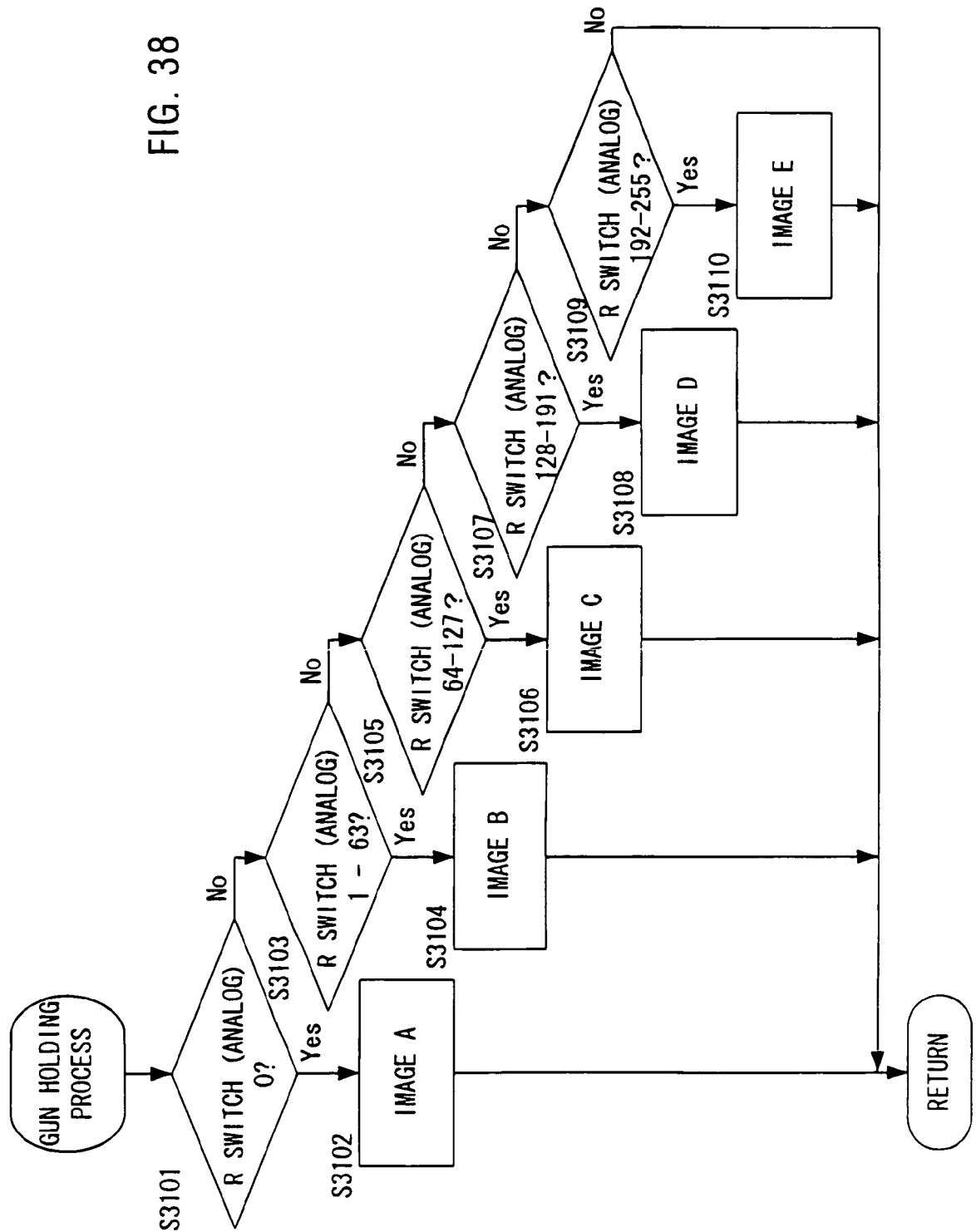
FIG. 38 is a flowchart showing an operation of a gun holding process in the gun game.
Figure 41:
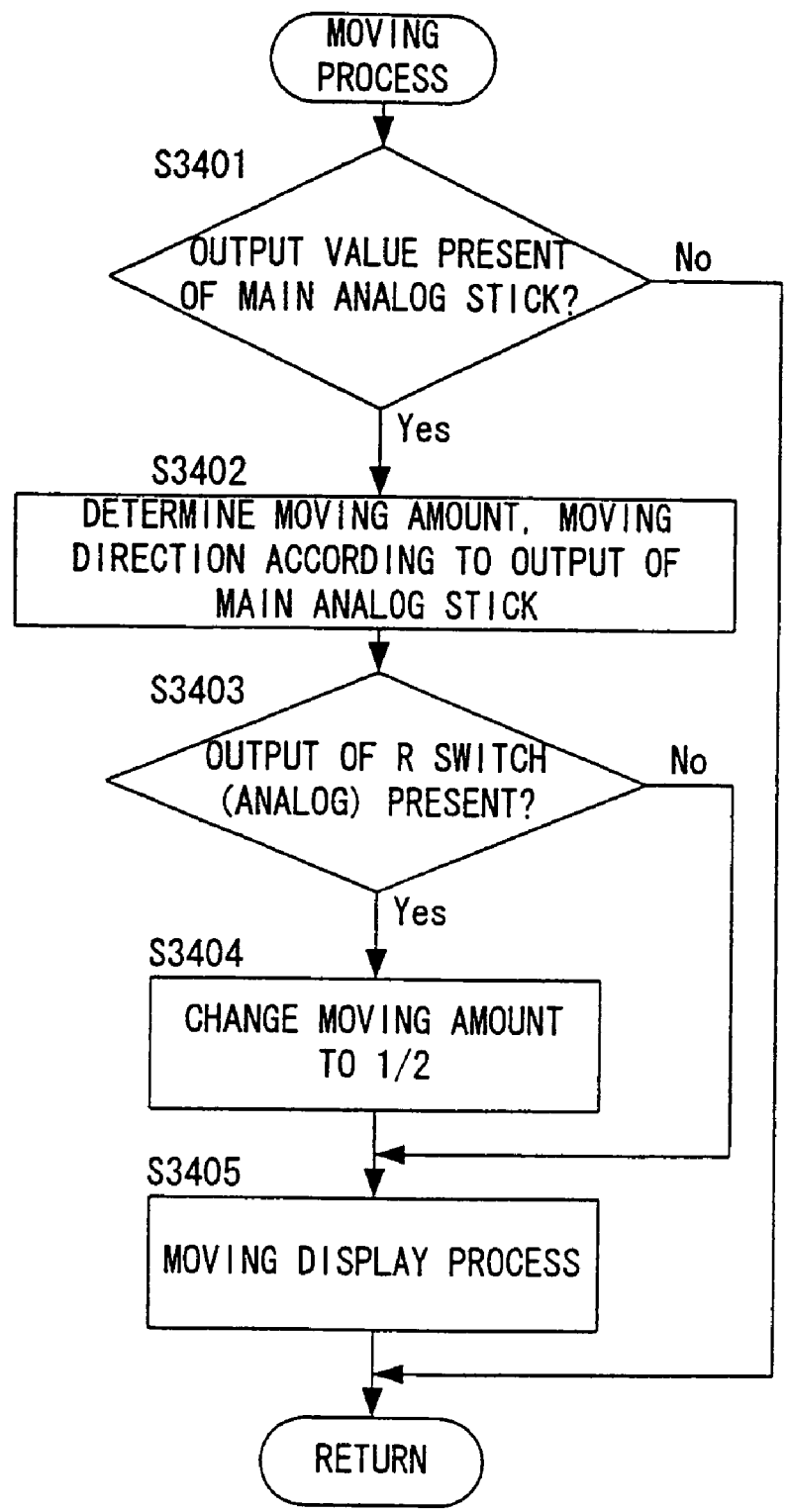
FIG. 41 is a flowchart showing an operation of a moving process in the gun game.
Figure 42:
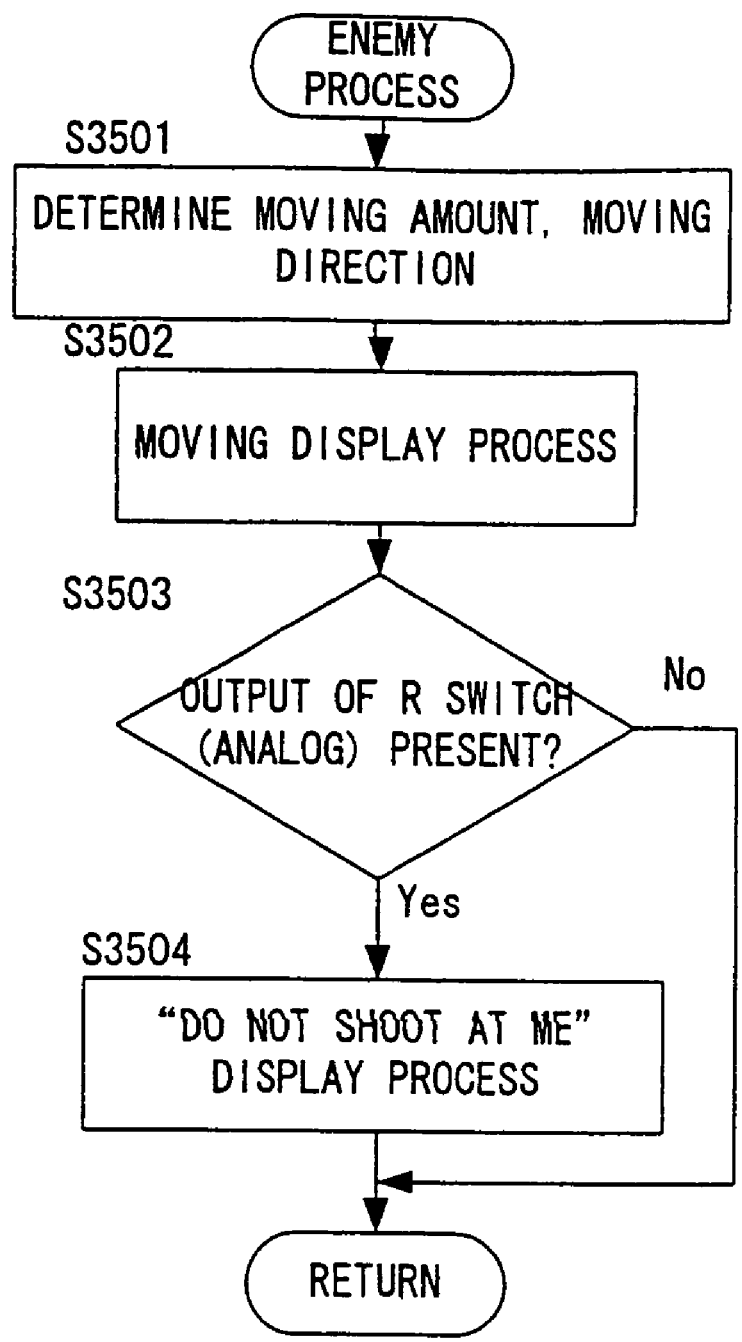
FIG. 42 is a flowchart showing an operation of an enemy process in the gun game.

FIG. 36 is a flowchart of a main routine. In starting the game, firstly, reading of the operating data of the controller is carried out in a step S2901. After the step S2901, a gun firing process described later by referring to FIG. 37 is carried out in a step S2902. After the step S2902, a gun holding process described later by referring to FIG. 38 is carried out in a step S2903. After the step S2903, a moving process described later by referring to FIG. 41 is carried out in a step S2904. After the step S2904, an enemy process described later by referring to FIG. 42 is carried out in a step S2905. After the step S2905, other processes are carried out in a step S2906. More specifically, an image process, a sound process, and etc are carried out. After the step S2906, it is determined whether or not the game is over in a step S2907. If it is determined that the game is over, the game is ended. If it is determined that the game is not over, then the process returns to the step S2901 so as to repeat the game process.

FIG. 37 is a flowchart of the gun firing process in the step S2902 of the main routine shown in FIG. 36. Firstly, in a step S3001, it is determined whether or not the R switch 109 (digital) is turned on (more specifically, it is determined whether or not "R" of the operating data shown in FIG. 21 is "1"). If it is determined that the R switch is off, the gun firing process is ended. If it is determined that the R switch is on, the process proceeds to a step S3002 so as to display an image showing a firing of the gun. After the step S3002, it is determined whether or not the bullet hits the enemy in a step S3003. If it is determined that the enemy is not hit, the gun firing process is ended. If it is determined that the enemy is hit, the process proceeds to a step S3004 so as to end the gun firing process after carrying out a process to eliminate the enemy.

FIG. 38 is a flowchart of the gun holding process in the step S2903 of the main routine shown in FIG. 36. Firstly, in a step S3101, it is determined whether or not an output value of the R switch (analog) is 0 (more specifically, it is determined whether or not a value of the operating data "R Analog" shown in FIG. 21 is 0). If it is determined that the value is 0, the process proceeds to a step S3102 so as to carry out a process to display an image A shown in FIG. 39. That is, in a case that the R switch 109 is in a releasing state, a display in which the gun is not to be raised at all is shown. If it is determined that the output value of the R switch 109 (analog) is not 0, the process proceeds to a step S3103 so as to determine whether or not the value is from 1 to 63. If it is determined that the value is from 1 to 63, the process proceeds to a step S3104 so as to carry out a process to display an image B shown in FIG. 39. That is, in a case of a state where the R switch 109 (value of the "R Analog" is from 1 to 63) is slightly pressed, a state in which the gun is slightly raised is displayed (image B shown in FIG. 39). If it is determined that the output value of the R switch 109 (analog) is not from 1 to 63 in the step S3103, the process proceeds to a step S3105 so as to determine whether or not the value is from 64 to 127. If it is determined that the value is from 64 to 127, the process proceeds to a step S3106 so as to carry out a process to display an image C shown in FIG. 39. That is, in a case of a state in which the R switch is further depressed ("R Analog" is from 64 to 127), a state in which the gun is further raised is displayed (image C shown in FIG. 39).

Likewise, in steps S3107 and S3108, in a case of a state where the R switch 109 is further depressed (value of the "R Analog" is from 128 to 191), a state where the gun is further raised is displayed (image D shown in FIG. 39). If it is determined that the output value of the R switch (analog) is from 192 to 255 in a step S3109, a state where the gun is completely held (image E shown in FIG. 39) is displayed, however, no bullet is fired unless the R switch 109 (digital) becomes turned on. After displaying the image A, B, C, D, or E, the gun holding process is ended.

Note that in addition to the action display by the player character (image A to image E shown in FIG. 39) to hold the gun corresponding to the output of the R switch 109 (analog), it may be possible to display an action or operation in which a trigger of the gun is pulled as shown in FIG. 40. In this case, in a state that the R switch 109 (analog) is a releasing state, an image F is displayed. In a state that the R switch 109 (analog) is depressed approximately by half, an image G is displayed. In a state that the R switch 109 (analog) is deeply depressed, an image H is displayed.

Although images prepared in advance are used in this embodiment, a new image may be generated according to a value of the "R Analog". An example would include cases that an image in which an amount of pulling the trigger of the gun is increased is generated in proportion to an amount of the R switch 109 being depressed, and etc.

FIG. 41 is a flowchart of the moving process in the step S2904 of the main routine shown in FIG. 36. In the moving process, a process to carry out a moving display of the player character based on the operation of the main analog joystick is done. Firstly, in a step S3401, it is determined whether or not there is an output value of the main analog joystick 112 (more specifically, it is determined whether or not either one of values of the operating data "Main Analog X" or "Main Analog Y" shown in FIG. 21 is 0). If it is determined that there is no output value, the moving process is ended. If it is determined that there is the output value, a moving amount and a moving direction are determined depending on the output value of the main analog joystick 112 (value of "Main Analog A", "Main Analog Y") in a step S3402.

After the step S3402, the process proceeds to a step S3403 so as to determine whether or not there is an output of the R switch 109 (analog) (more specifically, whether or not the value of the operating data shown in FIG. 21 "R Analog" is 0). In a case that it is determined that there is no output, the process proceeds to a step S3405. In a case that it is determined that there is the output, a process to bring the moving amount determined in the step S3402 to ½ is carried out in a step S3404. This is a case where there is the output of the R switch 109 (analog), a movement display in which the player character holds the gun (the image B to the image E shown in FIG. 39) is shown, and therefore, in this case, a process that the movement is not easy (movement amount is small with respect to the operating amount) is carried out. After the step S3404, the process proceeds to the step S3405. In the step S3405, a process to display a movement of the player character in accordance with the determined moving amount and the direction amount is carried out.

FIG. 42 is a flowchart of the enemy process in the step S2905 of the main routine shown in FIG. 36. In the enemy process, a moving process of the enemy character is carried out. Firstly, in a step S3501, a process to determine a moving amount and a moving direction of the enemy character is carried out. The moving amount and the moving direction are randomly determined based on the random number, for example. After the step S3501, a movement displaying process is carried out in a step S3502. More specifically, a process displayed in a moving manner according to the moving amount and the moving direction determined in the step S3501 is carried out. After the step S3502, it is determined whether or not there is an output of the R switch 109 (analog) in a step S3503 (more specifically, whether or not the value of the "R Analog" operating data shown in FIG. 21 is 0). If it is determined that there is no output, the enemy process is ended. If it is determined that there is an output, a displaying state of the enemy character is brought into a state in which a feeling of "Do not shot at me" is expressed (holding up a hand toward the player character or lowering a head, and etc, for example). This is a case where if there is the output of the R switch 109 (analog), a movement display in which the player character holds the gun is shown (image B to image E shown in FIG. 39), and therefore, in this case, a savor or taste of the game is increased by showing a display in which the enemy character is brought to responding to a gun-holding movement.

The R switch 109 of this embodiment is provided with a function as a digital switch and a function as an analog switch. Furthermore, since the switch is structured in such a manner that when the operation of the analog switch becomes maximum, the digital switch is turned on in conjunction therewith, there is a digital operation on an extension line of an analog operation. As a result thereof, in a case of assigning a predetermined movement to the digital switch as in this embodiment, it is possible to express a fact on a screen that the player is about to depress the digital switch by carrying out a movement display prior to a movement to which the digital switch is assigned in accordance with the operating amount of the analog switch. In a flag-raising game in which red and white flags held by right and left hands are raised in tune with a sign as a modified example of this embodiment, a process to raise the flag is carried out when the R switch 109 (digital) becomes turned on. However, it is considered to display that the flag is about to be raised in accordance with the operating amount of the R switch 109 (analog). Furthermore, in a boxing game, when the R switch (digital) is turned on, a process to deliver a punch is carried out. However, as another modified example, it is considered to carry out a moving display in which a faint action is delivered in a case that the R switch 109 (analog) is operated. In this case, a game program may be such a program that the enemy boxer responds (escapes) in response to the faint action. Moreover, in a fishing game, a process to cast a fishing rod is carried out when the R switch 109 (digital) becomes turned on. It is considered, as a still further modified example, to have a game having a display in which the fishing rod is moved back and forth in response to the operation of the R switch 109 (analog).

Figure 43:
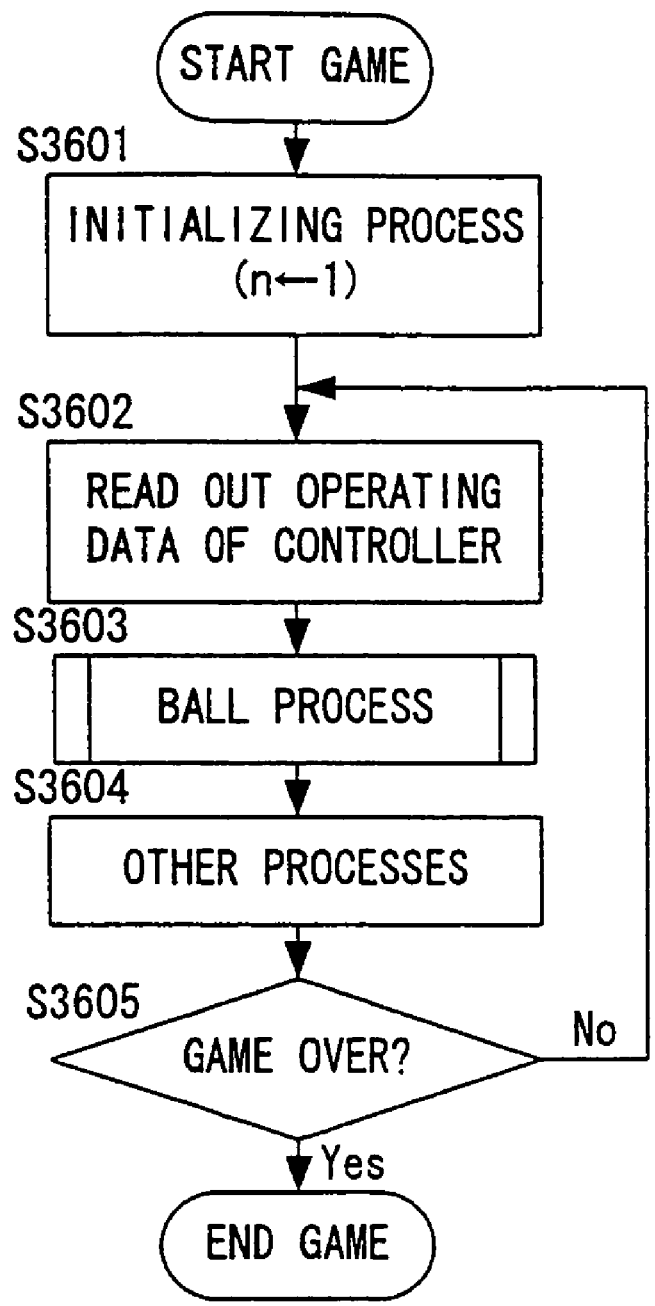
FIG. 43 is a flowchart showing (main routine) of an operation of a golf game which is another embodiment of the present invention.
Figure 44:
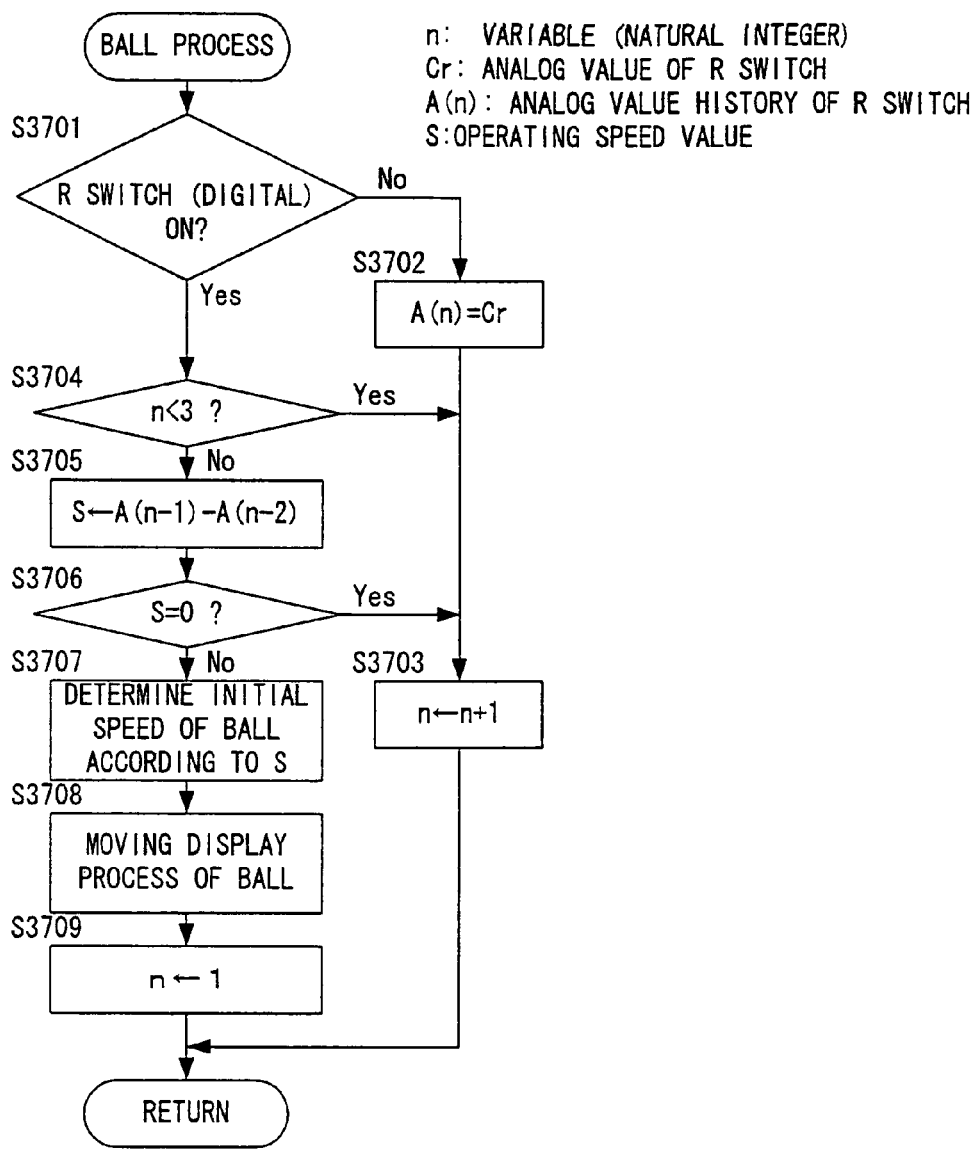
FIG. 44 is a flowchart showing an operation of a ball process in the golf game.

Next, descriptions are made with respect to a golf game which is another embodiment of the present invention by referring to FIG. 43 and FIG. 44. The golf game of this embodiment is a game in which from a state that a player golfer (golfer character operated by the player) swings back a golf club, upon the player depresses the R switch 109 (digital), then the golf club is swing down so as to hit a ball. The ball is driven out at an initial velocity in proportion to a speed at which the R switch 109 (analog) is operated before the R switch 109 (digital) becomes on is forced.

FIG. 43 and FIG. 44 are flowcharts of a program executed in the CPU 21. FIG. 43 is a flowchart of a main routine. Upon starting the game, firstly, an initializing process is carried out in a step S3601 (changing a variable n to 1, and etc., for example). The variable n is a variable used in a ball process described later by referring to FIG. 44. After the step S3601, operating data of the controller 1 is read out in a step S3602. Note that a format (b) in FIG. 21 is used in the embodiment.

After the step S3602, the ball process described later by referring to FIG. 44 is carried out in a step S3603. After the step S3603, other processes are carried out in a step S3604. More specifically, a moving process of the player golfer, an image process, a sound process, and etc, are carried out. After the step S3604, it is determined whether or not the game is over in a step S3605. In a case that the game is over, the game is ended. If it is determined that the game is not over, the process is returned to the step S3602 so as to repeat the game process.

FIG. 44 is a flowchart of the ball process in the step S3603 of the main routine in FIG. 43. In the ball process, a moving process of the ball which the player golfer hits. More specifically, the moving process of the ball is carried out based on the operating data of the R switch 109 (value of the "R" and "R Analog" in FIG. 21). In particular, a process to determine a speed at which the ball flies is carried out based on the value of "R Analog". In the ball process, the variable n is a variable which is incremented for each frame, and an index variable for storing an output value of the R switch 109 (analog) of each one frame into A(n). A variable Cr is an output value of the R switch 109 (analog) ("R Analog" shown in FIG. 21). A variable S is a variable for which an operating speed of the R switch 109 (analog) is substituted.

Firstly, in a step S3701, it is determined whether or not the R switch 109 (digital) is turned on (R switch 109 is completely depressed). Unless the R switch 109 (digital) is turned on, the process proceeds to a step S3702. The variable A(n) is substituted by the output value of the Cr (an output value of the R switch (analog). (More specifically, the value of the "R Analog" shown in FIG. 21).

After the step S3702, the variable n is incremented by 1 (substitute n+1 for the variable n) in the step S3703, and the process proceeds to the step S3604.

If it is determined that the R switch 109 (digital) is turned on (R switch 109 is completely depressed) in the step S3701, the process proceeds to a step S3704. It is determined whether or not the variable n is less than 3 in the step S3704. If the variable n is not less than 3 (equal to or more than 3), the process proceeds to a step S3705. If the variable n is smaller than 3 (less than 3), the process proceeds to the step S3703, and proceeds to the step S3604 after incrementing the variable n. This process is carried out because unless the variable n is equal to or more than 3, a velocity calculation in the step S3705 cannot be done.

The variable S is substituted by A(n−1)-A(n−2) in the step S3705. The variable S is a variable to represent a speed to depress the R switch 109 (analog), and substituted by a numeric value that an analog value (A(n−1)) of the R switch 109 of last frame is subtracted by the analog value (A(n−2)) of the R switch 109 the frame one before last. A reason why the analog value of the R switch 109 of the present frame is not used is that the digital switch of the R switch 109 is not necessarily turned on before the analog value becomes maximum due to product structure, deviation in product precision, and etc. In this embodiment, an operating speed of the R switches 109 between the frame of one before last and the frame of last time is detected, however, the speed of the R switch 109 may be detected at a different timing (an operating speed between a frame of three frames before and the frame of one before last, or an operating speed between a frame of three frames before and the frame of last time, for example).

After the step S3705, it is determined whether or not S is 0 in a step S3706. If S is not 0, the process proceeds to a step S3707. If S is 0, the process proceeds to the step S3703, and then proceeds to the step S3604 after incrementing the variable n. This process is carried out for allowing the player to perform a golf swing once again when S is 0, that is, the speed between the frame of the R switch 109 one before last and the frame of last time is 0 (when the R switch 109 is being depressed without interruption, the player operates the R switch 109 irregularly, and etc., for example).

An initial speed of the ball is determined based on the S in the step S3707. The speed may be evaluated by using an equation such as Sb (initial speed of the ball)=S×B (B is a value determined based on a relationship between the value of S and the initial speed of the ball), and etc., for example. If S is 50, set the initial speed of the ball to 300 km/h, for example. After the step S3707, image data for displaying the ball in accordance with the initial speed is generated in a step S3708. After the step S3708, the variable n is turned into 1 in a step S3709, and the process proceeds to the step S3604.

If the game shown in FIG. 43 to FIG. 44 is carried out, a ball at a high speed is driven out when the player quickly depresses the R switch 109, and a ball at a slow speed is driven out when the player slowly depresses the R switch 109. Therefore, the player can swing the golf club while adjusting a force to hit the ball. Accordingly, this makes it possible to realize a golf game in which realistic sensation and changes abound.

Note that a golf club swing may be operated either in synchronism with a movement of the R switch 109, or after the R switch 109 (digital) is turned on.

Figure 45:
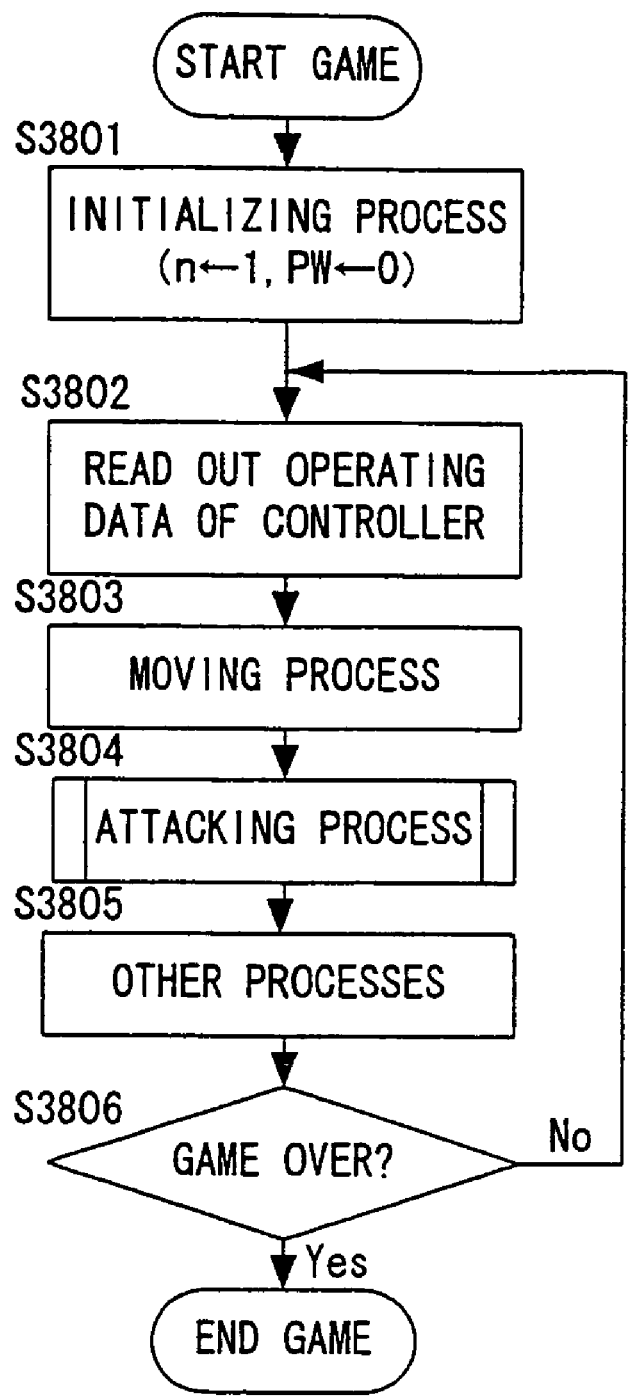
FIG. 45 is a flowchart (main routine) showing an operation of a shooting game which is another embodiment of the present invention.
Figure 46:
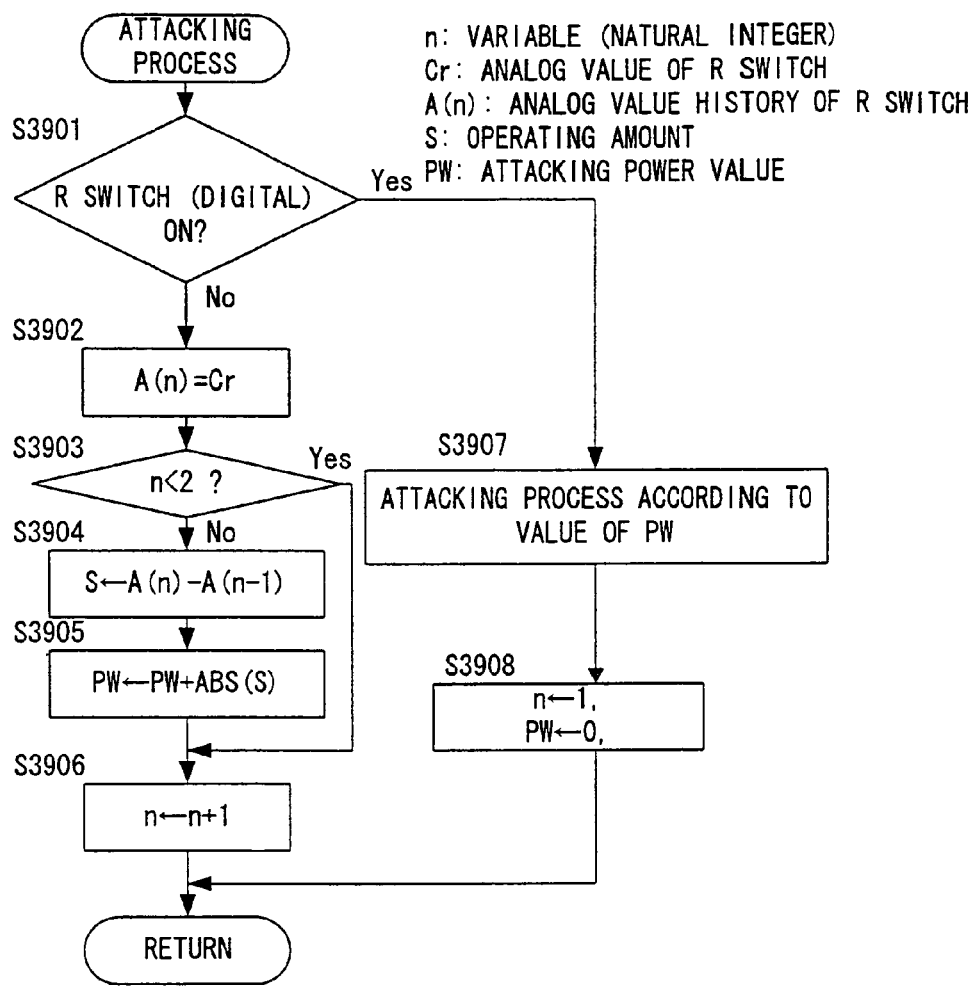
FIG. 46 is a flowchart showing an operation of an attacking process in the shooting game.

Next, descriptions are made with respect to a shooting game which is another embodiment of the present invention by referring to FIG. 45 and FIG. 46. The shooting game of this embodiment is a game in which a player makes a movement control of a player combat plane (combat plane operated by the player) by operating the main analog joystick 112 of the controller 1, and shoots a laser beam when the player turns on the R switch 109 (digital) so as to attack an enemy. The laser beam is different in power depending on an operation amount of the R switch 109 (analog) before the R switch 109 (digital) is turned on. Although a combat plane game is shown in this embodiment, the present invention is applicable to any game in which to attack the enemy.

FIG. 45 and FIG. 46 are flowcharts of a program carried out in the CPU 21. FIG. 45 is a flowchart of a main routine. Upon starting the game, firstly, an initialization process is carried out in a step S3801. Various processes are therein carried out such as turning a variable n into 1, turning a variable PW into 0, and etc., for example. The variable n and the variable PW are described in detail later. After the step S3801, operating information of the controller 1 is read out in a step S3802. Note that a format (b) in FIG. 21 is used in this embodiment.

After the step S3802, a moving process of the combat plane is carried out in a step S3803. More specifically, the moving process of the combat plane is carried out based on the operating information of the main analog joystick 112 (values of "Main Analog X" and "Main Analog Y" in FIG. 21). If the value of the Main Analog X is plus (+), the player combat plane is moved to a right direction in accordance with the value, if the value of the Main Analog X is minus (−), the player combat plane is moved to a left direction in accordance with the value, if the value of the Main Analog Y is plus (+), the player combat plane is moved upward, in accordance with the value, and if the value of the Main Analog Y is minus (−), the player combat plane is moved downward in accordance with the value.

After the step S3803, an attacking process described later by referring to FIG. 46 is executed in a step S3804. After the step S3804, other processes are carried out in a step S3805. More specifically, a moving process of an enemy object, an image process of the player combat plane and other objects, and a sound process of BGM, and etc are carried out.

After the step S3805, it is determined whether or not the game is over in a step S3806, and if it is determined that the game is over, then the game is ended. If it is determined that the game is not over, the process returns to the step S3602 so as to repeat the game process.

FIG. 46 is a flowchart of the attacking process of the player combat plane in the step S3804 of the main routine in FIG. 45. In the attacking process, a process in which the laser beam is fired is carried out in response that the R switch 109 (digital) is turned on. At this time, the power of the laser beam is determined based on the operating data of the R switch 109 (analog). In the attacking process, a variable n is a variable which is incremented for each frame while the R switch 109 (digital) is turned off, and an index variable for storing an output value of the R switch 109 (analog) of each one frame into A(n). Cr is an output value of the R switch 109 (analog) ("R Analog" shown in FIG. 21). A variable S is substituted by a varying amount of the operation of the R switch 109 (analog). A variable PW is a variable which indicates the power of the laser beam.

Firstly, it is determined whether or not the R switch 109 (digital) is turned on (R switch 109 is completely depressed) in a step S3901. Unless the R switch 109 (digital) is turned on, the process proceeds to a step S3902. The variable A(n) is substituted by Cr in the step S3902.

It is determined whether or not the variable n is equal to or less than 2 in a step S3903. Unless the variable n is equal to or less than 2 (equal to or more than 2), the process proceeds to a step S3904, and if the variable n is equal to or smaller than two (less than 2), the process proceeds to a step S3906. This is a process for preventing a state where no numeric value is present in the variable A (n−1) as a result that n−1 becomes equal to or less than 0 in a step S3904.

The variable S is substituted by A(n)-A(n−1) in the step S3904. The variable S is a numeric value that an analog value of the R switch 109 of the present frame is subtracted from the analog value of the R switch 109 of the last frame, and represents an amount of the R switch 109 being forced (or pushed back) in one frame. After the step S3904, the variable PW is substituted by PW+ABS (S) in a step S3905. The PW which indicates a power of the laser beam increases in association that the player pushes and pulls back the R switch 109 (analog) during a time from that the player attacks the combat plane last time (from that the R switch 109 (digital) becomes turned on) and until present time. ABS (S) stands for an absolute value of the variable S.

After the step S3905, the variable n is incremented by one (substitute n+1 for the variable n) in the step S3906, and the process proceeds to the step S3805.

If the R switch 109 (digital) is turned on in the step S3901, the process proceeds to a step S3907. An attacking process is carried out in accordance with a value of the variable PW in the step S3907. There is a game in which the fighter planes shoot with each other by the laser beam, a life point and a attacking power are set for each fighter plane, the life point of the fighter plane being attacked decreases in accordance with the attacking power of the fighter plane attacked, the combat plane is blown out when the life point becomes zero, and thus, the fighter plane to be blown out is lost, and the fighter plane that blows out (the enemy) win, for example. The variable PW of this embodiment is used for determining the attacking power of the laser beam of this game. The larger the variable PW, the higher the attacking power and sooner to conquer the enemy, and the smaller the variable PW, the lower the attacking power, thus requiring time to conquer the enemy. However, in order to increase the variable PW, it needs to move the R switch 109 for a long period by forcing, pushing back, and etc in order that the R switch 109 (digital) does not become turned on (it needs to move a index finger up and down as if in a clanging manner). For a reason that there is a possibility to be attacked by the enemy during that time, an outcome of the game may depend on turning on the R switch 109 (digital) to what extent the variable PW is increased.

After the step S3907, the variable n is rendered 1 in a step S3908, and the process proceeds to a step S3805 after rendering the variable PW 0.

As described above, the game shown in FIG. 45 and FIG. 46 can realize an unprecedented operating method in which the attacking power to attack the enemy combat plane is changed by the number of upward and downward movements (and the amount forced into) of the R switch 109 by an index finger of the player in a clanging manner. Furthermore, according to this present embodiment, it is possible to provide a game having a good operability because an operation to accumulate an energy (PW) (operate the R switch 109 (analog) in a clanging manner) and an operation to shoot or fire (turn on the R switch 109 (digital)) can be implemented by the same switch.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operating device for game machine for instructing an action of a character appearing in a game, comprising:
   a housing;
   a main switch arranged in a vicinity of one side surface on one main surface of said housing and in a vicinity of a thumb finger of one hand holding the housing; and
   a plurality of sub-switches arranged to be circumferentially distributed around the main switch in an area excluding a lower area of said main switch and within an area that the thumb finger is movable, wherein
   said plurality of sub-switches are constituted to include a first sub-switch arranged at an upper area of said main switch, a second sub-switch arranged at a left area of the main switch, and a third sub-switch arranged at a right area of the main switch, and each of which has a shape smaller than a shape of the main switch.

2. An operating device for game machine according to claim 1, wherein
   said main switch has a shape formed to be circular,
   said first sub-switch is arranged on a concentric circle centering said main switch.

3. An operating device for game machine according to claim 1, wherein
   said first sub-switch is arranged on a first axis which slants along a longitudinal axis of said housing passing a center of said main switch toward a center of the housing by a predetermined degree.

4. An operating device for game machine according to claim 3, wherein said second sub-switch and said third sub-switch are arranged at a symmetric position with respect to said first axis.

5. An operating device for game machine according to claim 1, wherein said first sub-switch has a key top thereof formed higher than a key top of said main switch.

6. An operating device for game machine according to claim 1, wherein one said sub-switch is arranged to be closer to a center side of said housing than said main switch out of the second sub-switch and the third sub-switch has a key top thereof formed lower than a key top of said main switch.

7. An operating device for game machine according to claim 1, wherein said second and/or third sub-switch has a shape expanding along an outer periphery of the shape of said main switch.

8. An operating device for game machine according to claim 1, further comprising a direction designating operating portion which is arranged in a vicinity of another side surface on one main surface of said housing and in a vicinity of a position of a thumb finger of another hand holding the housing, and is configured to designate a direction of a moving direction of a character appearing in a game.

9. An operating device for game machine according to claim 8, wherein
   said main switch has a shape formed to be circular, and
   said plurality of sub-switches are arranged on a concentric circle centering said main switch, and in addition, have a shape extending to a circumferential direction of the concentric circle.

10. An image controller configured to control imagery displayed on a television, comprising:
    a first member rotatable on two mutually perpendicular axes, the rotation being translatable into signals for controlling the imagery displayed on the television;
    a finger depressible first button configured to output varying signals dependent upon varying actuation of the first button controlling the imagery displayed on the television;
    a motor configured to provide vibration detectable by a human user holding the controller;
    an emitter mounted to the controller configured to provide wireless communication controlling the imagery displayed on the television.

11. An image controller according to claim 10 further comprising a second member rotatable on two mutually perpendicular axes, the rotation being translatable into signals controlling the imagery displayed on the television.

12. An image controller according to claim 10 further comprising a finger depressible second button configured to output varying signals dependent upon varying actuation of the second button controlling the imagery displayed on the television.

13. A graphics controller configured to control imagery, comprising:

a first button positioned on the graphics controller such that the first button is activatable by a single human finger, the first button being connected to a first proportional sensor, the first proportional sensor being configured to create a signal usable to control the imagery;

a second button positioned on the graphics controller such that the second button is activatable by a single human finger, the second button being connected to a second proportional sensor, the second proportional sensor being configured to create a signal usable to control the imagery;

an input element movable on more than two axes, wherein movement of the input element is configured to control more than two axes of the imagery.

14. A graphics controller according to claim 13 further comprising a second input element movable on at least two axes, wherein movement of the second input element is configured to control at least two axes of the imagery.

15. An operating device for game machine according to claim 3, wherein said housing includes a grip which protrudes toward a direction approximately parallel from a lower portion of said main switch to said first axis, and has a shape to be gripped by a palm of the one hand of a player.

* * * * *